(12) United States Patent
Leventis et al.

(10) Patent No.: US 11,192,994 B2
(45) Date of Patent: Dec. 7, 2021

(54) THREE-DIMENSIONAL POROUS POLYUREA NETWORKS AND METHODS OF MANUFACTURE

(71) Applicant: Aerogel Technologies, LLC, Glendale, WI (US)

(72) Inventors: Nicholas Leventis, Rolla, MO (US); Chariklia Sotiriou-Leventis, Rolla, MO (US); Sudhir Mulik, North Wales, PA (US)

(73) Assignee: Aerogel Technologies, LLC, Boston, MA (US)

( * ) Notice: Subject to any disclaimer, the term of this patent is extended or adjusted under 35 U.S.C. 154(b) by 0 days.

(21) Appl. No.: 16/374,958

(22) Filed: Apr. 4, 2019

(65) Prior Publication Data
US 2020/0071482 A1 Mar. 5, 2020

Related U.S. Application Data

(63) Continuation of application No. 13/214,061, filed on Aug. 19, 2011, now Pat. No. 10,301,445.

(Continued)

(51) Int. Cl.
*C08J 9/02* (2006.01)
*C01B 32/00* (2017.01)
(Continued)

(52) U.S. Cl.
CPC ............... *C08J 9/02* (2013.01); *B82Y 30/00* (2013.01); *B82Y 40/00* (2013.01); *C01B 32/00* (2017.08);
(Continued)

(58) Field of Classification Search
CPC .... C08J 9/02; C08J 2205/026; C08J 2375/02; C01B 32/00; B82Y 30/00; B82Y 40/00;
(Continued)

(56) References Cited

U.S. PATENT DOCUMENTS 3,109,712 A 11/1963 Redfern
4,873,218 A 10/1989 Pekala
(Continued)

OTHER PUBLICATIONS

Mulik et al., "Macroporous Electrically Conductive Carbon Networks by Pyrolysis of Isocyanate-Cross-Linked Resorcinol-Formaldehyde Aerogels," Chem. Mater. 2008, 20, 6985-6997. (Year: 2008).*

(Continued)

*Primary Examiner* — Kara B Boyle
(74) *Attorney, Agent, or Firm* — Wolf, Greenfield & Sacks, P.C.

(57) ABSTRACT

Porous three-dimensional networks of polyurea and porous three-dimensional networks of carbon and methods of their manufacture are described. In an example, polyurea aerogels are prepared by mixing an triisocyanate with water and a triethylamine to form a sol-gel material and supercritically drying the sol-gel material to form the polyurea aerogel. Subjecting the polyurea aerogel to a step of pyrolysis may result in a three dimensional network having a carbon skeleton, yielding a carbon aerogel. The density and morphology of polyurea aerogels can be controlled by varying the amount of isocyanate monomer in the initial reaction mixture. A lower density in the aerogel gives rise to a fibrous morphology, whereas a greater density in the aerogel results in a particulate morphology. Polyurea aerogels described herein may also exhibit a reduced flammability.

15 Claims, 35 Drawing Sheets

Related U.S. Application Data

(60) Provisional application No. 61/675,757, filed on Aug. 20, 2010.

(51) Int. Cl.

| | | |
|---|---|---|
| *B82Y 30/00* | (2011.01) | |
| *B82Y 40/00* | (2011.01) | |
| *C08G 18/79* | (2006.01) | |
| *C08G 18/18* | (2006.01) | |
| *C08G 18/30* | (2006.01) | |

(52) U.S. Cl.
CPC ........... *C08G 18/18* (2013.01); *C08G 18/302* (2013.01); *C08G 18/792* (2013.01); *C08G 2110/0091* (2021.01); *C08J 2205/026* (2013.01); *C08J 2375/02* (2013.01)

(58) Field of Classification Search
CPC .... C08G 18/792; C08G 18/18; C08G 18/302; C08G 2101/0091
See application file for complete search history.

(56) References Cited

U.S. PATENT DOCUMENTS

| | | |
|---|---|---|
| 5,081,163 A | 1/1992 | Pekala |
| 5,484,818 A | 1/1996 | De Vos et al. |
| 5,942,553 A | 8/1999 | Biesmans et al. |
| 5,990,184 A | 11/1999 | Biesmans |
| 8,952,119 B2 | 2/2015 | Dong et al. |
| 10,301,445 B2 | 5/2019 | Leventis et al. |
| 2003/0134916 A1 | 7/2003 | Hrubesh |
| 2006/0211840 A1 | 9/2006 | Lee |
| 2006/0281825 A1 | 12/2006 | Lee et al. |

OTHER PUBLICATIONS

Aegerter et al., eds., Aerogels Handbook. Aegerter, Leventis, and Koebel, eds. Springer New York; 2011:3-932.
Al-Muhtaseb et al., Preparation and properties of resorcinol-formaldehyde organic and carbon gels. Adv Mater. Jan. 2003;15(2):101-114. Doi: 10.1002/adma.200390020.
Biesmans et al., Polyurethane based organic aerogels and their transformation into carbon aerogels. J Non-Cryst Solids. Apr. 1998; 225:64-68. Doi: 10.1016/S0022-3093(98)00010-6.
Biesmans et al., Polyurethane-based organic aerogels' thermal performance. J Non-Cryst Solids. Apr. 1998; 225:36-40. Doi: 10.1016/S0022-3093(98)00103-3.
Bil et al., Optimization of the structure of polyurethanes for bone tissue engineering applications. Acta Biomaterialia. 2010;6:2501-10.
Brinker et al., Sol-Gel Science. Academic Press, Inc. Elsevier. San Diego, CA. 1990:1-908.
Brinker et al., Surface structure and chemistry of high surface area silica gels. J Non-Crystalline Solids. 1990;120:26-33.
Britain, Behavior of isocynate-terminated prepolymers in the presence of various catalysts. Ind Eng Chem Prod Res Dev. 1962;1(4)261-264. Doi: 10.1021/i360004a009.
Chandrasekaran et al., Efficient one-step synthesis of mechanically strong, flame retardant polyuria aerogels. Polymer Preprints. 2010;51:334-5.
Cowlard et al., Vitreous carbon-a new form of carbon. J Mater Sci. Nov. 1967;2(6):507-512.
Fischer et al., Cellulose-based aerogels. Polymer. Oct. 2006;47(22):7636-7645. Doi: 10.1016/j.polymer.2006.09.004.
Fu et al., Characterization of active screen plasma modified polyurethane surfaces. Surface & Coatings Technology. 2012;206:4799-4807.
Gong et al., Synthesis and characterization of polyurethane—chitosan interpenetrating polymer networks. J Appl Polymer Sci. 1998;68:1321-29.
Gross et al., An XPS analysis of different $SiO_2$ modifications employing a C 1s as well as an Au 4f7/2 static charge reference. Surface and Interface Analysis. 1992;18:59-64.
Hileman et al., In situ preparation and evaluation of open pore polyurethane chromatographic cols. Anal Chem. 1973;45(7):1126-1130.
Jiang et al., Effects of surface-modified silica nanoparticles attached graphene oxide using isocyanate-terminated flexible polymer chains on the mechanical properties of epoxy composites. J Mater Chem. 2014;2:10557-10567.
Jones, A method for producing gradient density aerogel. J Sol-Gel Sci Technol. Dec. 2007;44(3):255-258.
Katti et al., Chemical, physical, and mechanical characterization of isocyanate cross-linked amine-modified silica aerogels. Chem Mater. 2006;18:285-296.
Kistler, Coherent expanded aerogels and jellies. Nature. May 1931;127(3211): 741. doi:10.1038/127741a0.
Kistler, Coherent expanded-aerogels. J Phys Chem. 1932; 36(1): 52-64. Doi: 10.1021/j150331a003.
Lee et al., Polyurea based aerogel for a high performance thermal insulation material. J Sol-Gel Sci Technol. Feb. 2009;49(2):209-220.
Lee et al., X-ray photoelectron spectra and electronic structure of some diamine compounds. J Electron Spectroscopy and Related Phenomena. 1977;11:123-127.
Leventis et al., Multifunctional Polyurea Aerogels from Isocyanates and Water. A Structure—Property Case Study. Chem Mater. 2010; 22: 6692-6710. Doi: 10.1021/cm102891d. . . . .
Leventis et al., Nanoengineered silica-polymer composite aerogels with no need for supercritical fluid drying. J Sol-Gel Sci Technol. Aug. 2005;35(2):99-105.
Leventis et al., Nanoengineering strong silica aerogels. Nano Letters. 2002;2(9):957-960. Doi: 10.1021/nl025690e.
Leventis et al., Polymer nanoencapsulated mesoporous vanadia with unusual ductility at cryogenic temperatures. J Mater Chem. 2008;18: 2475-2482.
Leventis et al., Stresses at the interface of micro with nano. J Am Chem Soc. Sep. 5, 2007;129(35):10660-1. Epub Aug. 14, 2007.
Leventis, Mechanically Strong Lightweight Materials for Aerospace Applications (X-Aerogels). 56th International Astronautical Congress. Fukuoka, JP. Oct. 2005. Paper published in advance of Congress on Jan. 1, 2005. 8 pages.
Leventis, Three-dimensional core-shell superstructures: mechanically strong aerogels. Acc Chem Res. Sep. 2007;40(9):874-84. Epub May 9, 2007.
Lu et al., Thermal conductivity of monolithic organic aerogels. Science. Feb. 21, 1992;255(5047):971-2.
Luo et al., Synthesis and characterization of the physical, chemical and mechanical properties of isocyanate-crosslinked vanadia aerogels. J Sol-Gel Sci Technol 2008;48:113-134.
Mayer et al., The aerocapacitor: an electrochemical double-layer energy-storage device. J Electrochem Soc. 1993;140(2): 446-451. Doi: 10.1149/1.2221066.
Mulik et al., Cross-linking 3d assemblies of nanoparticles into mechanically strong aerogels by surface-initiated free-radical polymerization. Chem Mater. 2008;20(15):5035-5046. Doi: 10.1021/cm800963h.
Mulik et al., Macroporous electrically conducting carbon networks by pyrolysis of isocyanate cross-linked resorcinol-formaldehyde aerogels. Chem Mater.2008;20:6985-6997.
NIST X-ray Photoelectron Spectroscopy Database, NIST Standard Reference Database No. 20, National Institute of Standards and Technology, Gaithersburg MD, 20899 (2000), doi:10.18434/T4T88K. Web address: https://srdata.nist.gov/xps/XPSDetailPage.aspx?AllDataNo=22675. Retrieved Sep. 12, 2018.
Paparazzo et al., Evidence of Si—OH species at the surface of aged silica. J Vacuum Science & Technology. Jul. 1992;10(4):2892-96.
Pekala et al., Aerogels derived from multifunctional organic monomers. J Non-Cryst Solids. 1992;145:90-98. Doi: 10.1016/S0022-3093(05)80436-3.
Pekala et al., Structure of organic aerogels. 1. Morphology and scaling. Macromolecules. 1993;26(20): 5487-5493. Doi: 10.1021/ma00072a029.

(56) References Cited

OTHER PUBLICATIONS

Pekala, Organic aerogels from the polycondensation of resorcinol with formaldehyde. J Mater Sci. Sep. 1989; 24(9): 3221-3227.

Pierre et al., Chemistry of aerogels and their applications. Chem Rev. Nov. 2002;102(11):4243-65.

Richter et al., Catalysis in polyisocyanate manufacture. Polym Preprints. 2003;44(1):46-47.

Rigacci et al., Preparation of polyurethane-based aerogels and xerogels for thermal superinsulation. J Non-Cryst Solids. Dec. 2004;350:372-378. Doi: 10.1016/j.jnoncrysol.2004.06.049.

Ross et al., In situ-formed open-pore polyurethane as chromatographic supports. J Chromatogr. 1970;8:386-389.

Sadekar et al., From 'Green' Aerogels to Porous Graphite by Emulsion Gelation of Acrylonitrile. Chemistry of Materials. 2012;24:26-47. Epub Dec. 14, 2011.

Saunders et al., The chemistry of the organic isocyanates. Chem Rev. Oct. 1948;43(2):203-18.

Seeger et al., Small-angle neutron scattering at pulsed spallation sources. J Appl Cryst. 1991;24:467-478.doi:10.1107/S0021889891004764.

Stoye, D and Freitag, W. Eds. Resins for Coatings, Chemistry, Properties and Applications, Hanser/Gardner Publications, Inc. 1996, pp. 177-268.

Tan et al., Organic aerogels with very high impact strength. Adv Mater. May 2001;13(9):644-646. Doi: 10.1002/1521-4095(200105).

Tawil et al., X-ray photoelectron spectroscopic and transmission electron microscopic characterizations of bacteriophage—nanoparticle complexes for pathogen detection. J Phys Chem. 2013;117:20656-20665.

Wicks et al., eds., Organic Coatings: Science and Technology. Third Edition. Product Coatings for Nonmetallic Substrates. John Wiley & Sons, 2007:624.

Woignier et al., Skeletal Density of Silica Aerogels. Journal of Non-Crystalline Solids. 1987;93:17-21.

Zhang et al., Isocyanate-crosslinked silica aerogel monoliths: preparation and characterization. J Non-Cryst Solids. Dec. 2004;350:152-164. Doi: 10.1016/j.jnoncrysol.2004.06.041.

\* cited by examiner

Desmodur RE (TMT)
 Desmodur N3300A
 Desmodur N3200

THREE-DIMENSIONAL POROUS POLYUREA NETWORKS AND METHODS OF MANUFACTURE

RELATED APPLICATIONS

This application is a continuation of U.S. patent application Ser. No. 13/214,061, filed Aug. 19, 2011, which claims the benefit of U.S. Provisional Application No. 61/375,757, filed Aug. 20, 2010, each of which is incorporated herein by reference in its entirety for all purposes.

FEDERALLY SPONSORED RESEARCH

This invention was made with government support under Grant Numbers CHE-0809562 and CMMI-0653919 awarded by the National Science Foundation. The government has certain rights in the invention.

BACKGROUND

1. Field

Aspects herein relate to three-dimensional porous polyurea networks, three-dimensional porous carbon networks, uses thereof, and methods of manufacture.

2. Discussion of Related Art

Three-dimensional porous architectures are a desirable form factor for many materials as they allow installation of new properties into a material not possessed by the non-porous form of a material. Porous architectures possessing nanostructured features, such as nanopores or nanoparticulate solid frameworks, are further desirable in many cases as they can possess new and/or more extreme properties than porous architectures without nanostructured features.

Aerogels are an example of a porous architecture possessing nanostructured features. Aerogels are materials comprised of three-dimensional assemblies of nanoparticles or nanostructures that exhibit high porosity materials and ultra-low densities Aerogel materials are typically produced by forming a gel that includes a porous solid component and a liquid component and then removing the liquid component by supercritically, subcritically, or freeze drying the wet gel to isolate the porous solid component. This porous solid component is an aerogel. Supercritical drying involves the liquid being transformed into a fluid above its critical point and removing the fluid while leaving the porous solid structure generally intact. Subcritical drying involves evaporation of the liquid below its critical point in a way that leaves the porous solid structure generally in tact. Freeze drying involves freezing of the liquid component and sublimation of the resulting solid in a way that leaves the porous solid structure generally in tact.

The large internal void space in aerogels and other nano-structured and non-nanostructured three-dimensional porous networks generally provides for a low dielectric constant, a low thermal conductivity, and a high acoustic impedance. These materials have been considered for a number of applications including thermal insulation, lightweight structures, and impact resistance.

SUMMARY

Articles and methods for manufacturing three-dimensional porous polyurea networks and three-dimensional porous carbon networks are described.

Polyurea aerogels can be prepared by mixing an isocyanate with water and a trialkylamine in forming a sol-gel material and subsequently drying the sol-gel material to form the polyurea aerogel. The sol-gel material may be dried supercritically or subcritically. The density of polyurea aerogels can be tailored by controlling the concentration of isocyanate in the initial mixture. For example, increasing the amount of isocyanate in forming the sol-gel material may give rise to a polyurea aerogel having an increased density. Conversely, decreasing the amount of isocyanate in forming the sol-gel material may give rise to a polyurea aerogel having a lower density. The morphology of polyurea aerogels can also be tailored by controlling the amount of isocyanate in the composition during manufacture. Including a low amount of isocyanate in the initial mixture to form the sol-gel material may give rise to a polyurea aerogel having a fibrous morphology. Also, having an increased amount of isocyanate in the initial mixture to form the sol-gel material may give rise to a polyurea aerogel having a particulate morphology. In some cases, a polyurea aerogel may have a fibrous morphology which may or may not include features of a particulate morphology when the density of the aerogel is less than about 200 mg/cc. Further, polyurea aerogels may exhibit reduced flammability characteristics, for example, when having a density of greater than about 150 mg/cc.

Carbon aerogels may also be manufactured from polyurea aerogels through a conversion step. Once a polyurea aerogel is formed, the aerogel may be subject to a pyrolysis step, giving rise to a carbon skeleton in the aerogel, hence, forming the carbon aerogel. In some embodiments, a polyurea aerogel having a fibrous morphology that is subject to the pyrolysis step may give rise to a carbon aerogel also having a fibrous morphology. In some cases, carbon aerogels having a fibrous morphology may have a density of less than about 150 mg/cc.

In some cases, three-dimensional porous polyurea networks not considered aerogels may be produced. Likewise, three-dimensional porous carbon networks not considered aerogels may be derived from such three-dimensional polyurea networks.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. For purposes of clarity, not every component may be labeled in every drawing. Various embodiments of the invention are described, by way of example, in the accompanying drawings. In the drawings.

DETAILED DESCRIPTION

Figure 1:
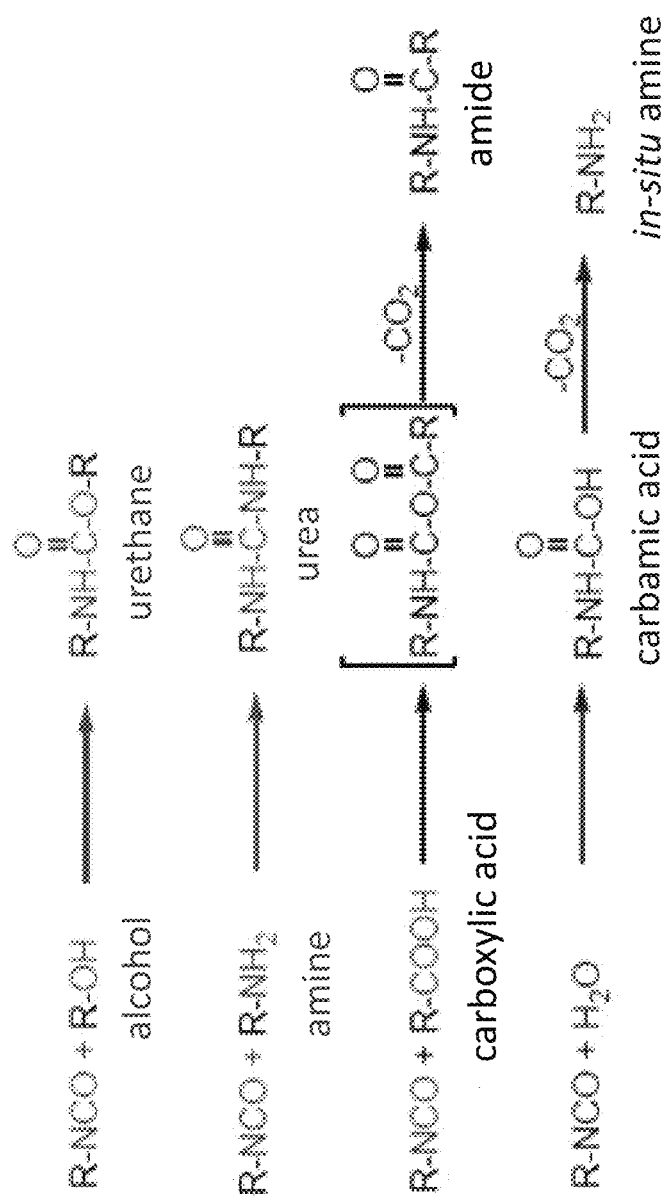
FIG. 1 shows a plurality of isocyanate reactions in accordance with some embodiments.

Aspects described relate to three-dimensional polyurea networks including polyurea aerogels and methods of manufacturing three-dimensional porous polyurea networks.

A polyurea aerogel may be prepared by mixing an isocyanate reactant, such as diisocyanate or triisocyanate, with water and a trialkylamine (e.g., trimethylamine, triethylamine, tributylamine) in a solvent (e.g., acetone, DMSO) to form a sol-gel material including polyurea. The sol-gel material may subsequently be dried supercritically, subcritically, or by freeze drying to form a polyurea aerogel. Mixture of a diisocyanate or triisocyanate reactant with water and a trialkylamine results in in-situ amine formation which reacts further with unreacted isocyanate to form polyurea. A number of characteristics, such as density, nanomorphology, porosity, pore size, surface area, flammability, and mechanical strength can be controlled by the chemical identity and concentration of the isocyanate.

Polyurea aerogels of the present invention may exhibit certain characteristics, for example, related to various degrees of density, morphology and flammability. In some embodiments, the density of the polyurea aerogel is controlled by varying amounts of di- or triisocyanate prepared in an initial manufacturing step. The morphology of the polyurea aerogel may also be controlled. In some embodiments, for example, a polyurea aerogel exhibits a fibrous morphology. In other embodiments, a polyurea aerogel has a particulate ball-like morphology. In some cases, the morphology of a polyurea aerogel relates to the density of the polyurea aerogel. Morphologies of a polyurea aerogel can be tailored according to usage of varying amounts of di- or triisocyanate during manufacture of the polyurea aerogel. In some embodiments, polyurea aerogels manufactured exhibit high mechanical strength properties and are generally not flammable or exhibit low flammability.

Porous polyisocyanate-based organic networks can be prepared by mixing an organic polyisocyanate and an isocyanate trimerization catatlyst, 1,4-diazobicyclo[2.2.2]octane (DABCO), to form a polymeric gel and supercritically drying the gel to produce a polyisocyanate-based aerogel. Such aerogels and their methods of manufacture are described in U.S. Pat. No. 5,484,818 entitled "Organic aerogels," and is incorporated herein by reference in its entirety. Polyurea aerogels described herein are prepared via in situ formation of amines by reaction of isocyanates with water where the density, nanomorphology, porosity, pore size, surface area, flammability, and mechanical strength can be suitably tuned.

Aspects described herein may also relate to three-dimensional porous carbon networks including aerogels and methods of manufacturing three-dimensional porous carbon networks. In manufacturing a three-dimensional porous carbon network, a three-dimensional porous polyurea network may be prepared as a precursor to the three-dimensional porous carbon network. For example, in manufacturing a carbon aerogel, a polyurea aerogel may be prepared as a precursor to the carbon aerogel. As discussed, in some embodiments, the polyurea aerogel may be prepared by mixing a diisocyanate or a triisocyanate reactant with water and a trialkylamine and subjecting the mixture to agitation to form a sol-gel material. Then, the sol-gel material is supercritically, subcritically, or freeze dried, resulting in the polyurea aerogel. Once formed, the polyurea aerogel is then pyrolyzed to form a carbon aerogel. In some embodiments, carbon aerogels may have electrically conductive properties.

Once pyrolyzed, three-dimensional porous carbon networks may retain the same or similar morphology as the polyurea precursor. Accordingly, in some embodiments, carbon aerogels produced from polyurea aerogels having a fibrous morphology by methods described herein may also exhibit a fibrous morphology. In other embodiments, carbon aerogels prepared from pyrolysis of polyurea aerogels having a particulate morphology may also have a particulate morphology.

In some embodiments, polyurea or carbon aerogels of different densities may be prepared by varying the concentration of triisocyanate (e.g., Desmodur N3300A), or diisocyanate, in the sol-gel material. In some embodiments, the density of polyurea aerogels or carbon aerogels prepared from pyrolysis of polyurea aerogels may be between, for example, about 1 mg/cc and about 550 mg/cc, or between about 15 mg/cc and about 500 mg/cc. In some embodiments, the density of polyurea aerogels or carbon aerogels prepared from pyrolysis of polyurea aerogels may be less than about 900 mg/cc, less than about 500 mg/cc, less than about 150 mg/cc, less than about 90 mg/cc, less than about 10 mg/cc, or less than about 1 mg/cc. Previously, it had been challenging to produce open-pore mesoporous materials at a low density that are durable and made from inexpensive chemicals and recyclable solvents. Aerogels presented herein include an open-cell mesoporous foam that is not fragile and remains durable at densities as low as 0.04 g/cc. By comparison, silica aerogels at such low density may exhibit extremely fragile mechanical properties.

The density of polyurea or carbon aerogels prepared in accordance with methods described may be appropriately tailored based on the concentration of isocyanate material included in the initial mixture. For example, when preparing a polyurea or carbon aerogel, including more isocyanate material in the initial mixture may give rise to a polyurea or carbon aerogel having a greater density. Similarly, including less isocyanate material in the initial mixture during preparation of a polyurea or carbon aerogel may result in a polyurea or carbon aerogel having less density.

The morphology of aerogels described herein may be appropriately controlled. In some embodiments, the morphology of a polyurea or carbon aerogel may be controlled based on the amount of isocyanate incorporated into the initial mixture of isocyanate, water and trialkylamine. In some cases, for example, a suitable mixture having a smaller amount of isocyanate in forming a sol-gel material, upon drying of the sol-gel material, may give rise to a polyurea aerogel or carbon aerogel (after pyrolysis) having a more fibrous morphology as compared to an aerogel having been prepared from a similar mixture yet having a larger amount of isocyanate. On the other hand, a suitable mixture having a larger amount of isocyanate, when the sol-gel material is appropriately formed and dried, may result in a more particulate-type morphology as compared to an aerogel prepared from a similar mixture that includes a larger amount of isocyanate. Low-density polyurea and carbon aerogels may exhibit fibrous morphology, whereas high-density polyurea and carbon aerogels may show a particulate morphology.

Aerogels discussed herein may have fibrous morphologies where the aerogels may include nanofibers having various diameters and lengths. In some embodiments, fibrous morphologies of aerogels include fibers having an average diameter ranging between about 1 nm and about 500 nm (e.g., between about 10 nm and about 400 nm, between about 100 nm and about 300 nm) or less than 500 nm (e.g., less than 400 nm, less than 300 nm, less than 200 nm). In some embodiments, fibrous morphologies of aerogels include fibers having an average length of at least 50 nm and may extend into the micron length scale.

Polyurea aerogels discussed herein may have advantageous mechanical strength properties. In some embodiments, the compressive strength of polyurea aerogels may be between about 200 MPa and about 1 GPa, between about 400 MPa and about 800 MPa, or between about 600 MPa and about 700 MPa (e.g., at least 640 MPa). The specific energy, as calculated by the area under a compressive stress-strain curve, can be between about 10 J/g and about 200 J/g, between about 50 J/g and about 150 J/g, or between about 80 J/g and about 120 J/g (e.g., at least 105 J/g).

Figures 28A, 28B, 28C:
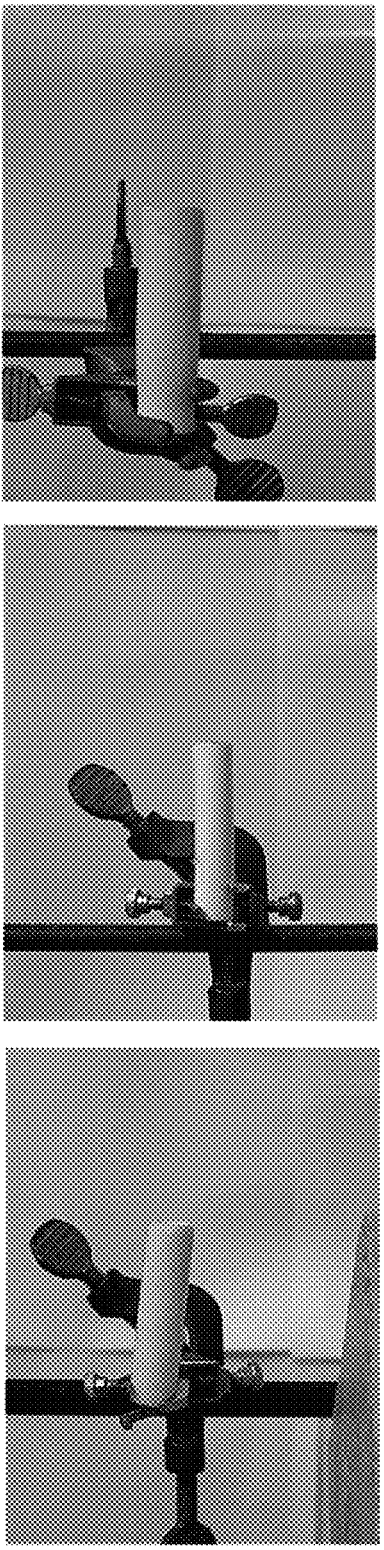
FIGS. 28a-28c show polyurea aerogels exhibiting various degrees of flame retardancy in accordance with some embodiments.

Three-dimensional porous polyurea networks having a certain density level may exhibit flame retardancy properties. In some embodiments, by a flame test, low-density polyurea aerogels were found to burn completely, but high-density polyurea aerogels did not sustain a flame. In some cases, low density polyurea aerogels burn completely but high density polyurea aerogels do not sustain a flame. For example, as shown in FIGS. 28a-28c, a variable-density polyurea aerogel will ignite at a low-density end and the flame will propagate until it approaches a high-density region, where the flame will then self-extinguish. In some embodiments, polyurea aerogels may exhibit significantly reduced flammability characteristics at densities above about 150 mg/cc. For example, a flame will not survive at regions of a polyurea aerogel where the density is greater than about 150 mg/cc. In some cases, a high-density polyurea aerogel may exhibit a more particular morphology (less fibrous) and, hence, may have less surface area for which a flame may be sustained.

Isocyanate (N=C=O) is a reactive functional group and may undergo reaction with a number of nucleophiles. FIG. 1 shows several examples of reactions which may involve isocyanates. Generally, an in-situ amine formed by the reaction of isocyanate with water reacts with isocyanate to yield a urea molecule. Such a reaction may be useful for preparing porous polyurea materials (e.g., aerogels) described herein.

Figure 2:
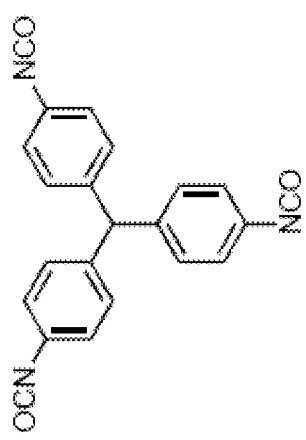
FIG. 2 shows a plurality of isocyanate precursors in accordance with some embodiments.
Figure 2:
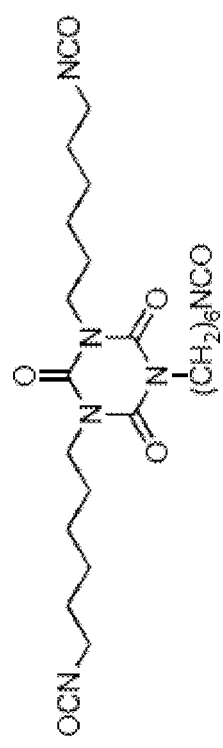
Figure 2:
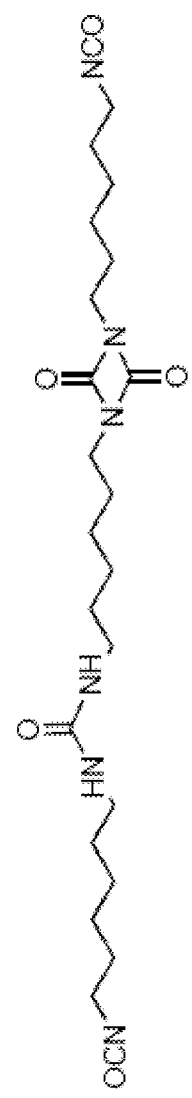
Figure 3:
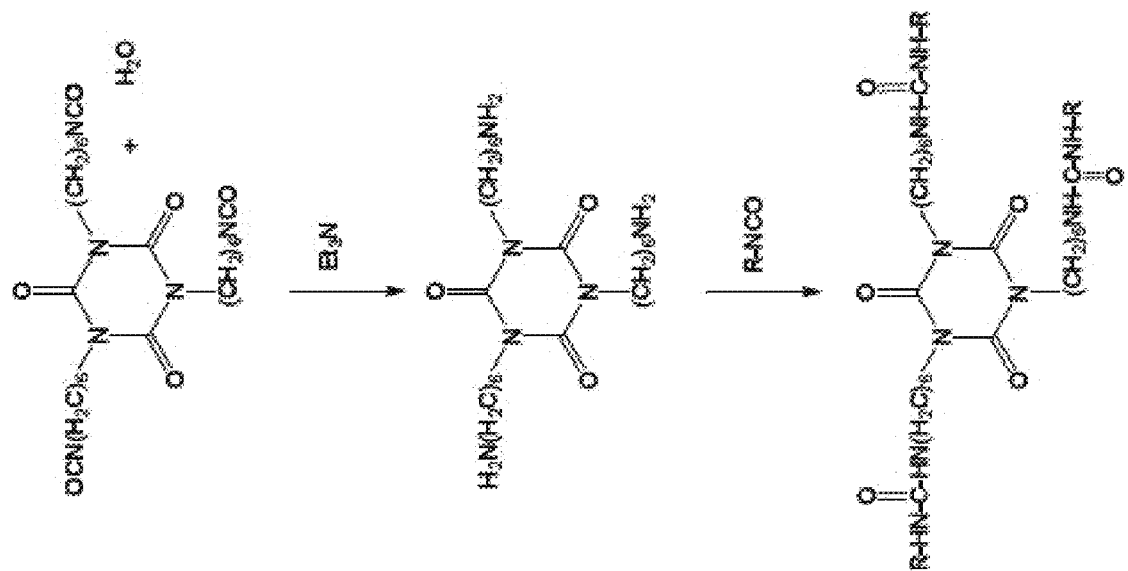
FIG. 3 depicts a reaction resulting in a polyurea aerogel in accordance with some embodiments.

Any appropriate diisocyanate, triisocyanate, or any other isocyanate, may be used as a monomer in forming a three-dimensional porous polyurea network such as a polyurea aerogel. Examples of suitable, yet not limiting, diisocyanate monomers include Desmodur N3200 diisocyanate, toluene diisocyanate (Mondur TDS), and MDI (Mondur CD). Examples of suitable, yet not limiting, triisocyanate monomers include Desmodur N3300A triisocyanate and Desmodur RE triisocyanate. FIG. 2 illustrates examples of isocyanates, such as Desmodur RE (TMT), Desmodur N3300A and Desmodur N3200 (e.g., may be obtained from Bayer Corp.), which may be used as precursors for the preparation of three-dimensional porous polyurea networks (e.g., aerogels). FIG. 3 depicts an example reaction for the preparation of a polyurea aerogel from Desmodur N3300A.

In some embodiments, polyurea aerogels are obtained upon base-catalyzed crosslinking of resorcinol-formaldehyde (RF) wet gels with triisocyanates. The outer surface layer of the porous solid component of the gel may include polyurea formed via an $Et_3N$-catalyzed reaction of triisocyanate with residual water in an acetone or acetonitrile crosslinking bath.

In some embodiments, aerogels are made by reaction of a triisocyanate such as Desmodur N3300A with water in the presence of a catalyst, such as triethylamine in an acetone or acetonitrile solvent. The density and microscopic morphology exhibited by the resulting aerogel may be correlated to the amount of triisocyanate, water, and catalyst utilized in the manufacturing process. In some cases, triisocyanate may be useful as monomers to produce lower density aerogels exhibiting fibrous morphology. Such a result may be due to early phase separation due to low solubility of the three-dimensional polymer arising from the triisocyanate.

In various embodiments, the concentration of catalyst (e.g., $Et_3N$), the concentration of monomer and the concentration of water may be varied to affect different characteristics of polyurea aerogels. For example, to be discussed further below, including an increasing amount of monomer (e.g., isocyanate) will result in a polyurea aerogel having a generally increased bulk density and a decreased percent porosity. Further, in some cases, increasing the amount of catalyst (e.g., $Et_3N$) and water may decrease the overall gelation time of the aerogel. In some cases, varying the concentration of water and trialkylamine added in preparing polyurea aerogels may have an effect on the gelation time, yet no effect on the nanomorphology of the resulting aerogels. However, in some embodiments, varying the concentration of monomer (di- or triisocyanate) may have a direct effect on both the gelation time and the nanomorphology of polyurea aerogels.

Polyureas may result from the reaction of isocyanates with multifunctional nucleophiles such as polyamines. In a similar vein, polyurethanes may result from the reaction of isocyanates with multifunctional nucleophiles such as polyols. High-surface-area polyurethanes as the stationary phase for chromatographic separations may be formed via reaction in $CH_2Cl_2$ of polymeric methylene diphenyl diisocyanate (MDI, e.g., Mondur MR) and a pentafunctional oligomer based on oxypropylation of diethylenetriamine. Such materials are obtained as precipitates rather than gels, however, use of sugar derivatives as polyols and more polar solvents for the reaction medium may yield gels and eventually aerogels. For example, toluene diisocyanate may be used to crosslink and induce pyridine-catalyzed gelation of cellulose acetate and cellulose acetate butyrate acetone solutions. Wet gels may be dried to aerogels with SCF $CO_2$.

In forming gels used in thermal superinsulation applications, a DABCO-catalyzed reaction in DMSO/ethyl acetate mixtures of an MDI derivative (e.g., Lupranat M20S, a BASF product similar to Suprasec DNR by ICI) with saccharose and pentaerythritol may give rise to nanoparticulate polyurethane aerogels where the macro- vs. the mesoporosity are controlled by adjusting the Hildebrand solubility parameter via the DMSO/ethylacetate ratio. Aerogels having lower thermal conductivities than standard polyurethane foams may be formed (0.022 vs. 0.030 W m$^{-1}$ K$^{-1}$, respectively, at room temperature and atmospheric pressure and comparable bulk densities of ~0.2 g cm$^3$). Further, crosslinking of cellulose acetate in acetone with Lupranat M20S isocyanate and dibutyltin laurate as a catalyst results in aerogels that include a natural cellulose product, demonstrating high elastic moduli (in the 200-300 MPa range at bulk densities $\rho_b$ in the range 0.75-0.85 g cm$^{-3}$) and low thermal conductivities ranging from 0.029 W m$^{-1}$ K$^{-1}$ (at atmospheric pressure) to 0.006 W m$^{-1}$ K$^{-1}$ (at $2\times10^{-5}$ mbar) for samples with $\rho_b$ of 0.25 g cm$^{-3}$.

In some embodiments, polyurea aerogels may be synthesized in acetone via $Et_3N$-catalyzed reaction of MDI or polymeric MDI type of isocyanates and triamines. Polyurethane aerogels may be made from similar or the same isocyanates and an ethylene oxide modified polyether polyol (e.g., Multranol 9185). Polyurea aerogels may be nanoparticulate like silica and polyurethane aerogels may be nanofibrous. For various densities (e.g., 0.12-0.13 g cm$^3$), polyurea aerogels may demonstrate lower thermal conductivities than polyurethane aerogels (0.018-0.019 W m$^{-1}$ K$^{-1}$, vs. 0.02+7 W m$^{-1}$ K$^{-1}$, respectively). Both polyurea and polyurethane aerogels, however, may exhibit higher thermal conductivity and density values than that of silica aerogels (0.012 W m$^{-1}$ K$^{-1}$) at 0.09 g cm$^{-3}$.

Polyureas may also be obtained indirectly from isocyanates and water via a reaction sequence that initially yields an amine via an unstable carbamic acid, shown in Reaction (1).

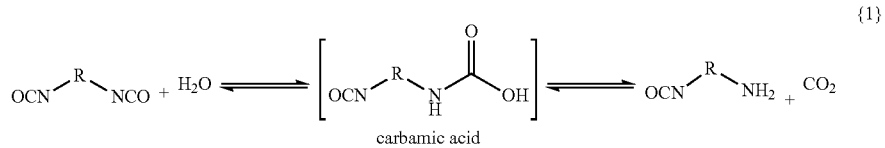

Subsequently, the amine reacts with yet-unreacted isocyanate yielding urea (eq 2).

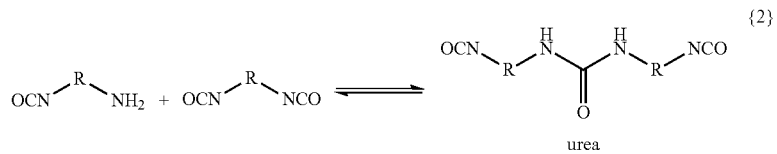

In some instances, Reaction (2) takes place much faster than Reaction (1), because amines are stronger nucleophiles than water. The seq/uence of Reactions (1) and (2) may be used for the environmental curing of films containing unreacted isocyanate groups, while, owing to the $CO_2$ side product generated by the reaction, such reactions may also be involved in the formation of polyurethane foams w/here a small amount of water added in the reaction mixture acts as a foaming agent.

Synthesis of mechanically strong polyurea aerogels via reaction of isocyanates with water, which had not previously been reported before, may be advantageous in that it bypasses the use of expensive amines. In some embodiments, the gelation process may be employed with triisocyanates such as Desmodur N3300A or Desmodur RE yielding polyurea monoliths over a wide density range (e.g., 0.016-0.55 g cm$^{-3}$). Diisocyanates such as Desmodur N3200, toluene diisocyanate (TDI), or monomeric MDI may also gel at higher concentrations. In some instances, however, polyurea aerogels produced from triisocyanates may exhibit more robust characteristics than polyurea aerogels prepared from diisocyanates.

Aerogels derived from triisocyanates such as Desmodur N3300A may not only exhibit variable nanomorphologies that are tunable as a function of density, but such aerogels may also exhibit exceptional mechanical properties which are comparable to those of x-aerogels. X-aerogels, methods of manufacture, and their use are described in U.S. Pat. No. 7,771,609 entitled "Methods and Compositions for Preparing Silica Aerogels" and is incorporated herein by reference by its entirety.

Figure 4A:
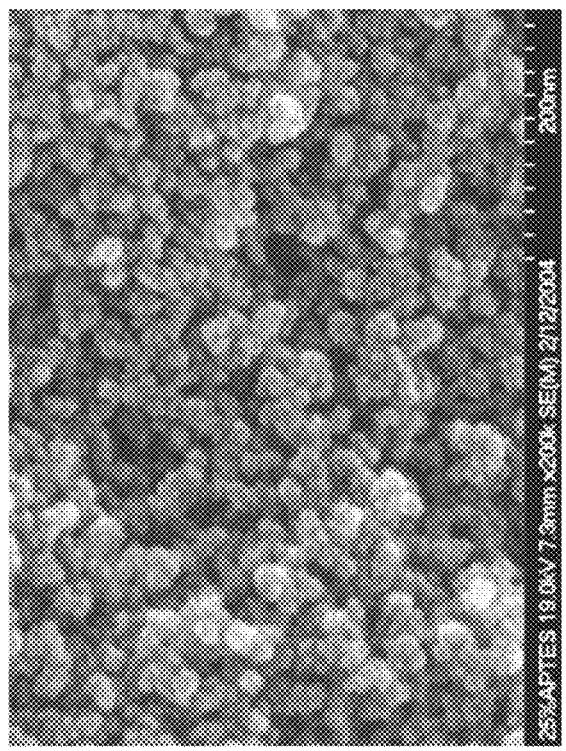
FIG. 4a shows a scanning electron microscope (SEM) image of silica nanoparticles prior to application of a conformal coating.
Figure 4B:
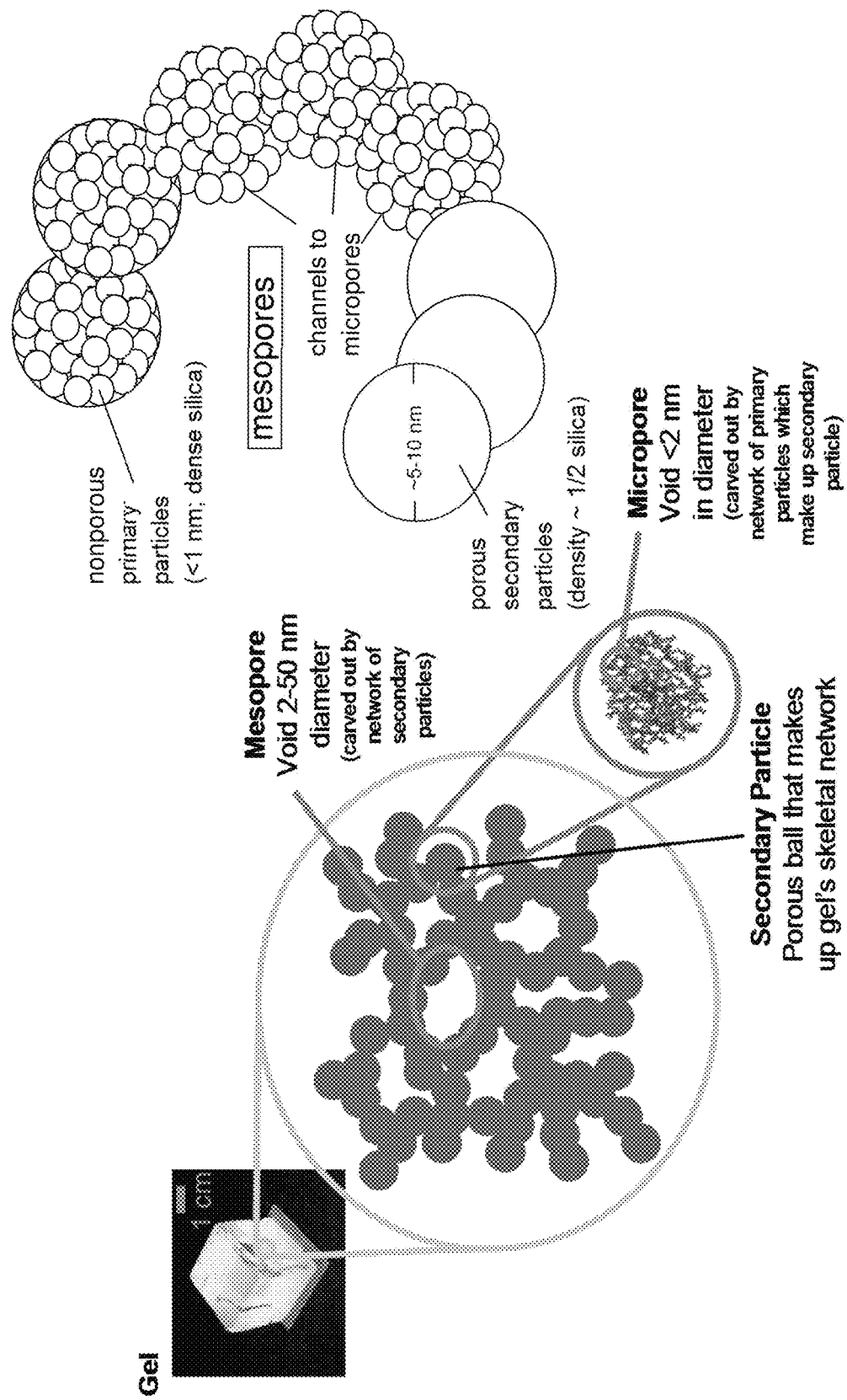
FIG. 4b illustrates a schematic representation of silica in accordance with some embodiments.

FIGS. 4a and 4b respectively depict a SEM image and a schematic representation of an example of silica nanoparticles connected together prior to cross-linking of the silica nanoparticles, that is, prior to application of a conformal coating to the nanoparticles. Porous secondary particles having a diameter of between about 5-10 nm are made up of nonporous primary particles having a diameter of less than about 1 nm. While the primary particles are arranged in a manner that forms micropores within the secondary particles, larger mesopores arise through the arrangement of secondary particles relative to one another. In the example shown in FIG. 4a, before cross-linking takes place, the density of the composition was measured to be approximately 0.18 g/cc. FIG. 4b illustrates a silica nanoparticle network in the form of an aerogel that includes mesopores having voids that are between 2-50 nm in diameter between secondary particles. Primary particles include voids that are less than 2 nm in diameter.

Figure 5B:
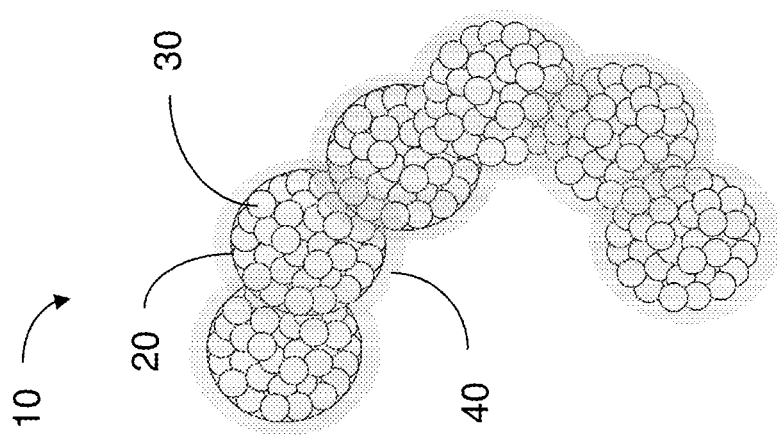
FIG. 5b illustrates a schematic representation of silica nanoparticles having a conformal coating applied.
Figure 5A:
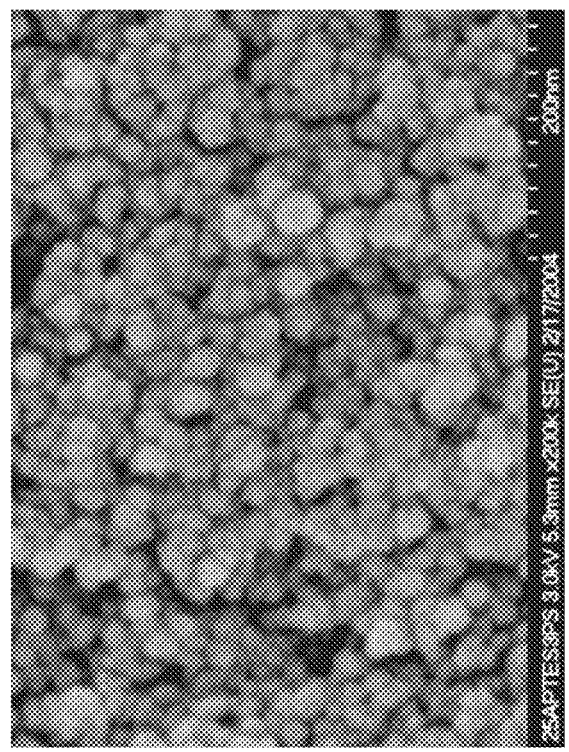
FIG. 5a shows an SEM image of silica nanoparticles having a conformal coating applied.
Figure 6:
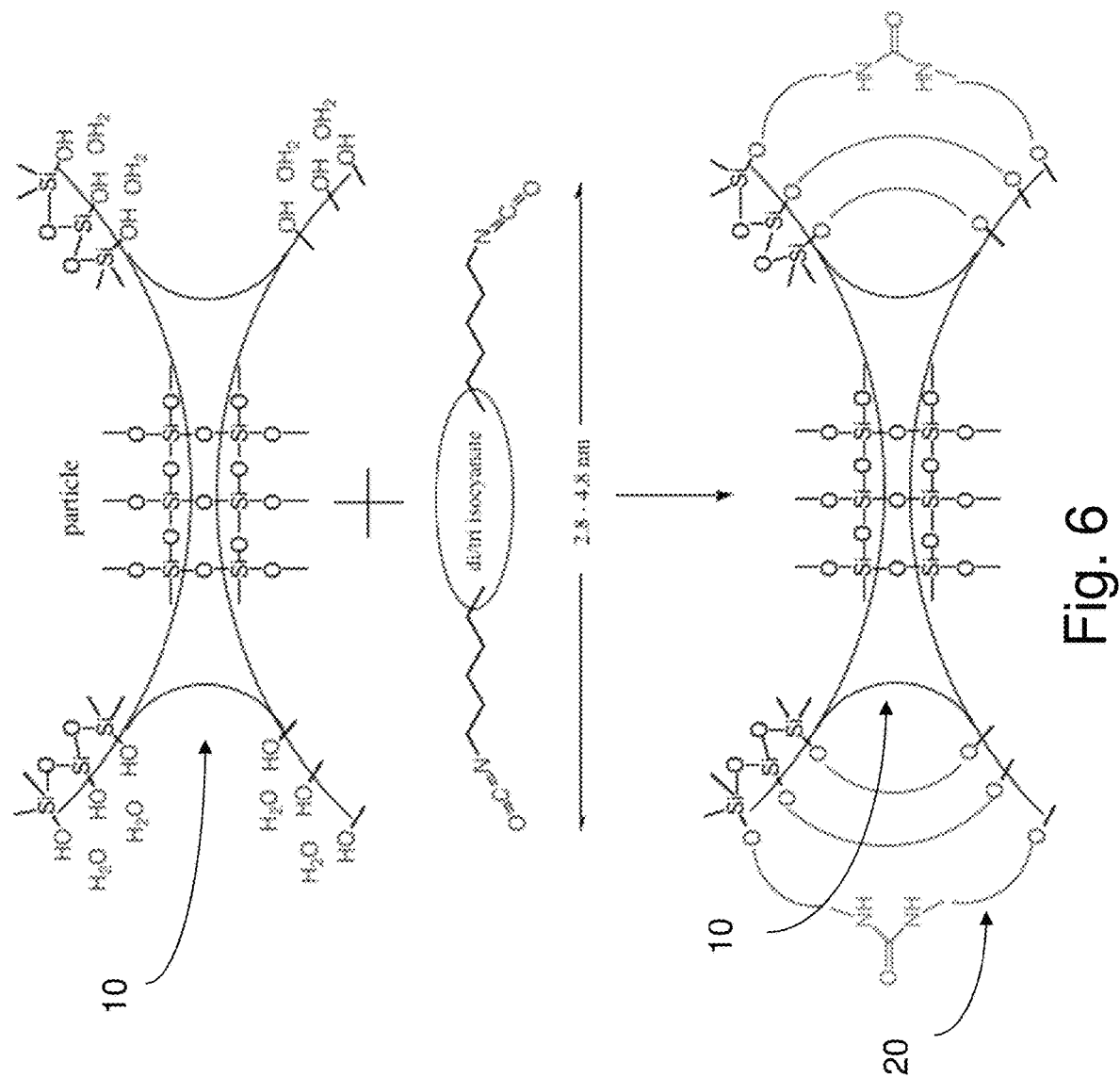
FIG. 6 depicts a schematic representation of a reaction where reinforcement is applied to interparticle necks of silica nanoparticles in accordance with some embodiments.

FIGS. 5a and 5b respectively show a SEM image and a schematic representation of cross-linked silica nanoparticles having a conformal coating applied on to surfaces of the silica nanoparticles. After cross-linking of the nanoparticles, the conformal coating effectively covers the micropores between primary particles and within secondary particles. Additionally, the conformal coating forms thick necks between secondary particles, giving rise to an increased overall mechanical strength. In the example shown in FIG. 5a, after cross-linking, the density of the composition was measured to be approximately 0.45 g/cc. In some embodiments, as illustrated in the schematic representation of FIG. 6, upon application of an isocyanate (e.g., diisocyanate, triisocyanate), the interparticle necks 10 are reinforced with polyurea tethers 20, resulting in a general strengthening of the overall composition.

Aerogels derived from triisocyanates such as Desmodur RE may provide for a high-yield conversion to carbon aerogels. Carbon aerogels derived from diisocyanates such as Desmodur N3200 may also be produced.

As discussed further below, such materials may exhibit a significant degree of versatility and multifunctionality. For example, aerogels having density-gradient monoliths may include a high-density nanoparticulate end that combines high mechanical strength with flame retardancy.

Figure 7:
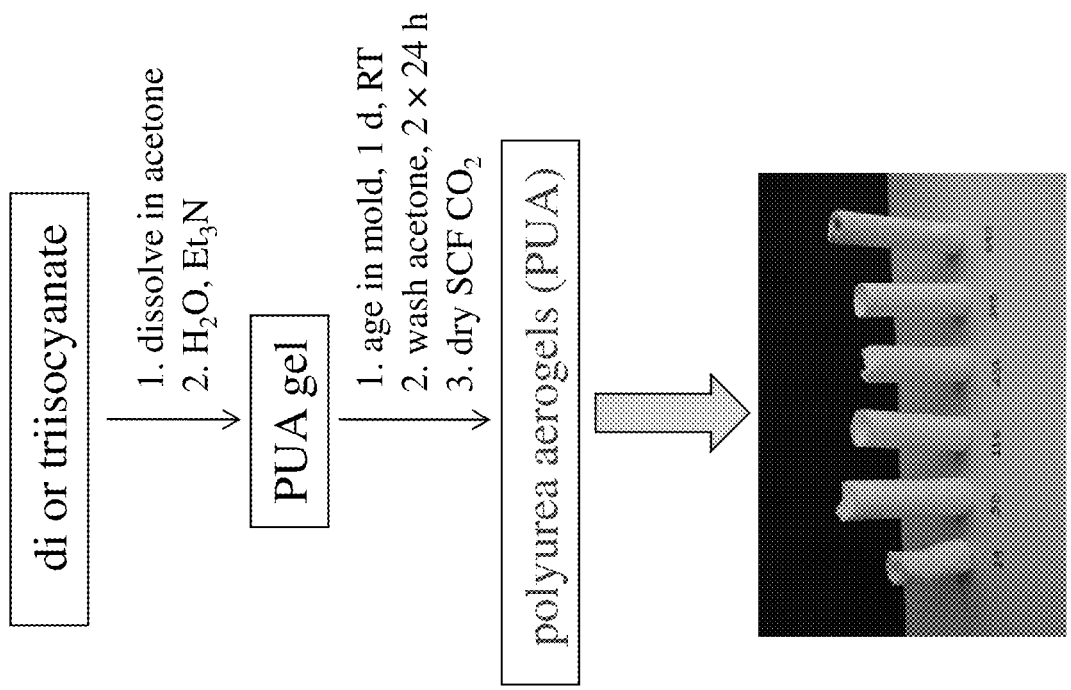
FIG. 7 shows a flow chart of the preparation of a polyurea aerogel in accordance with some embodiments.
Figure 8:
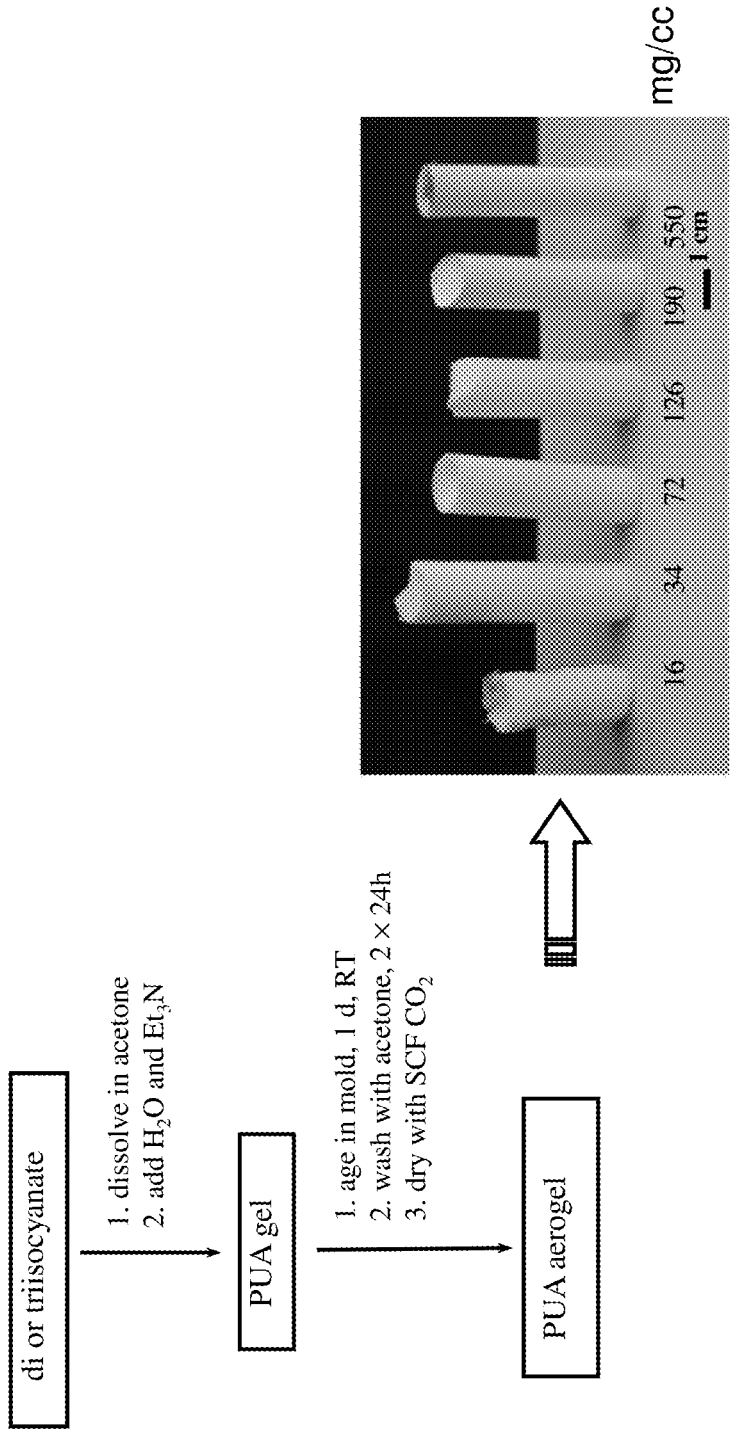
FIG. 8 shows another flow chart of the preparation of a polyurea aerogel in accordance with some embodiments.

FIGS. 7 and 8 illustrates examples of suitable steps that may be used to prepare various polyurea aerogels, the steps being described below. Polyurea aerogels of different densities may be prepared by varying the concentration of the monomer in the initial mixture for forming the aerogel. In some embodiments, a diisocyanate or triisocyanate monomer is dissolved in a suitable solvent, such as acetone or DMSO. An appropriate amount of water is subsequently added and a sol-like material is formed by adding a trialkylamine to the mixture. Any suitable trialkylamine may be used, such as for example, trimethylamine, triethylamine, tributylamine, tripentylamine, and so on. The mixture may be agitated (e.g., shaken vigorously, sonicated, mixed) to form a gel and allowed to set in a mold for an appropriate gelation time. Gelation times may vary, for example, between 5 minutes and 24 hours. Gelation times may depend on the concentration of the monomer, water and the catalyst. Generally, gelation times will be lower at higher concentrations of all three materials. As a note, previous reports had not considered use of water in forming a polyurea aerogel. As a further note, previous reports had not been able to induce a fibrous morphology in polyurea aerogel, nor control its flammability.

After allowed to age, gels are removed from their molds and subject to a process of solvent exchange. In some embodiments, solvent exchange involves contacting or immersing the gel in an aprotic solvent, such as for example, acetone, pentane, or acetonitrile. Such solvents may enable the formation of $CO_2$-containing voids in the overall composition. However, it can be appreciated that any suitable solvent may be utilized. Solvent exchange may be performed a number of times prior to drying of the sol-gel, for example, with supercritical $CO_2$ to form an aerogel. In some cases, the gel may be dried at an elevated temperature (e.g., 40° C.) under ambient pressure. In some embodiments, supercritical drying is conducted in an autoclave where the temperature of the autoclave is raised above the critical point of $CO_2$ and the pressure is released isothermally (e.g., at 40° C.). In other embodiments, subcritical drying is used to dry the sol-gel material, forming the aerogel.

Figure 9:
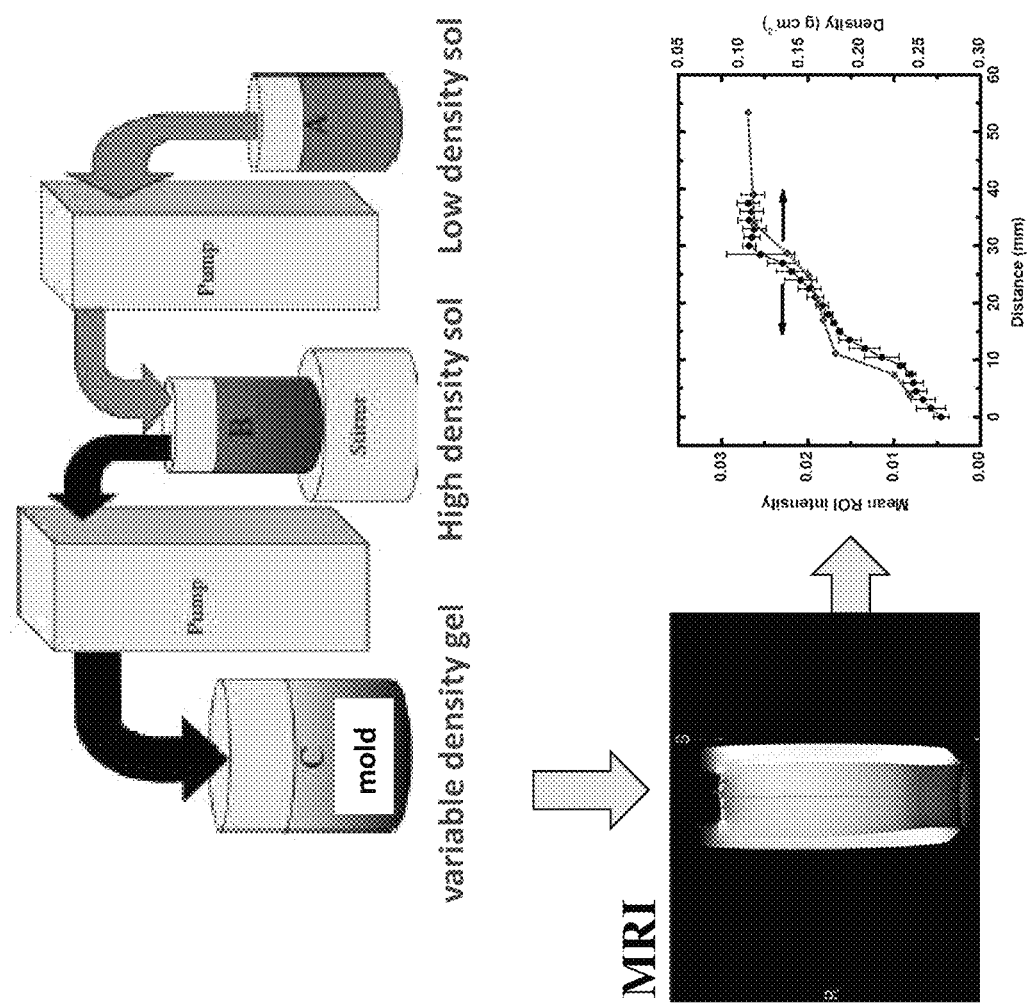
FIG. 9 depicts a system used for preparation of a polyurea aerogel and the results obtained in the preparation in accordance with some embodiments.
Figure 10:
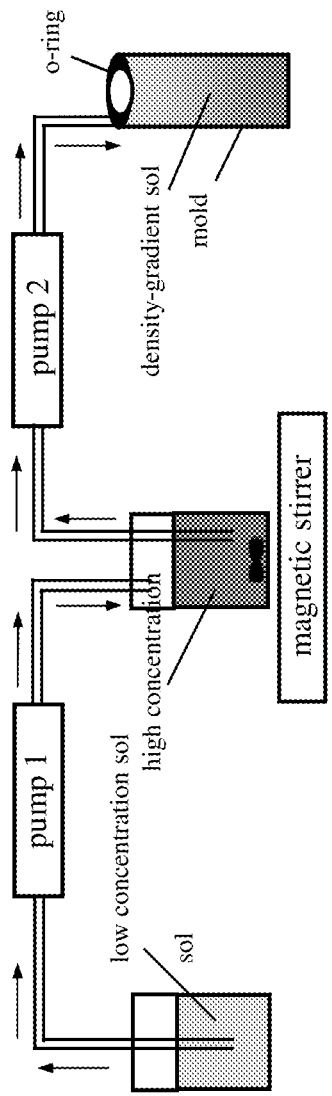
FIG. 10 illustrates a schematic representation of a system for preparing density-gradient polyurea wet gels in accordance with some embodiments.

In some embodiments, and as shown in FIGS. 9 and 10, variable density polyurea aerogels may be synthesized by beginning to fill a mold with a high concentration of sol using an appropriate pump and constantly diluting the sample with a low concentration sol using a second pump. As shown in FIG. 8, high density sol (e.g., initially 0.2969 M) is pumped continuously from container B to container C. However, low density sol (e.g., 0.1084 M) is simultaneously being pumped from container A to container B so as to dilute the composition in container B. As a result, the resulting sol-like material in container C may became hazy and gelled progressively from one end to the other (e.g., from the bottom up). The illustrations at the bottom of FIG. 9 both show a gradient in density and transmittance (mean ROI intensity) from one end of the gel to the opposite end.

Further, and as discussed, carbon aerogels may be produced by subjecting polyurea aerogels described herein to an additional step of pyrolysis. In some embodiments, a polyurea aerogel is placed in an inert atmosphere (e.g., Ar) at a high temperature (e.g., 800° C.), yielding an aerogel having a carbon skeleton. In some embodiments, the skeleton of the carbon aerogel is made of purely carbon material. In some embodiments, carbon aerogels formed by methods discussed may exhibit a fibrous morphology. For example, pyrolyzing a polyurea aerogel having a fibrous morphology (e.g., low-density) may result in a carbon aerogel also having a fibrous morphology. Depending on various parameters, carbon aerogels may exhibit a particulate morphology. For example, pyrolyzing a polyurea aerogel having a particulate morphology (e.g., high-density) may give rise to a carbon aerogel that has a similar particulate morphology. Carbon aerogels may also contain electrically conductive characteristics.

Figure 33:
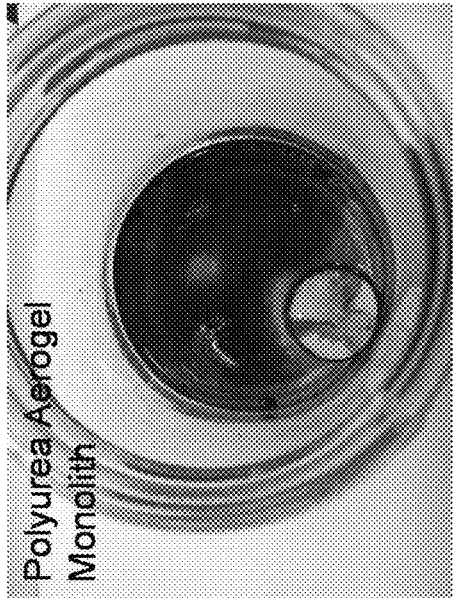
FIG. 33 shows an example of a polyurea aerogel used to absorb crude oil in accordance with some embodiments.
Figure 33:
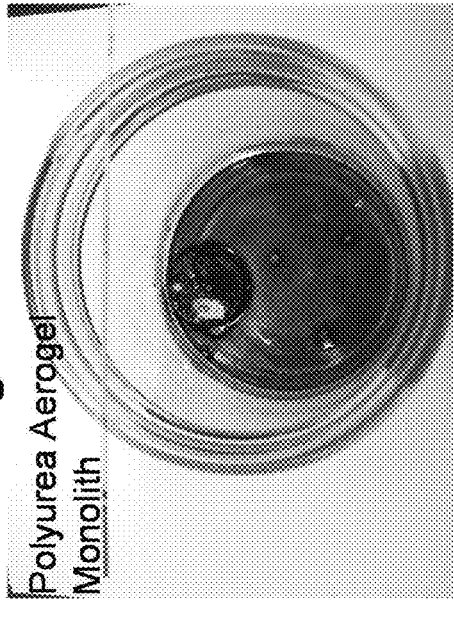
Figure 33:
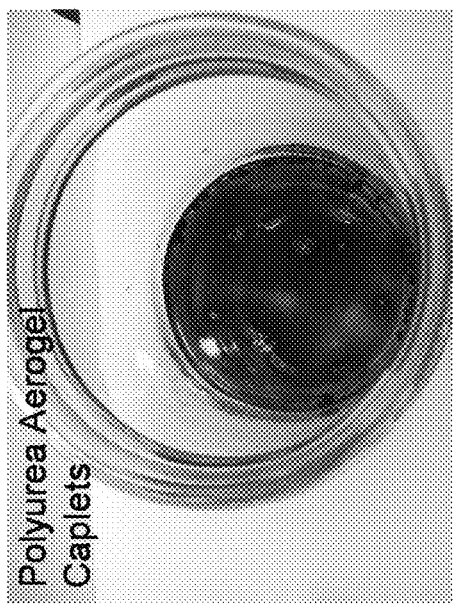
Figure 33:
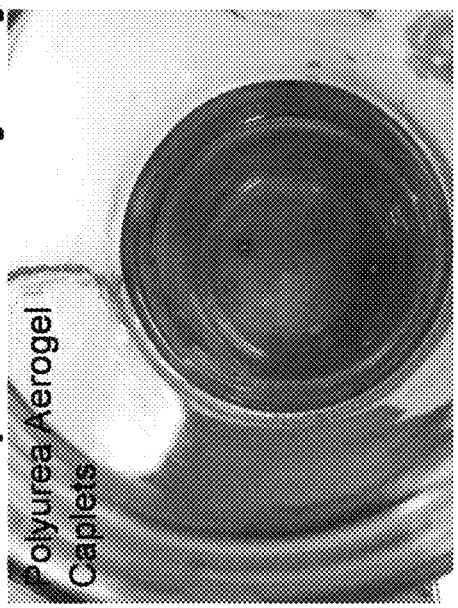

Three-dimensional porous polyurea and carbon networks (e.g., aerogels) discussed may be suitable for use in a number of applications. Aerogels may generally be used for applications including thermal insulation (e.g., architectural, automotive industrial applications, aircraft, spacecraft, clothing), acoustic insulation (e.g., buildings, automobiles, aircrafts), dielectrics (e.g., for fast electronics), supports for catalysts, and as hosts of functional guests for chemical, electronic and optical applications. In some cases, three-dimensional porous polyurea networks including polyurea aerogels may be useful for applications that involve, for example, manufacture of super insulating materials, lightweight structures, impact dampeners and nonflammable materials. Three-dimensional porous polyurea networks including polyurea aerogels may be useful in applications that involve, for example, absorption of oil or other hydrophobic materials. In some instances, such materials may be capable of absorbing 5, 15, 20, 25, or more times their weight in oil or other hydrophobic material, as illustratively shown in FIG. 33. In FIG. 33, a polyurea aerogel is added to container that includes Lousiana crude oil on water and after 5 minutes, absorption of the oil is noticeably visible. In some instances, the majority of the substance absorbed may be retrieved by any suitable chemical and/or mechanical method. In some instances, three-dimensional porous carbon networks including carbon aerogels may also be useful for a number of applications including, for example, manufacture of electrodes, batteries, supercapacitors, high-temperature insulators, high temperature ballistics materials, ablative materials, and infrared-blocking armor.

EXAMPLES

Polyurea aerogels were prepared from monomers of Desmodur N3300A triisocyanate, Desmodur RE triisocyanate, Desmodur N3200 diisocyanate, toluene diisocyanate (Mondur TDS) and MDI (Mondur CD), obtained from Bayer Corporation. Desmodur RE was supplied as a solution in ethyl acetate, which was removed with a rotary evaporator before use. Anhydrous acetone was produced from lower grade solvent by distilling over $P_2O_5$. Triethylamine (99% pure) was purchased from ACROS and was distilled before use.

Figure 11:
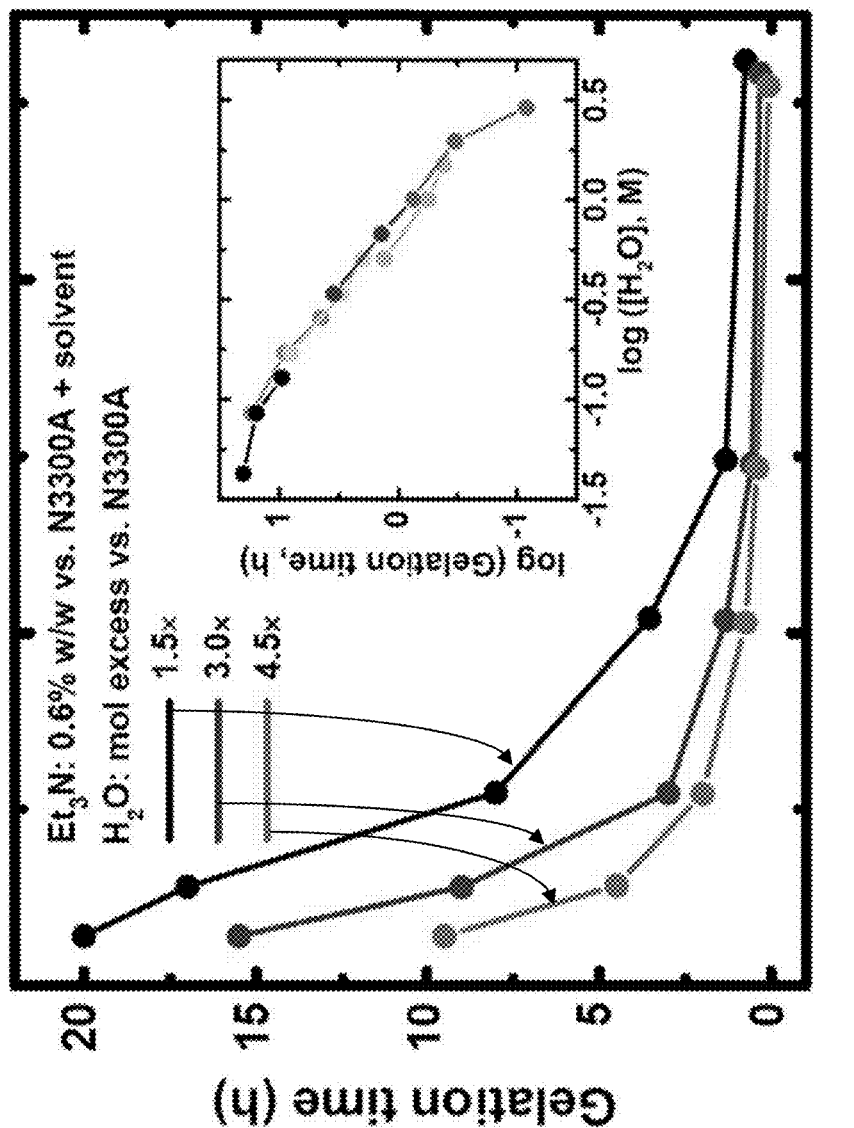
FIG. 11 shows gelation time data of a polyurea aerogel prepared with Desmodur N3300A in accordance with some embodiments.
Figure 12:
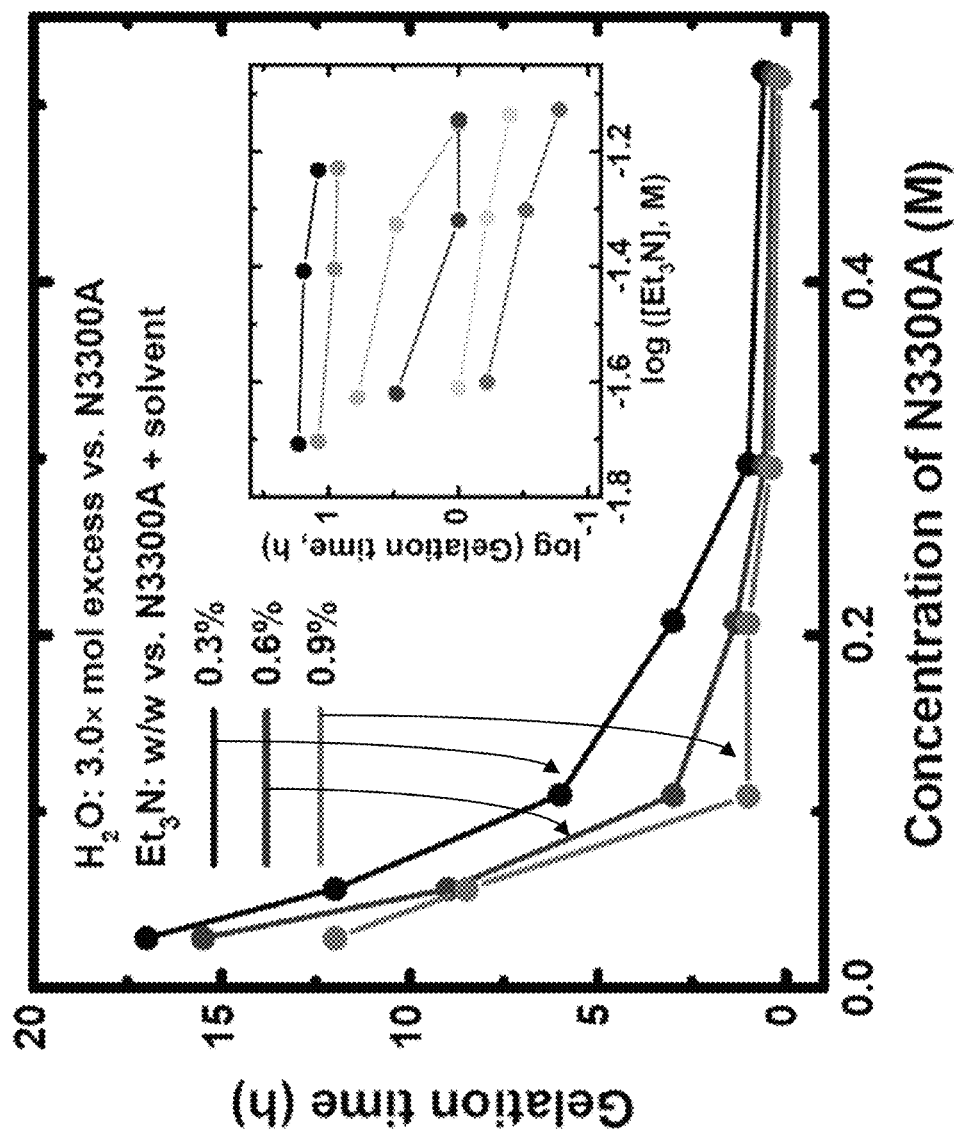
FIG. 12 shows more gelation time data of a polyurea aerogel prepared with Desmodur N3300A in accordance with some embodiments.
Figures 13A, 13B:
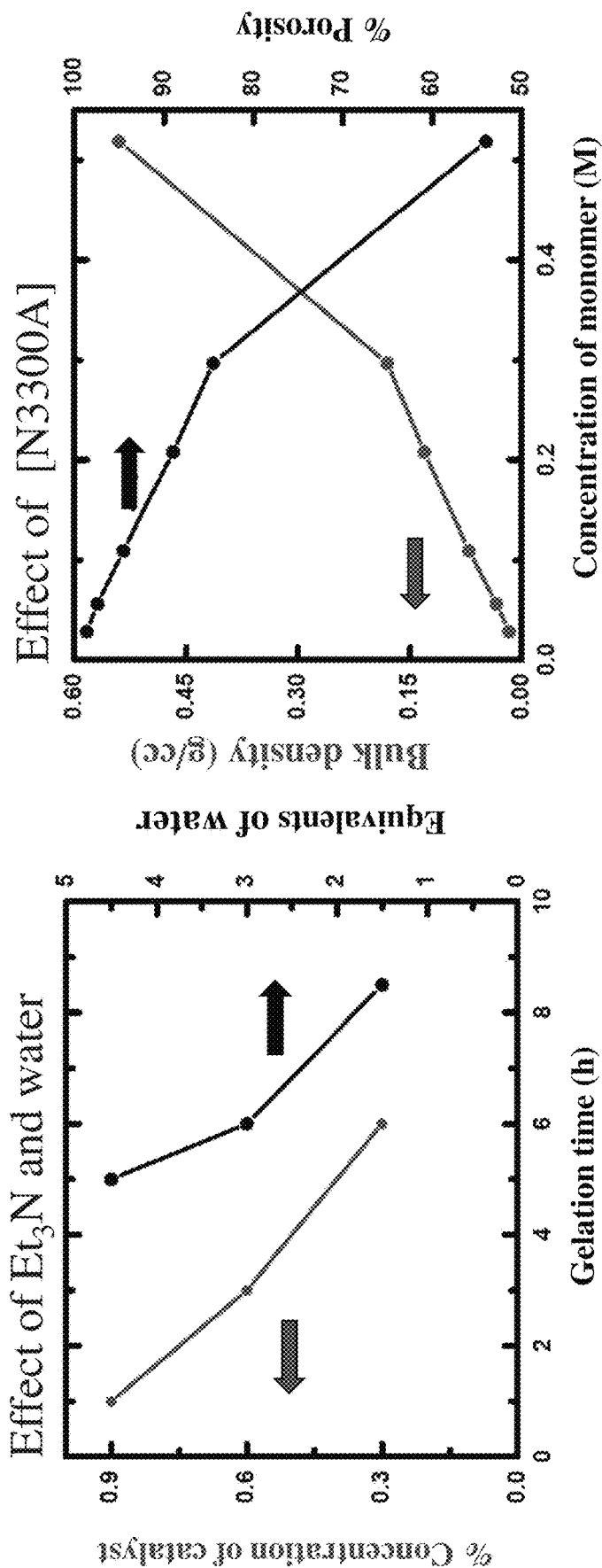
FIG. 13a depicts a graph of percent concentration of catalyst and equivalence of water as a function of gelation time of a polyurea aerogel in accordance with some embodiments.
FIG. 13b shows a graph of bulk density and percent porosity as a function of concentration of monomer in accordance with some embodiments.
Figures 14A, 14B:
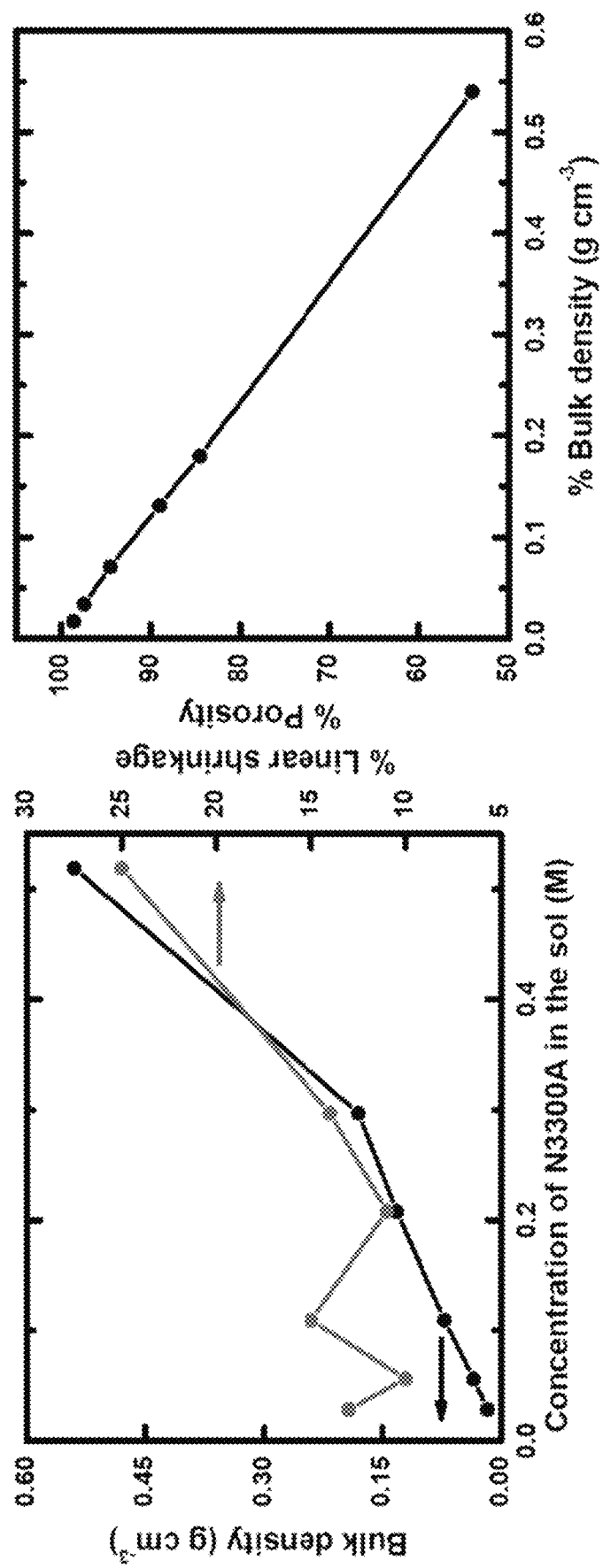
FIG. 14a depicts a graph of bulk density and percent linear shrinkage as a function of concentration of N3300A in the sol in accordance with some embodiments.
FIG. 14b illustrates a graph of percent porosity as a function of percent bulk density in accordance with some embodiments.

Polyurea aerogels of different densities were prepared by varying the concentration of the monomer by dissolving samples of Desmodur N3300A in amounts of 1.375 g, 2.75 g, 5.5 g, 11.0 g, 16.5 g and 33 g in constant volume (94 mL) of dry acetone. Subsequently, for each monomer concentration, separate amounts of water at 1.5, 3.0, and 4.5 mol equivalents was added, and sols were obtained by adding triethylamine at 0.3%, 0.6% and 0.9% w/w relative to the total weight of the isocyanate monomer plus solvent. The final N3300A monomer concentrations were approximately 0.029 M, 0.056 M, 0.11 M, 0.21 M, 0.30 M, and 0.52 M. Thus, in one example, 1.375 g (0.0028 mol) of N3300A was dissolved in 94 mL of dry acetone, 1.5 mol equivalents of water (0.073 mL, 0.0042 mol) was added on top and finally the sol was obtained by adding 0.26 mL of triethylamine (0.3% w/w as defined above). The sol was shaken vigorously and was then poured into polypropylene syringes used as molds (AirTite Norm-Ject syringes without needles purchased from Fisher, Part No. 14-817-31, 1.40 mm I.D.). The top part of the syringes were cut off with a razor blade and, after the syringes were filled with the sol, they were covered with multiple layers of Parafilm and solutions were left to gel for approximately 24 h. FIG. 11 depicts a graph of gelation time for the polyurea aerogels prepared with Desmodur N3300A for water at 1.5, 3.0, and 4.5 mol equivalents with triethylamine added at 0.6% w/w relative to the total weight of the isocyanate monomer plus solvent. Further, FIG. 12 depicts a graph of gelation time for the polyurea aerogels prepared with Desmodur N3300A for triethylamine was added at 0.3%, 0.6%, and 0.9% w/w relative to the total weight of the isocyanate monomer plus solvent with water added at 3.0 mol equivalent. The effects of the concentration of triethylamine and water on the gelation time are shown in FIG. 13a. In addition, FIG. 13b illustrates the effects of the concentration of Desmodur N3300A on the gelation time. FIGS. 14a and 14b depict further effects that depend on the concentration of Desmodur N3300A in the sol.

For comparison, gels with other isocyanates (Desmodur RE, Desmodur N3200 and Mondur TDS) were made by varying the amount of the monomer in such a way that the final molar concentrations of the monomers in the sols would be equal to those used for N3300A. For Desmodur RE triisocyanate, it was possible to obtain gels over the entire concentration range used with Desmodur N3300A. Gels from Desmodur N3200 and Mondur TDS were obtained for monomer concentrations above ~0.20 M. Formulations and gelation times are summarized in Tables 4-11. Gels were aged for a day. Subsequently, gels were removed from their molds and were placed individually into fresh acetone ~4× the volume of each gel. The solvent was exchanged two more times, every 24 h. Finally, wet gels were dried into polyurea aerogels with $CO_2$ extracted supercritically. Alternatively, xerogels are obtained by ambient drying of acetone-filled wet gels, while aerogel-like materials are obtained from the two highest density samples (those made with [N3300A] at 0.3 or 0.5 M) by exchanging acetone with pentane (4 washes), followed by drying at 40° C. under ambient pressure.

Variable density polyurea aerogels were synthesized using a system similar to that shown in FIGS. 9 and 10 by filling a syringe mold as above using a pump with a high concentration of sol (e.g., [N3300A]=0.52 M), which is continuously diluted using a second pump with a low concentration sol. The resulting sols became hazy and gelled progressively from the bottom up. The resulting gels were removed from the molds and were processed as the uniform density samples. The variable density was confirmed with NMR imaging (MRI) and direct measurement. Samples were tested for flammability, ignited from the low-density end, as described further below.

Drying with SCF $CO_2$ was conducted in an autoclave (SPI-DRY Jumbo Critical Point Dryer, SPI Supplies, Inc., West Chester, Pa.). Samples submerged in the last wash solvent were loaded in the autoclave and were extracted at 14° C. with liquid $CO_2$ until no more solvent (acetone) came out. Then the temperature of the autoclave was raised above the critical point of $CO_2$ (31.1° C., 73.8 bar), and the pressure was released isothermally at 40° C. All dry gels were in cylindrical form so that bulk (envelope) densities ($\rho_b$) were determined from their mass and volume, which in turn was determined from the geometric dimensions of each sample.

Skeletal densities ($\rho_s$) were determined using helium pycnometry with a Micromeritics AcuuPyc II 1340 instrument. Porosities, Π, were determined from the $\rho_b$ and $\rho_s$ values according to: $P=100\times[(1/\rho_b)-(1/\rho_s)]/(1/\rho_b)$. Surface areas (σ) were measured by nitrogen sorption porosimetry using a Micromeritics ASAP 2020 Surface Area and Pore Distribution Analyzer. Samples for surface area and skeletal density determinations were outgassed for 24 h at 80° C. under vacuum before analysis. Polyurea aerogels were characterized chemically by infrared spectroscopy (IR) in KBr compressed pellets using a Nicolet-FTIR Model 750 Spectrometer, and by solids $^{13}C$ NMR spectroscopy with samples ground in fine powders on a Bruker Avance 300 Spectrometer with 75.475 MHz carbon frequency using magic angle spinning (at 7 kHz), 7 mm rotors, broad band proton suppression, and the CPMAS TOSS pulse sequence for spin sideband suppression. The operating frequency for $^{13}C$ was 75.483 MHz. $^{13}C$ NMR spectra were externally referenced to the carbonyl of glycine (176.03 ppm relative to tetramethylsilane). SEM was conducted with samples coated with Au—Pd using a Hitachi S-4700 field emission microscope. The crystallinity of the polyurea samples was determined by x-ray diffraction (XRD) using a Scintag 2000 diffractometer with Cu Kα radiation and a proportional counter detector equipped with a flat graphite monochromator. The identity of the fundamental building blocks of the two materials was probed with small angle neutron scattering (SANS) using ~2 mm thick discs cut with a diamond saw from cylinders, on a time of flight, low-Q diffractometer, LQD, at the Manuel Lujan Jr. Scattering Center of the Los Alamos National Laboratory. The scattering data were reported in the absolute units of differential cross section per unit volume ($cm^{-1}$) as a function of Q, the momentum transferred during a scattering event. Thermogravimetric analysis TGA was conducted under $N_2$, with a TA Instruments Model 2920 apparatus at a heating rate of 10° C./min. Quasistatic mechanical characterization (compression testing) was conducted according to the ASTM D695-02a standard on cylindrical specimens, using a MTS machine (Model 810) equipped with a 55000 lb load cell, as described previously. According to that ASTM standard, the height-to-diameter ratio of the specimen should be 2:1; typical samples were ~1.3 cm in diameter, ~2.6 cm long.

Figure 15B:
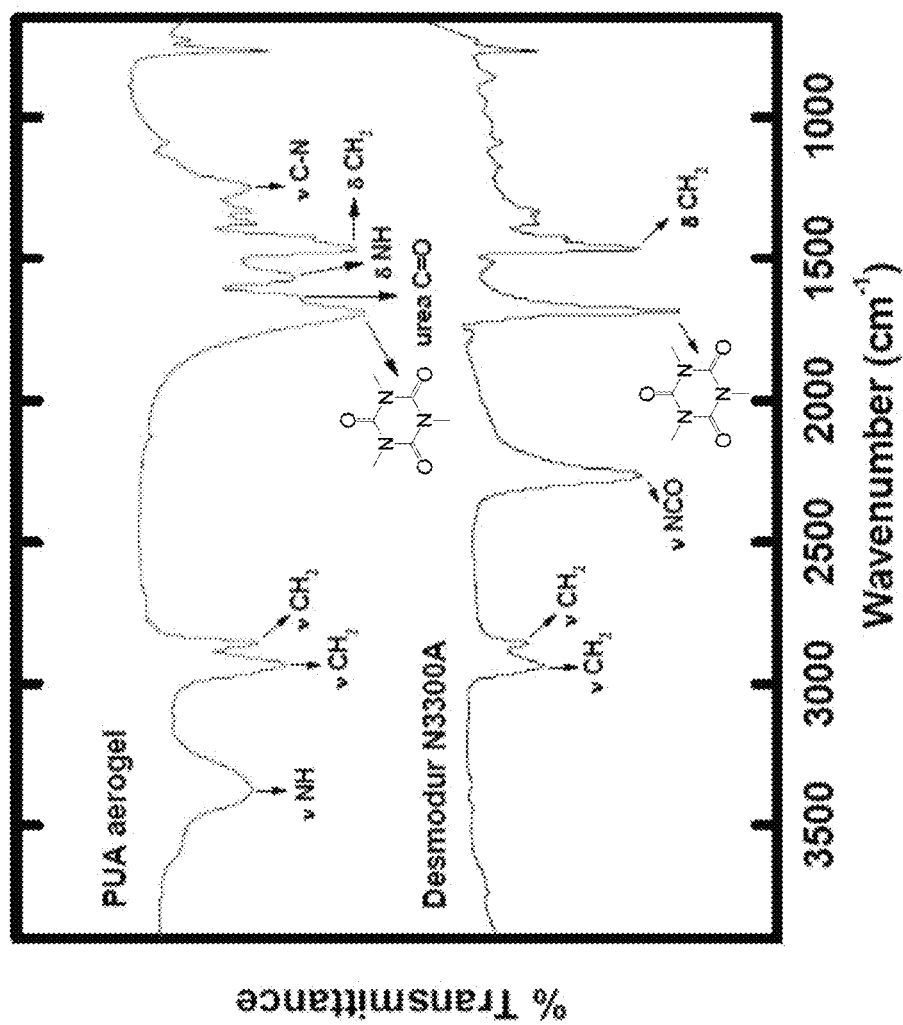
FIG. 15b illustrates infrared (IR) spectra of a polyurea aerogel and desmodur N3300A in accordance with some embodiments.
Figure 15A:
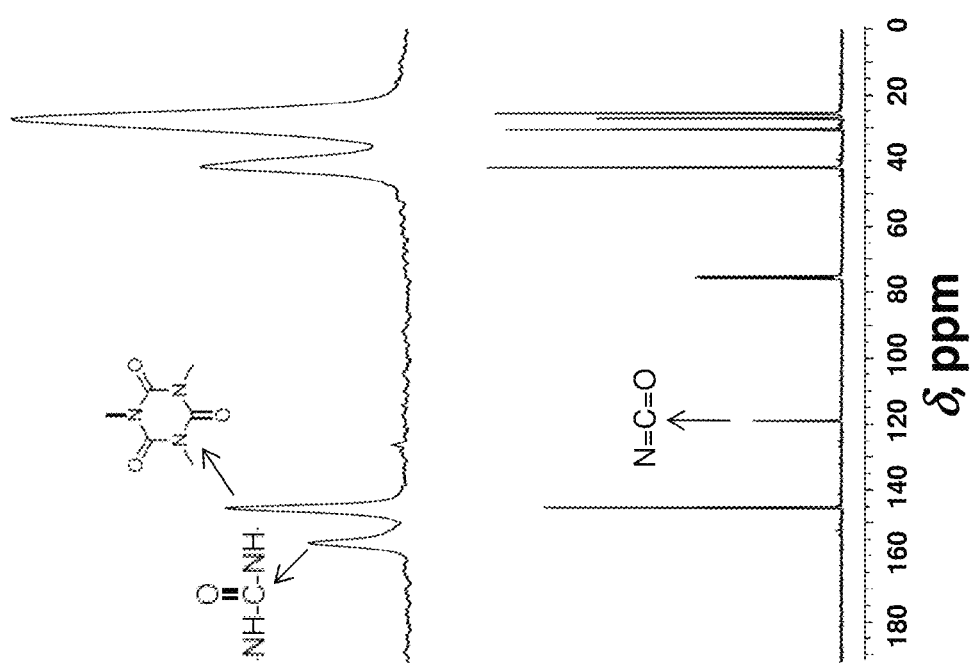
FIG. 15a shows nuclear magnetic resonance (NMR) spectra of a polyurea aerogel and desmodur N3300A in accordance with some embodiments.

FIGS. 15a and 15b show NMR spectra and IR spectra confirming the reaction of isocyanate and formation of polyurea aerogels. IR spectra of Desmodur N3300A versus PUA aerogels illustrate complete reaction of the isocyanate by the disappearance of the isocyanate stretch at ~2500 $cm^{-1}$, and formation of the —NH and carbonyl stretches at ~3300 $cm^{-1}$ and ~1700 $cm^{-1}$ (shoulder), respectively. $^{13}C$ NMR spectra of N3300A versus PUA aerogels confirm formation of PUA by the disappearance of the N=C=O resonance at 121 ppm, and the appearance of the urea C=O resonance at 159 ppm.

Figure 16:
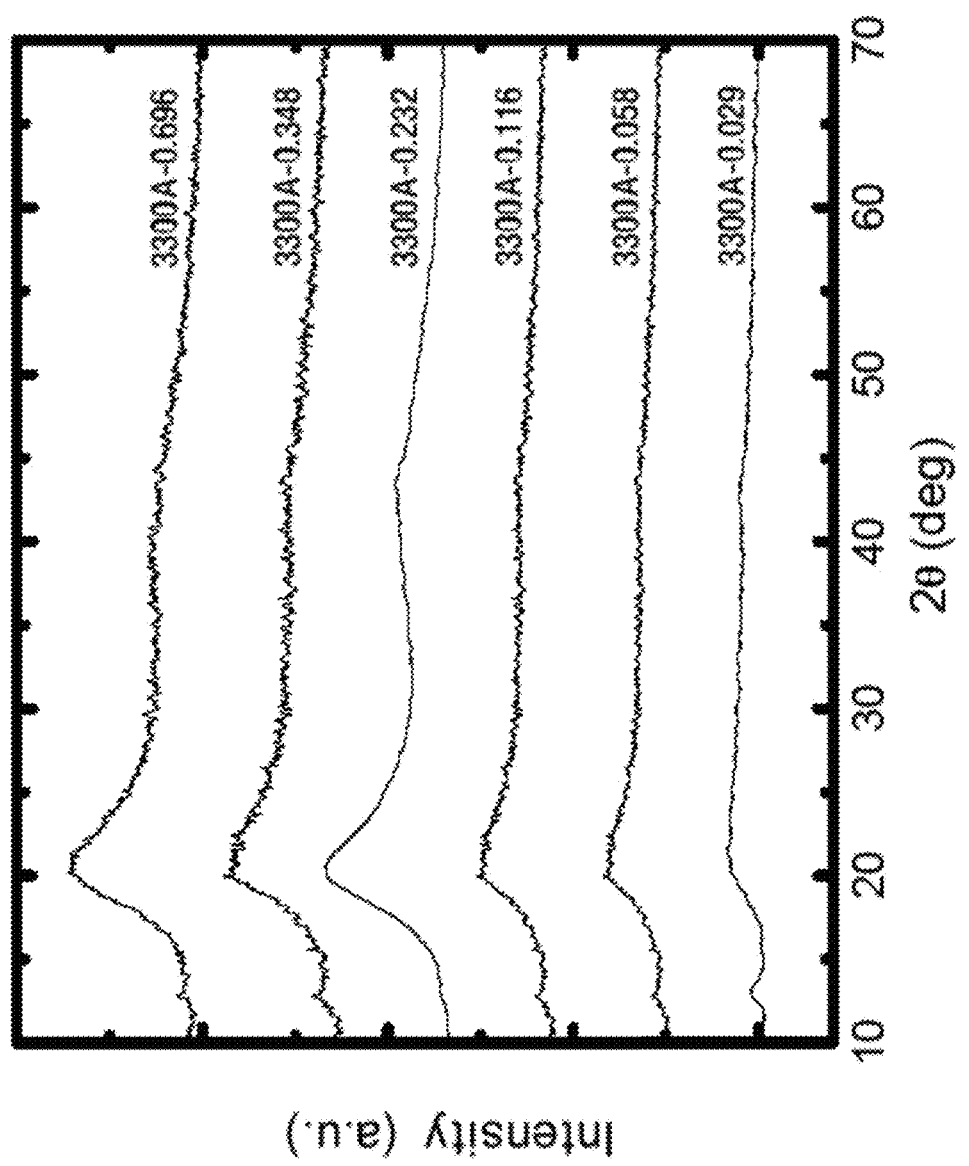
FIG. 16 depicts x-ray diffraction (XRD) data of polyurea aerogels exhibiting increasing crystallinity with increasing density in accordance with some embodiments.
Figure 17:
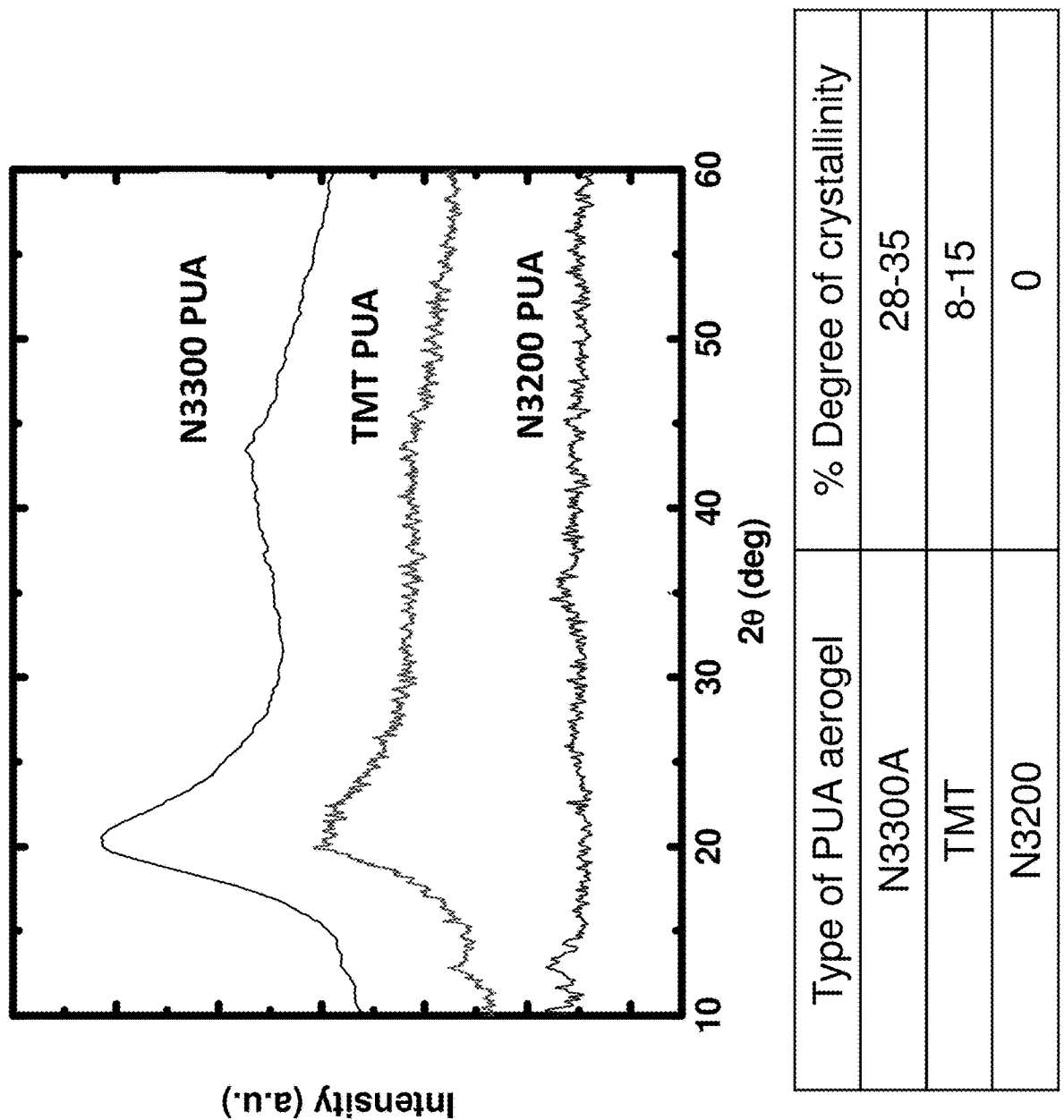
FIG. 17 depicts XRD data of polyurea aerogels prepared in accordance with some embodiments.

FIG. 16 depicts an XRD analysis of polyurea aerogels showing increasing crystallinity as a function of increasing density, also illustrating the molarity of monomer as well. FIG. 17 shows an XRD analysis of polyurea aerogels prepared with different monomers and the respective degree of crystallinity. By XRD, the degree of crystallinity of PUA aerogels prepared from Desmodur N3300A is 35%, but PUA aerogels prepared from Desmodur N3200 and TMT showed almost no crystallinity. This is most probably related to the particulate nanomorphology of those samples.

Figures 18A, 18B:
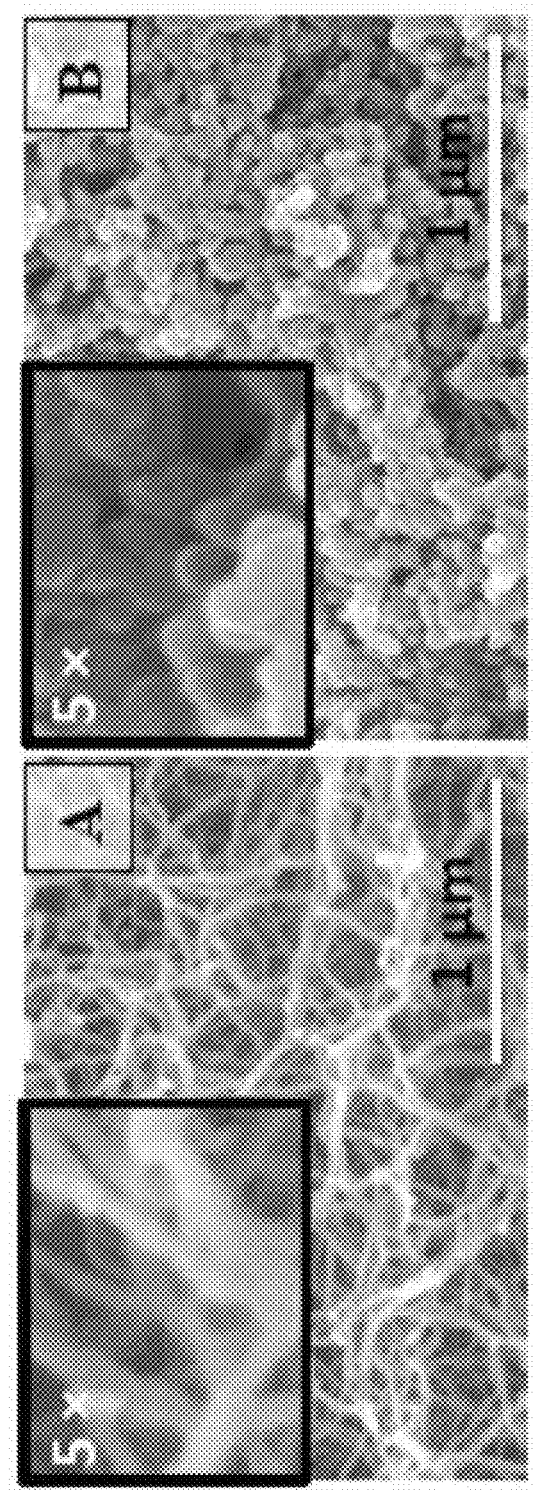
FIG. 18a shows a SEM image of a low density polyurea aerogel in accordance with some embodiments.
FIG. 18b shows a SEM image of a high density polyurea aerogel in accordance with some embodiments.
Figure 19:
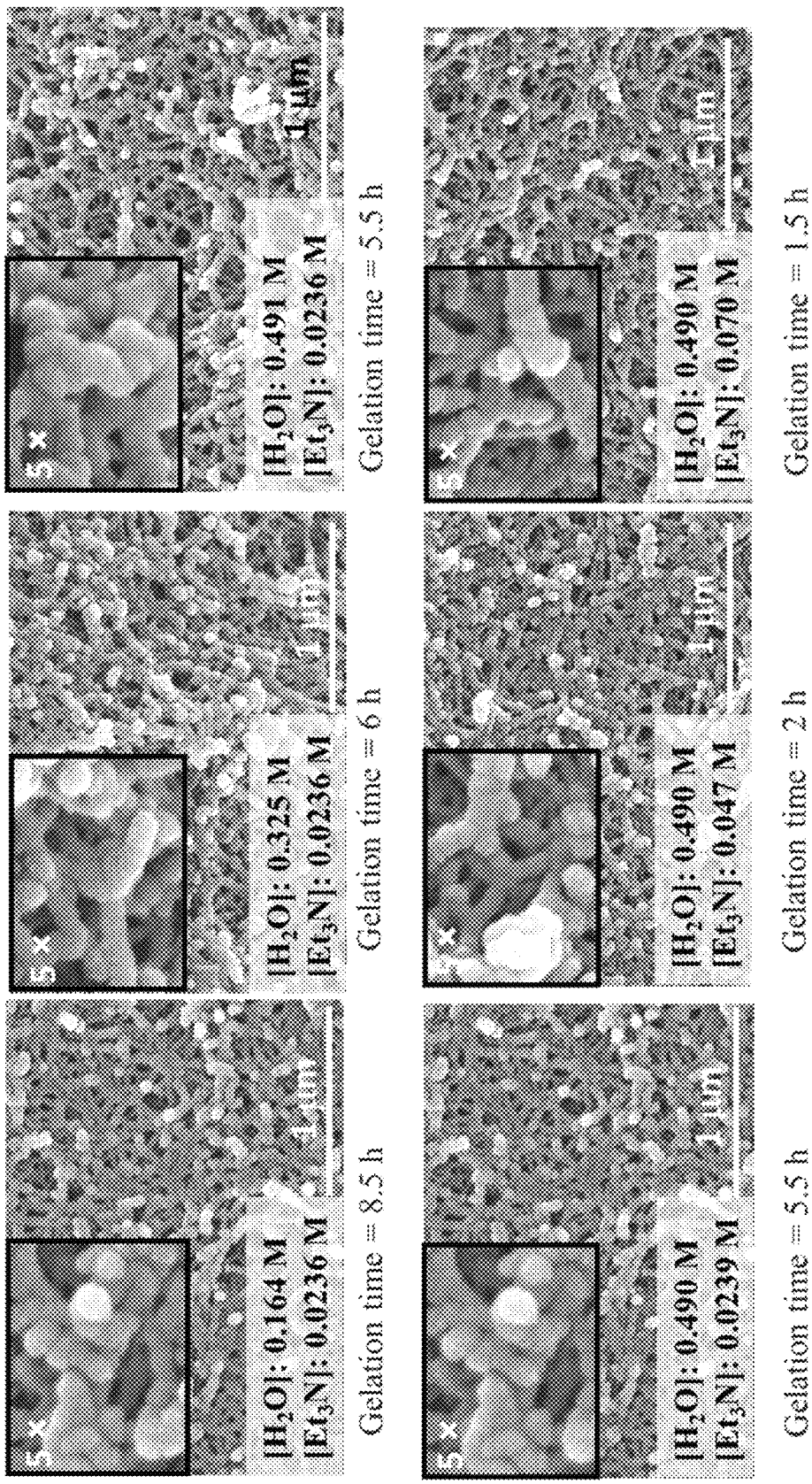
FIG. 19 depicts SEM images of polyurea aerogels under a constant concentration of N3300A at different gelation times in accordance with some embodiments.
Figure 20:
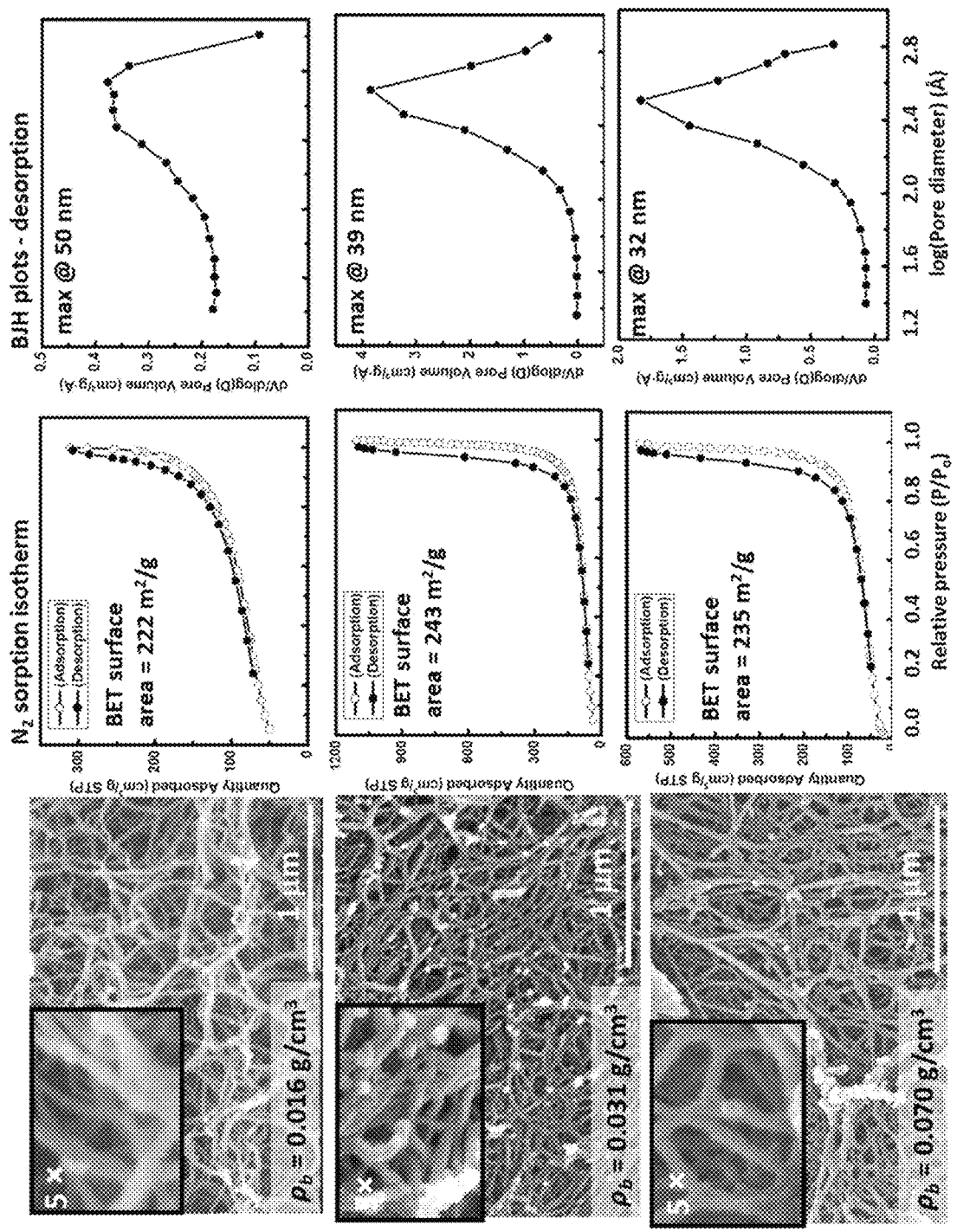
FIG. 20 shows SEM images, nitrogen sorption isotherms and BJH desorption plots of polyurea aerogels in accordance with some embodiments.
Figure 21:
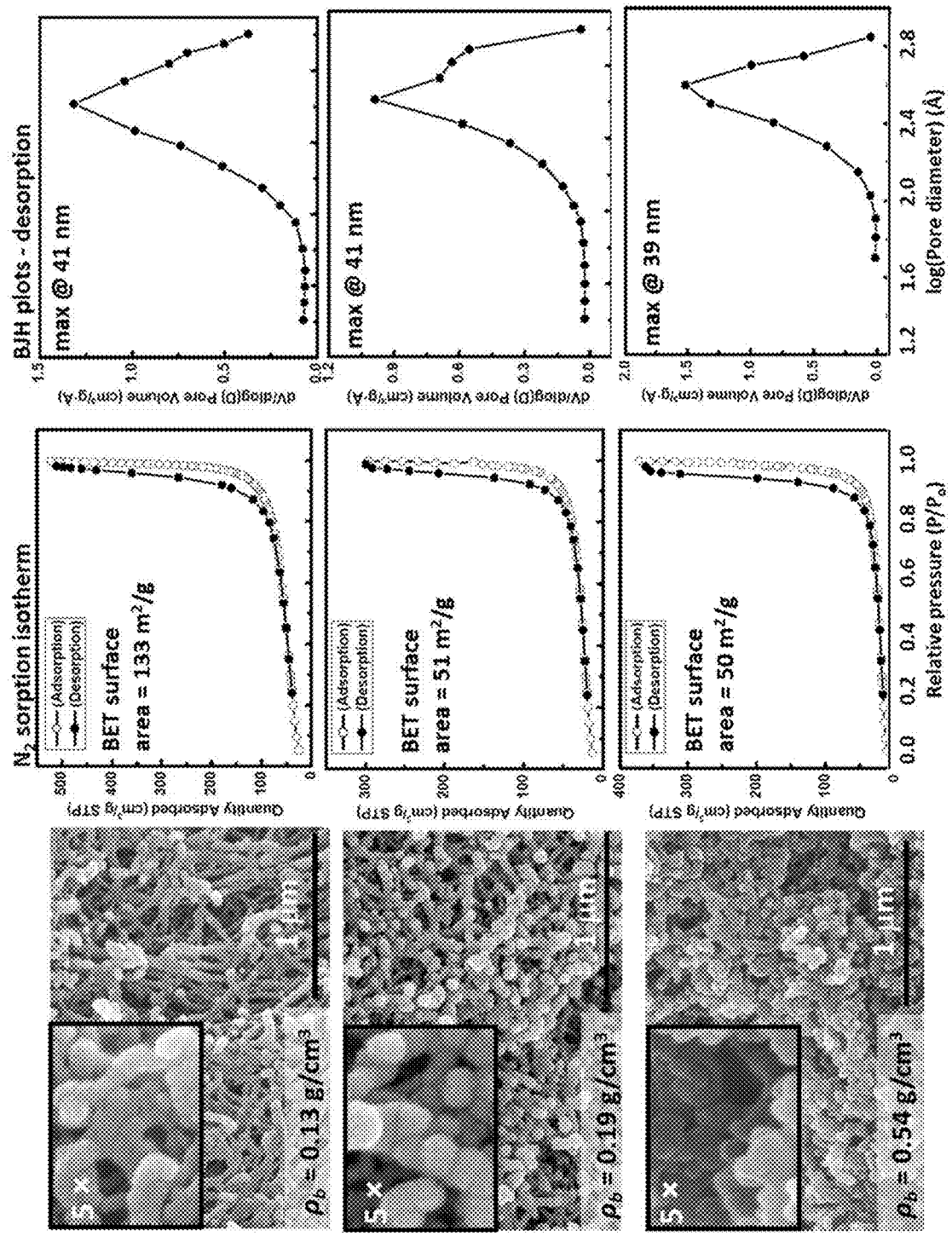
FIG. 21 also shows SEM images, nitrogen sorption isotherms and BJH desorption plots of polyurea aerogels in accordance with some embodiments.
Figure 22:
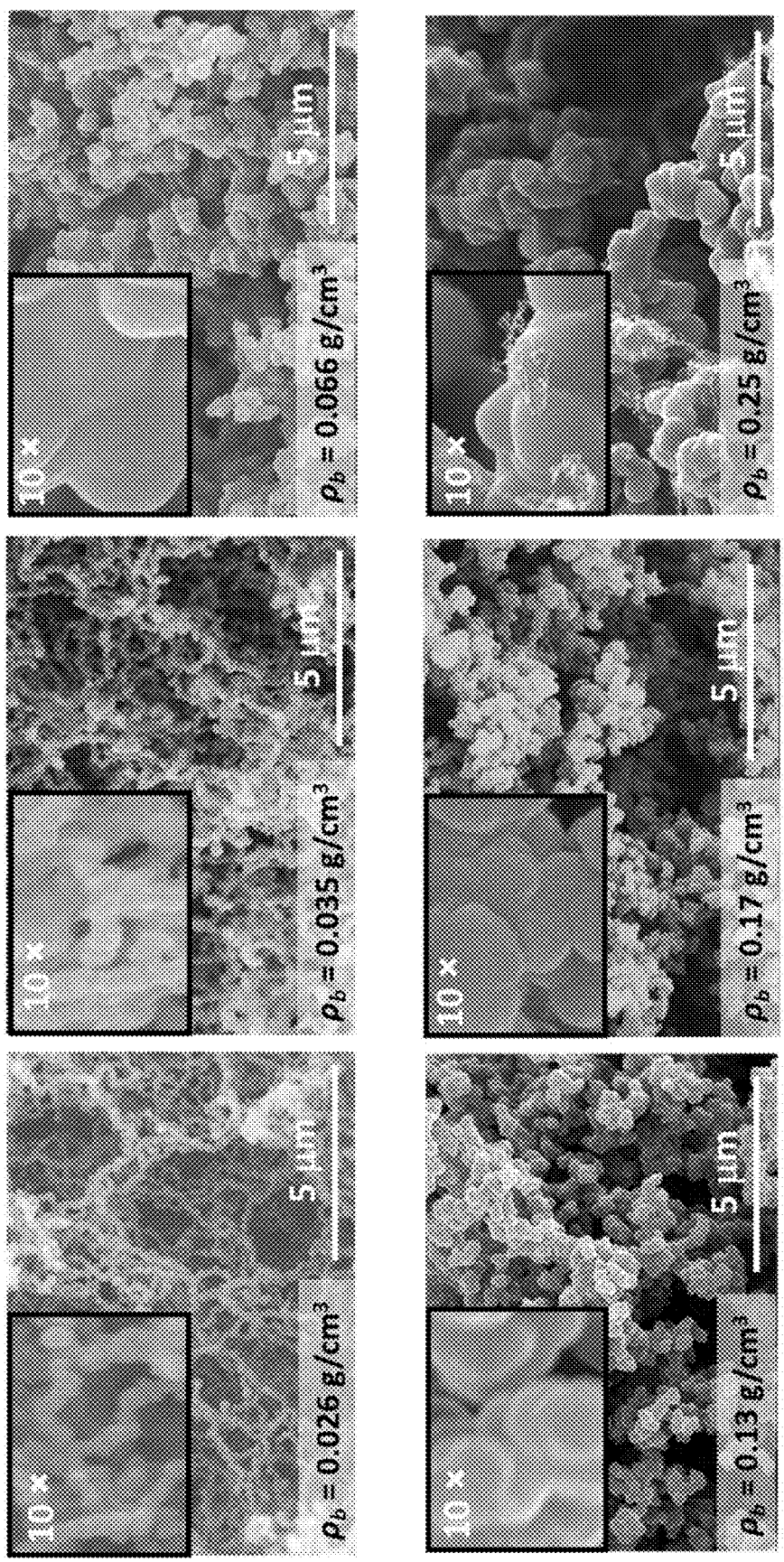
FIG. 22 illustrates SEM images of polyurea aerogels prepared in accordance with some embodiments.
Figure 23:
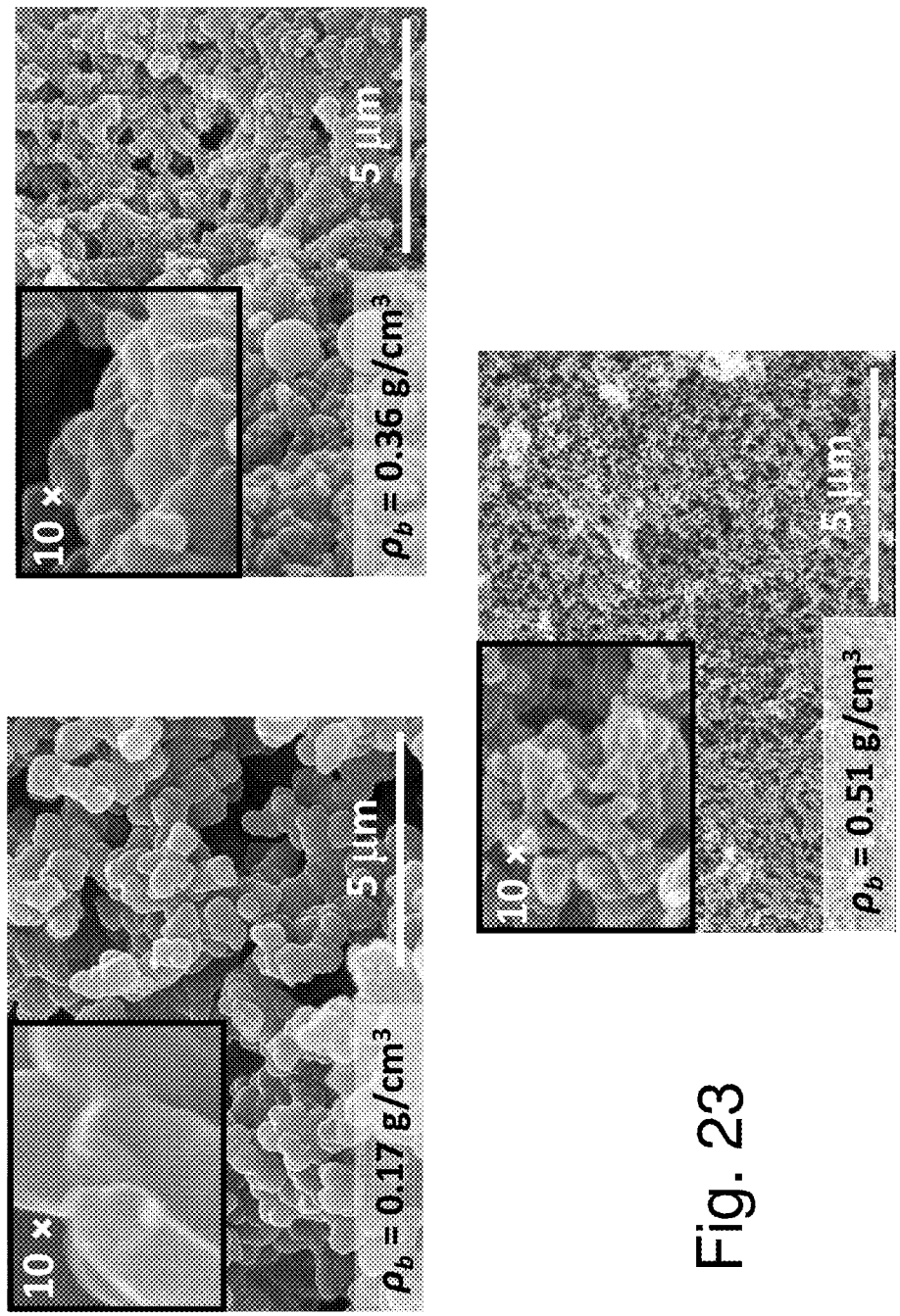
FIG. 23 depicts more SEM images of polyurea aerogels prepared in accordance with some embodiments.
Figure 24:
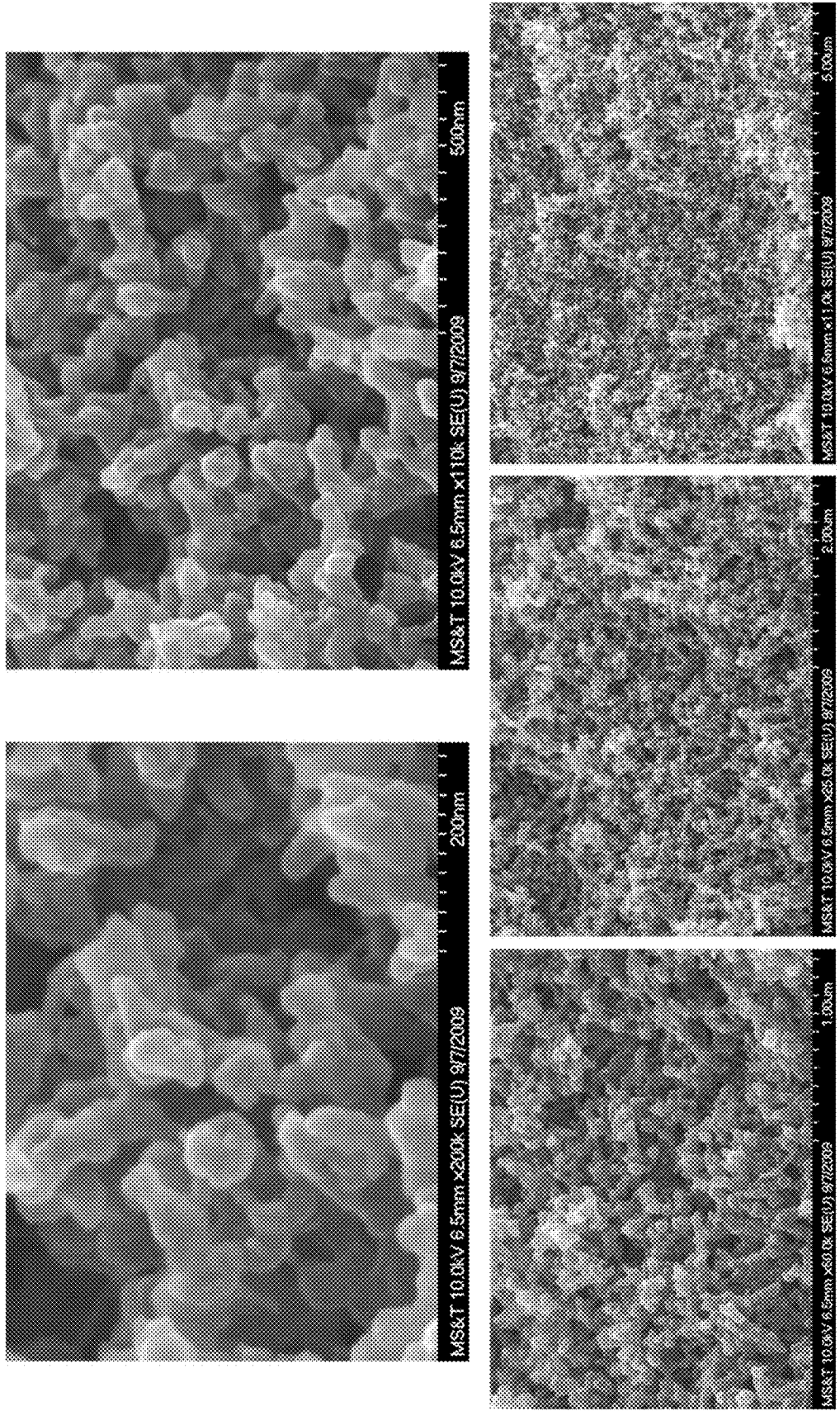
FIG. 24 shows SEM images of a high density portion of a polyurea aerogel in accordance with some embodiments.
Figure 25:
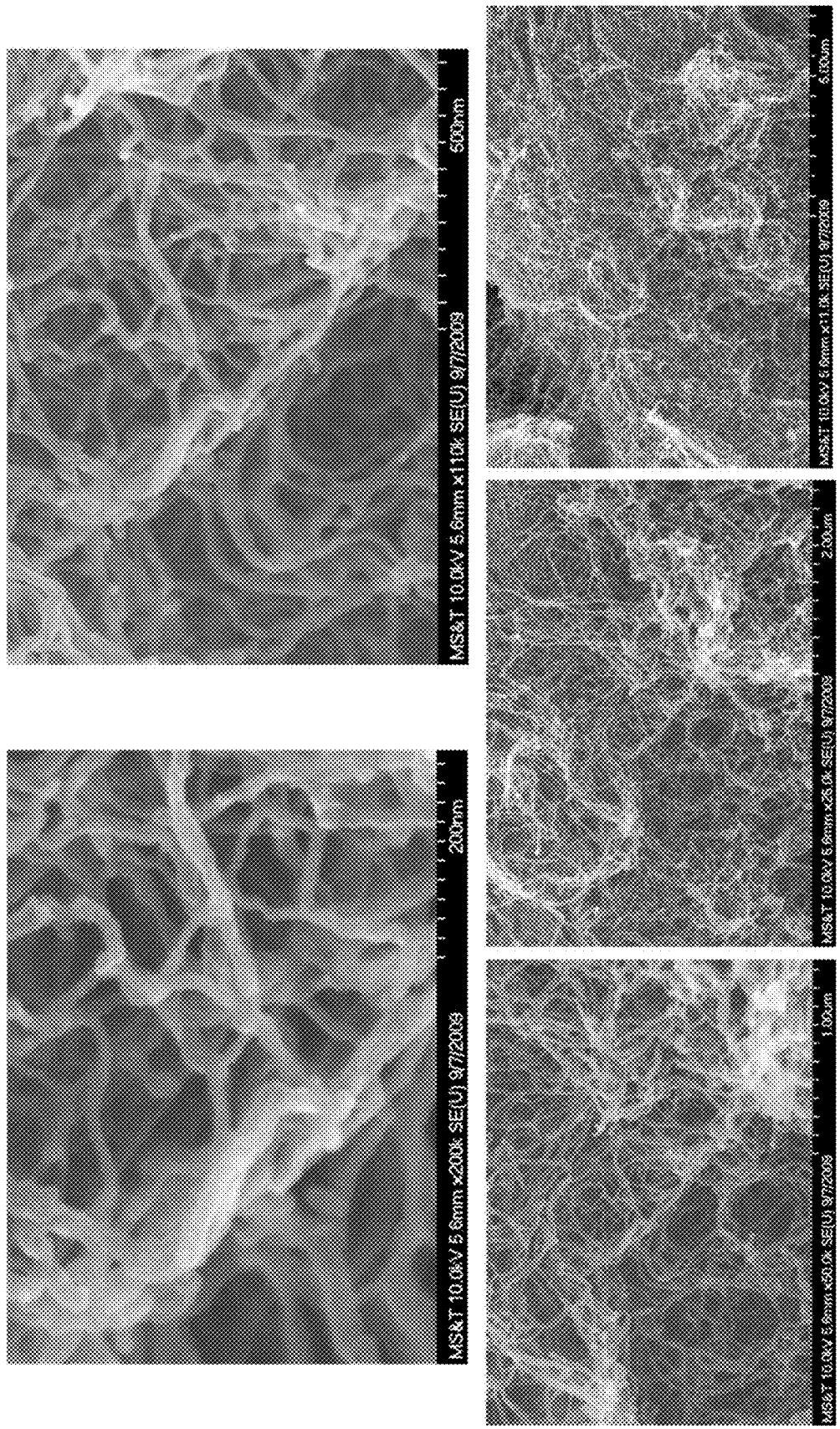
FIG. 25 depicts SEM images of a low density portion of a polyurea aerogel in accordance with some embodiments.

A number of SEM images will now be described. The SEM image of FIG. 18a shows a low density polyurea aerogel having a density of 0.15 $g/cm^3$ and a porosity of 98%. FIG. 18b shows a SEM image of a high density polyurea aerogel having a density of 0.54 $g/cm^3$ and a porosity of 54%. FIG. 19 depicts SEM images of polyurea aerogels under a constant concentration of N3300A at different gelation times illustrating that the nano-morphology of polyurea aerogels described herein might not depend on the concentration of catalyst and water. FIG. 20 shows SEM images and graphs that show that nano-morphology may depend on the concentration of monomer. FIG. 21 shows SEM images that demonstrate that while incorporating lower concentrations of monomer may yield fibrous polyurea aerogels, incorporating higher concentrations of monomer may yield more particulate polyurea aerogels. FIG. 22 illustrates SEM images of polyurea aerogels prepared with the more rigid TMT, including both fibrous and particulate type morphologies. FIG. 23 depicts SEM images of polyurea aerogels prepared with diisocyanate monomer, in this example, giving rise to a more particulate nano-morphology. For a polyurea aerogel exhibiting a density gradient (between 2.75 g and 33 g of monomer incorporated), FIG. 24 shows SEM images of a high density portion of a polyurea aerogel and FIG. 25 depicts SEM images of a low density portion of a polyurea aerogel.

Figure 26:
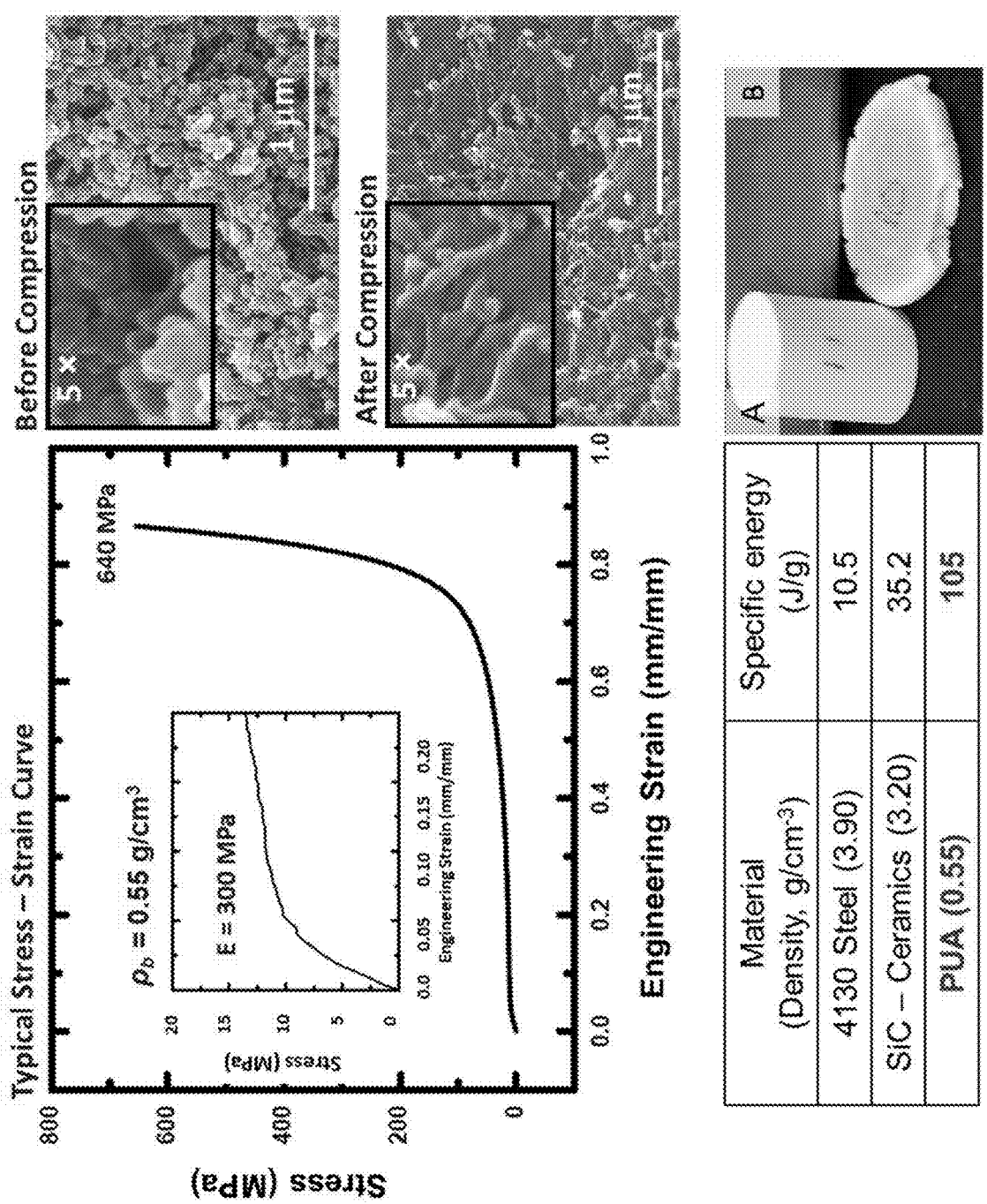
FIG. 26 depicts a stress-strain graph, SEM images and photographs of a polyurea aerogel in accordance with some embodiments.
Figure 27:
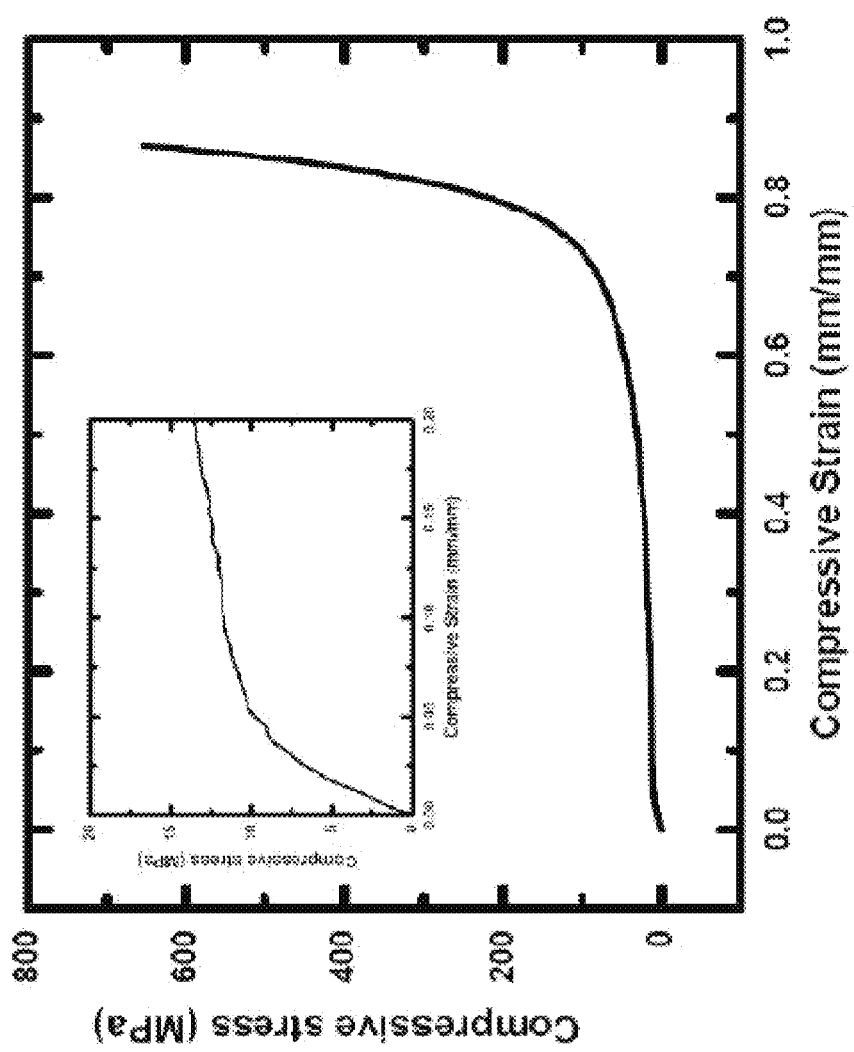
FIG. 27 illustrates a stress-strain graph of a high density polyurea aerogel in accordance with some embodiments.

The behavior under compression of high density PUA aerogels was assessed, with results shown in FIGS. 26 and 27. At room temperature, the ultimate strength for the high density PUA aerogels (density=0.55 g cm$^{-3}$) was determined to be 640 MPa. The specific energy absorption density of PUA aerogels calculated from the area under the stress-strain curve was 105,000 Nm/kg. FIG. 27 depicts a compressive stress-strain curve for a high density polyurea aerogel (density of 0.54 g/cm$^3$) prepared from Desmodur N3300A.

Figure 29A:
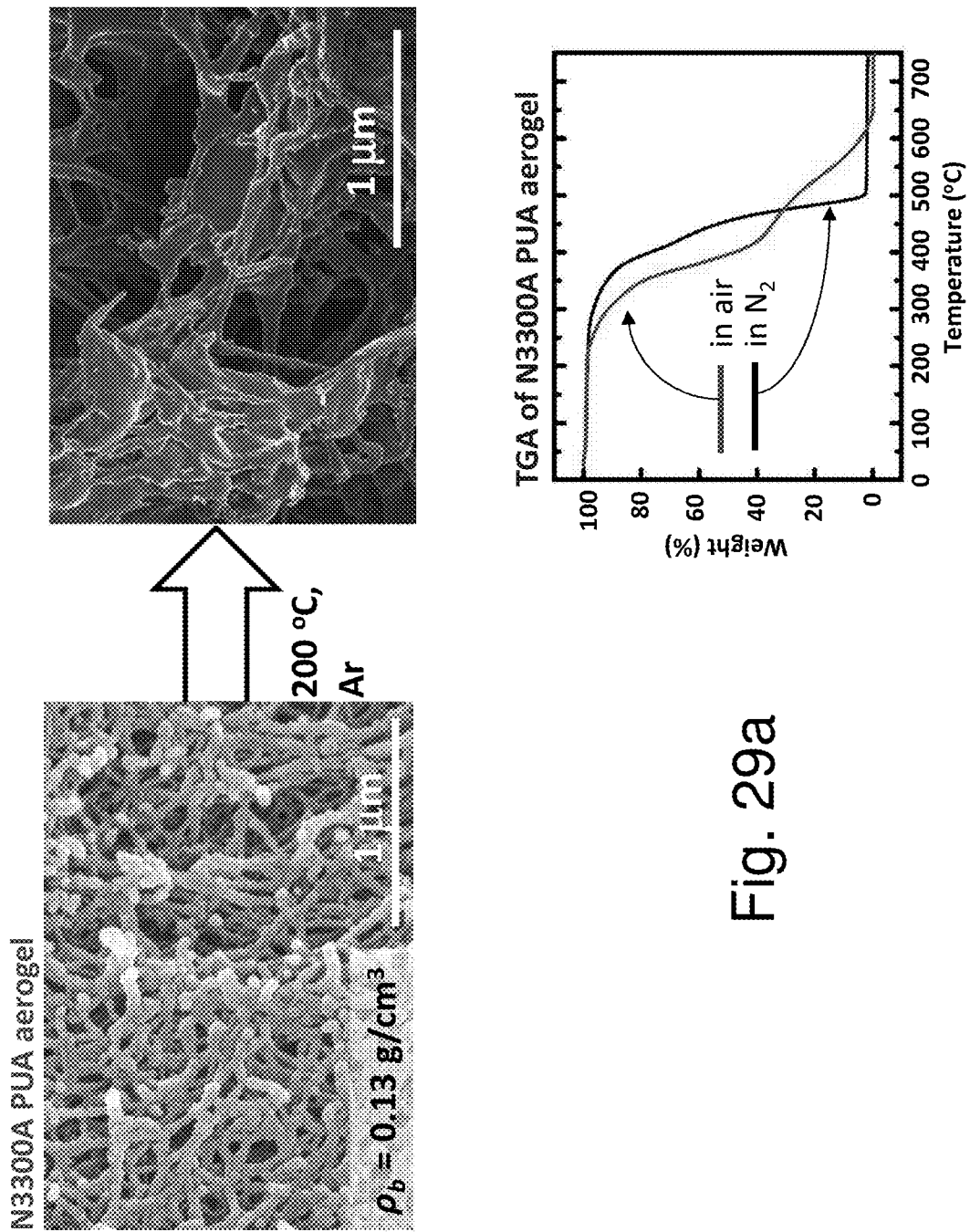
FIG. 29a illustrates SEM images of a polyurea aerogel converted to a carbon aerogel and a graph of percent weight as a function of temperature in air and nitrogen in accordance with some embodiments.
Figure 29B:
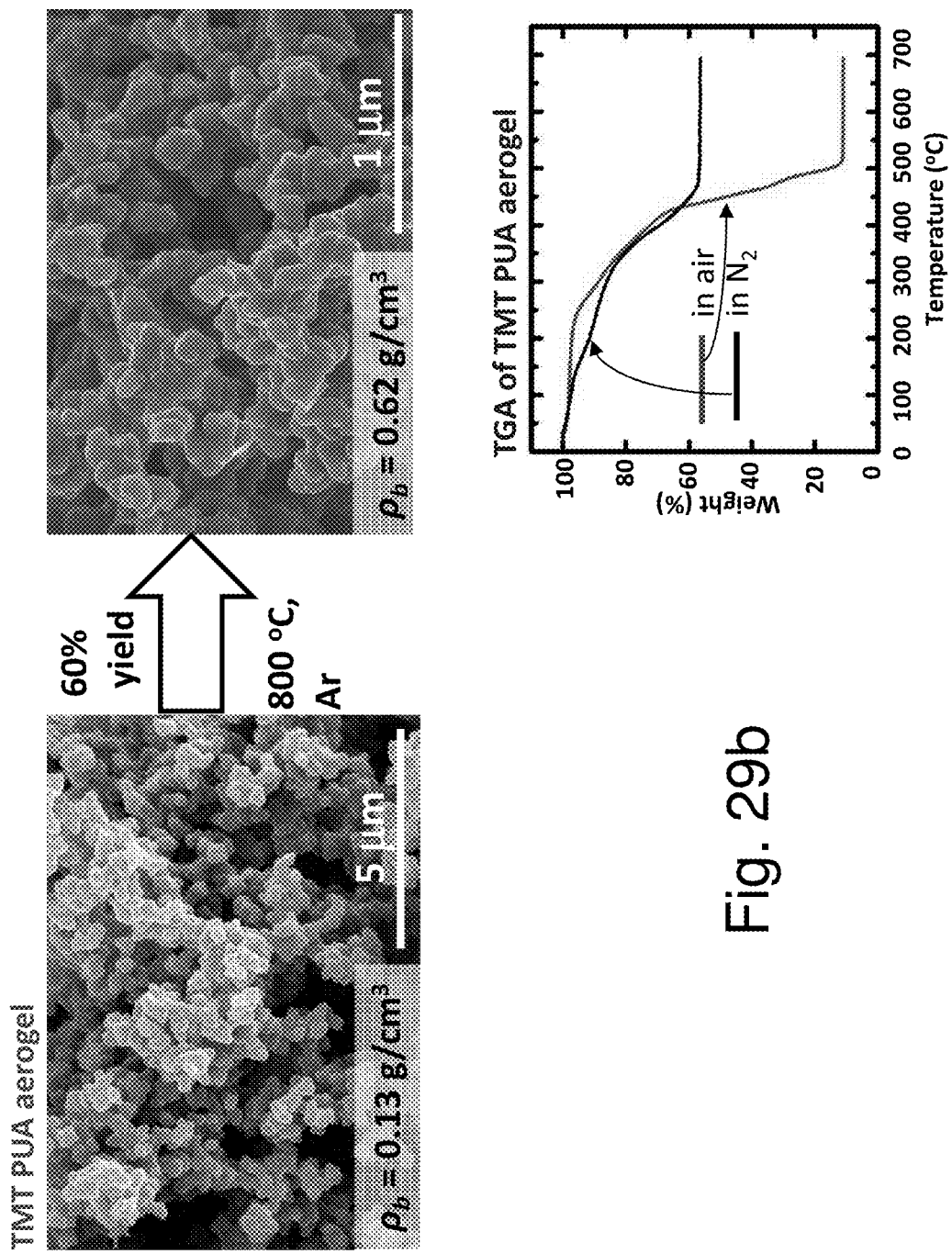
FIG. 29b depicts SEM images of another polyurea aerogel converted to a carbon aerogel and a graph of percent weight as a function of temperature in air and nitrogen in accordance with some embodiments.
Figures 30A, 30B:
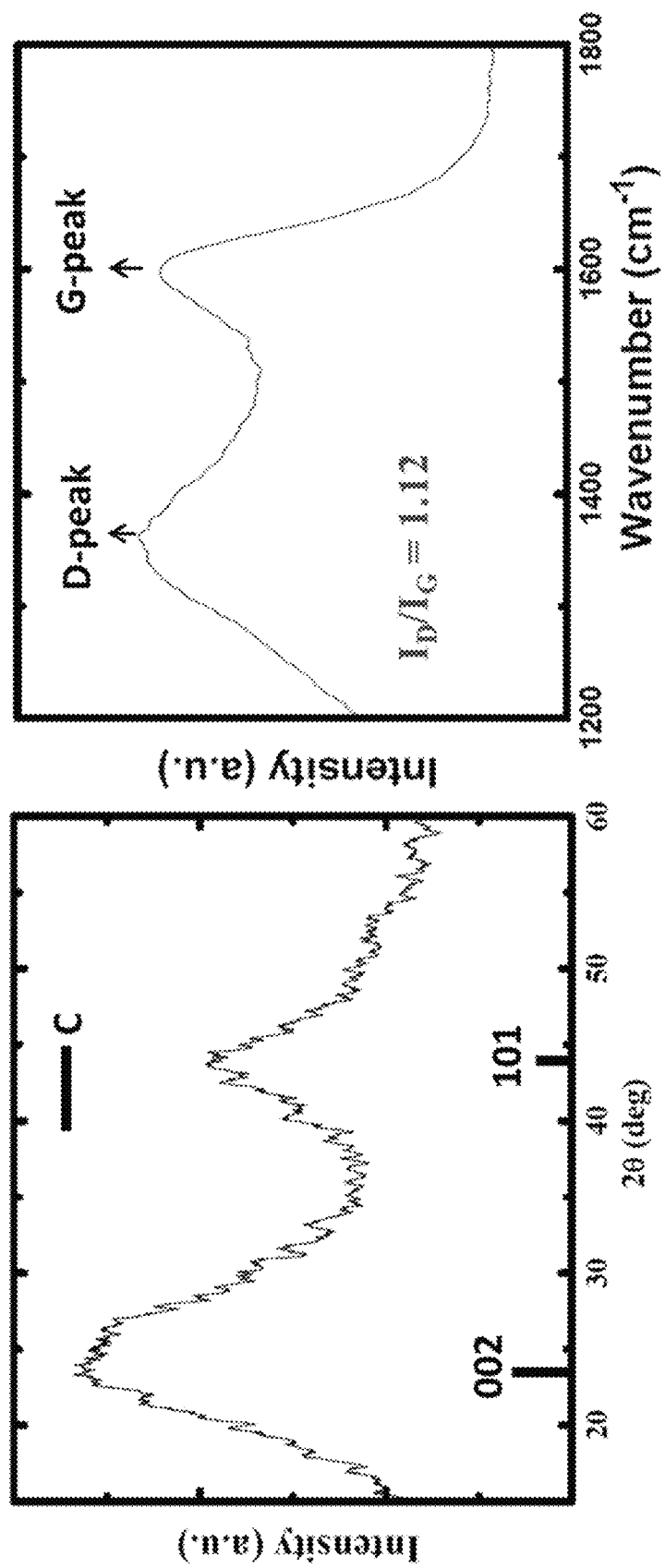
FIG. 30a illustrates XRD data of carbon obtained from a polyurea aerogel in accordance with some embodiments.
FIG. 30b shows raman spectrua of carbon obtained from a polyurea aerogel in accordance with some embodiments.
Figure 31:
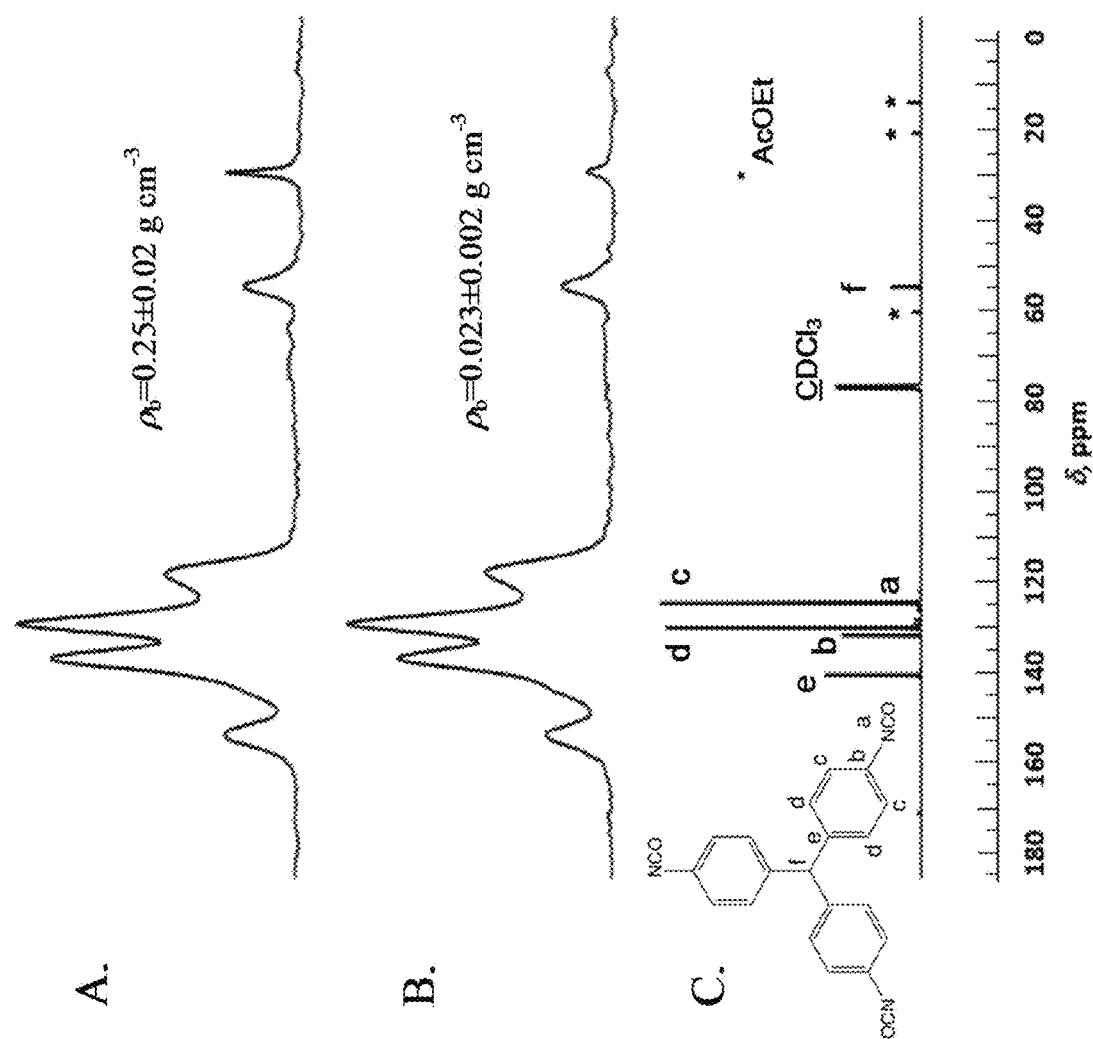
FIG. 31 illustrates a solids CPMAS $^{13}$C NMR spectra of (A) a high-density polyurea aerogel made of Desmodur RE triisocyanate, (B) a low-density polyurea aerogel made of Desmodur RE triisocyanate, and (C) a liquids $^{13}$C NMR spectra of the monomer in $CDCl_3$.
Figure 32:
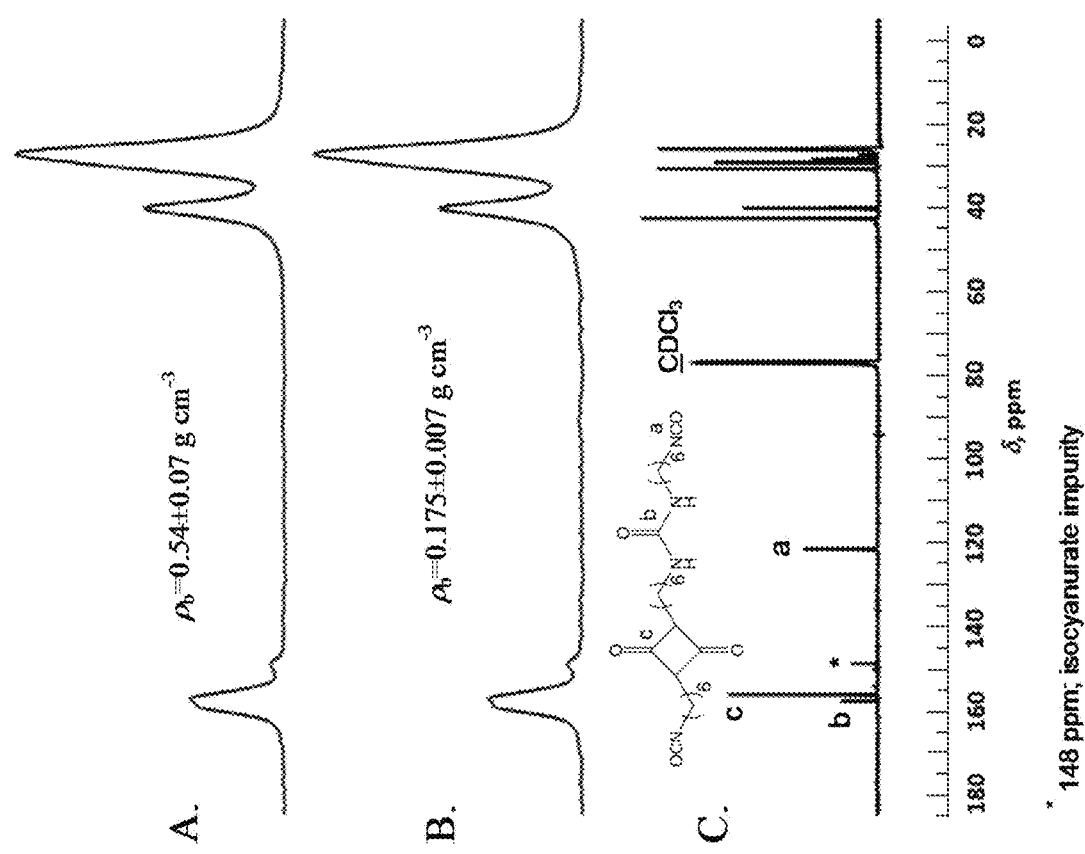
FIG. 32 depicts a solids CPMAS $^{13}$C NMR of (A) a high-density polyurea aerogel made of Desmodur N3200 diisocyanate, (B) a low-density polyurea aerogel made of Desmodur N3200 diisocyanate, and (C) a liquids $^{13}$C NMR spectra of the monomer in $CDCl_3$.

In the example illustrated in FIG. 29a, the polyurea aerogel was obtained from N3300A and N3200 melt at less than or equal to 200 C and converted to a carbon aerogel. For the example of FIG. 29b, the polyurea aerogel was obtained from TMT to yield carbon aerogels upon pyrolysis under Ar at 800 C. FIG. 30a shows XRD data of carbon obtained from a polyurea aerogel prepared from TMT. FIG. 30b shows raman spectra of carbon obtained from a polyurea aerogel prepared from TMT. Carbon obtained from TMT polyurea aerogels were generally nanocrystalline.

The synthesis of homogeneous samples and density gradient samples of polyurea aerogels, their materials characterization, and certain application specific properties are described.

Synthesis of uniform-density polyurea (PUA) aerogels and a photograph or representative samples made of Desmodur N3300A (densities reported below for each sample are in mg cm$^{-3}$) is shown in FIG. 8. Gelation is induced by adding water and $Et_3N$ in a solution of a polyfunctional isocyanate in acetone. Sols become progressively hazy and eventually turn into white gels. All samples able to gel can also be dried by extraction with liquid $CO_2$ taken out at the end as a SCF, yielding robust aerogel monoliths (see above photograph). Gelation of triisocyanates (aliphatic Desmodur N3300A and aromatic Desmodur RE) takes place with monomer concentrations as low as 0.029 M, while gelation of diisocyanates (aliphatic Desmodur N3200, and aromatic toluene diisocyanates (Mondur TDS) and 4,4'-methylene diphenyl diisocyanates (Mondur CD)) takes place only at higher monomer concentrations (>0.2 M, see Tables 4-11). Using Desmodur N3300A triisocyanate as a model system, the gelation time (Tables 4-9) decreases with increasing concentrations of the isocyanate, while the concentration effect of water and the catalyst ($Et_3N$) is more pronounced at lower monomer concentrations. Taking the gelation time as a rate indicator for the gelation process, it is found that within error this is first order in both $H_2O$ and $Et_3N$. Sols without $Et_3N$ gel in much longer time periods (days), while use of $OH^-$ as catalyst (introduced as $NH_4OH$) accelerates the process causing fast precipitation rather than gelation. Gelation proceeds qualitatively similarly in acetonitrile, while in DMSO it takes place very fast causing large bubbles of $CO_2$ to be trapped in translucent gels. DMSO-derived gels combine large foam-like macroporosity with nanoporous walls similar to those obtained in acetone or acetonitrile as described further below.

Wet gels were aged to ensure complete reaction of the monomer, solvent-exchanged (washed) with pure acetone and dried in an autoclave with liquid $CO_2$ taken out at the end as a SCF. Washes were collected and no residual (unreacted) isocyanate was detected. Acetone wet gels are left to dry under ambient conditions and undergo extensive shrinkage and yield xerogel-like materials. Alternatively, by applying a method developed with polyurea-crosslinked silica aerogels, wet gels made with the two highest isocyanate concentrations (~0.3 and 0.5 M) and solvent-exchanged with a low vapor pressure/surface tension solvent like pentane can be dried under ambient pressure at slightly elevated temperature (e.g., 40° C.), yielding materials similar in appearance and properties to those obtained by the SCF $CO_2$ route. Ambient pressure drying was used for making larger monolithic aerogel pieces for evaluation in certain aeronautical and anti-ballistic applications.

Density-gradient polyurea aerogel samples were prepared using two pumps, one to transfer high concentration sol into a mold, while a second pump transfers and constantly dilutes the high concentration sol with a low concentration one the low concentration sol could be replaced with solvent. To minimize convective mixing of the two solutions in the mold, a rubber O-ring was fit inside the upper lip of the cylindrical mold, connected to a vertical wire. The sol slides down the wire, is spread around by the ring and slides down again along the inside walls of the mold. Appearance-wise, density-gradient aerogels were monolithic and indistinguishable from the uniform-density samples.

Tables 1-3: Various Gelation Times for Samples Prepared Above

TABLE 1

Time for gelation of low-density polyurea aerogels with varying concentrations of water and triethylamine.

| Sample No. | Weight of triisocyanate monomer (g) | Equivalent of Water | % TEA (w/w) | Gelation time |
|---|---|---|---|---|
| 1 | 5.5 | 1.5× | 0.3 | 8.5 hours |
| 2 | 5.5 | 1.5× | 0.6 | |
| 3 | 5.5 | 1.5× | 0.9 | |
| 4 | 5.5 | 3.0× | 0.3 | 6 hours |
| 5 | 5.5 | 3.0× | 0.6 | 3 hours |
| 6 | 5.5 | 3.0× | 0.9 | 1 hour |
| 7 | 5.5 | 4.5× | 0.3 | 5.5 hours |
| 8 | 5.5 | 4.5× | 0.6 | |
| 9 | 5.5 | 4.5× | 0.9 | 33 minutes |

TABLE 2

Time for gelation of medium-density polyurea aerogels with varying concentrations of water and triethylamine.

| Sample No. | Weight of triisocyanate monomer (g) | Equivalent of Water | % TEA (w/w) | Gelation time |
|---|---|---|---|---|
| 1 | 11.0 | 1.5× | 0.3 | 4 hours |
| 2 | 11.0 | 1.5× | 0.6 | |
| 3 | 11.0 | 1.5× | 0.9 | |
| 4 | 11.0 | 3.0× | 0.3 | 3 hours |
| 5 | 11.0 | 3.0× | 0.6 | 1 hour 20 minutes |
| 6 | 11.0 | 3.0× | 0.9 | 1 hour |
| 7 | 11.0 | 4.5× | 0.3 | 1 hour 30 minutes |
| 8 | 11.0 | 4.5× | 0.6 | |
| 9 | 11.0 | 4.5× | 0.9 | 33 minutes |

TABLE 3

Time for gelation of high-density polyurea aerogels with varying concentrations of water and triethylamine.

| Sample No. | Weight of triisocyanate monomer | Equivalent of Water (g) | % TEA (w/w) | Gelation time |
|---|---|---|---|---|
| 1 | 16.5 | 1.5× | 0.3 | 2 hours |
| 2 | 16.5 | 1.5× | 0.6 | |
| 3 | 16.5 | 1.5× | 0.9 | |
| 4 | 16.5 | 3.0× | 0.3 | 1 hour |
| 5 | 16.5 | 3.0× | 0.6 | 34 minutes |
| 6 | 16.5 | 3.0× | 0.9 | 24 minutes |
| 7 | 16.5 | 4.5× | 0.3 | 38 minutes |
| 8 | 16.5 | 4.5× | 0.6 | |
| 9 | 16.5 | 4.5× | 0.9 | 15 minutes |

Formulations and Gelation Times of Samples Using Desmodur N3300A, Desmodur N3200, Desmodur RE and Mondur TDS

TABLE 4

Gelation times of Desmodur N3300A sols, at the 1.375 g in 94 mL acetone formulation, as a function of the amount of water and triethylamine ($Et_3N$) Density of Desmodur N3300A: 1.17 g cm$^{-3}$

| amount of N3300A in sol (g) | mol equivalents of $H_2O$ (mL) | % w/w $Et_3N$ (mL) | concentration of N3300A (M) | gelation time |
|---|---|---|---|---|
| 1.375 | 1.5 (0.073) | 0.3 (0.26) | 0.0286 | ~24 h |
| 1.375 | 1.5 (0.073) | 0.6 (0.52) | 0.0285 | ~20 h |
| 1.375 | 1.5 (0.073) | 0.9 (0.78) | 0.0284 | ~19 h |
| 1.375 | 3.0 (0.147) | 0.3 (0.26) | 0.0285 | ~17 h |
| 1.375 | 3.0 (0.147) | 0.6 (0.52) | 0.0285 | ~15 h 30 min |
| 1.375 | 3.0 (0.147) | 0.9 (0.78) | 0.0284 | ~12 h |
| 1.375 | 4.5 (0.219) | 0.3 (0.26) | 0.0285 | ~10 h |
| 1.375 | 4.5 (0.219) | 0.6 (0.52) | 0.0284 | ~9 h 30 min |
| 1.375 | 4.5 (0.219) | 0.9 (0.78) | 0.0284 | ~9 h |

TABLE 5

Gelation times of Desmodur N3300A sols, at the 2.75 g in 94 mL acetone formulation, as a function of the amount of water and triethylamine ($Et_3N$) Density of Desmodur N3300A: 1.17 g cm$^{-3}$

| amount of N3300A in sol (g) | mol equivalents of $H_2O$ (mL) | % w/w $Et_3N$ (mL) | concentration of N3300A (M) | gelation time |
|---|---|---|---|---|
| 2.75 | 1.5 (0.147) | 0.3 (0.266) | 0.0564 | ~18 h |
| 2.75 | 1.5 (0.147) | 0.6 (0.532) | 0.0562 | ~17 h |
| 2.75 | 1.5 (0.147) | 0.9 (0.798) | 0.0561 | ~14 h |
| 2.75 | 3.0 (0.295) | 0.3 (0.266) | 0.0563 | ~12 h |
| 2.75 | 3.0 (0.295) | 0.6 (0.532) | 0.0561 | ~9 h |
| 2.75 | 3.0 (0.295) | 0.9 (0.798) | 0.0560 | ~8 h 30 min |
| 2.75 | 4.5 (0.441) | 0.3 (0.266) | 0.0562 | ~6 h |
| 2.75 | 4.5 (0.441) | 0.6 (0.532) | 0.0561 | ~4 h 30 min |
| 2.75 | 4.5 (0.441) | 0.9 (0.798) | 0.0559 | ~3 h |

TABLE 6

Gelation times of Desmodur N3300A sols, at the 5.5 g in 94 mL acetone formulation, as a function of the amount of water and triethylamine ($Et_3N$) Density of Desmodur N3300A: 1.17 g cm$^{-3}$

| amount of N3300A in sol (g) | mol equivalents of $H_2O$ (mL) | % w/w $Et_3N$ (mL) | concentration of N3300A (M) | gelation time |
|---|---|---|---|---|
| 5.5 | 1.5 (0.295) | 0.3 (0.327) | 0.1099 | 8 h 35 min |
| 5.5 | 1.5 (0.295) | 0.6 (0.654) | 0.1095 | ~8 h |
| 5.5 | 1.5 (0.295) | 0.9 (0.981) | 0.1092 | 7 h 40 min |
| 5.5 | 3.0 (0.589) | 0.3 (0.327) | 0.1095 | 6 h |
| 5.5 | 3.0 (0.589) | 0.6 (0.654) | 0.1092 | 3 h |
| 5.5 | 3.0 (0.589) | 0.9 (0.981) | 0.1088 | 1 h |
| 5.5 | 4.5 (0.884) | 0.3 (0.327) | 0.1092 | 5 h 30 min |
| 5.5 | 4.5 (0.884) | 0.6 (0.654) | 0.1088 | ~2 h |
| 5.5 | 4.5 (0.884) | 0.9 (0.981) | 0.1085 | 1 h 33 min |

TABLE 7

Gelation times of Desmodur N3300A sols, at the 11 g in 94 mL acetone formulation, as a function of the amount of water and triethylamine ($Et_3N$) Density of Desmodur N3300A: 1.17 g cm$^{-3}$

| amount of N3300A in sol (g) | mol equivalents of $H_2O$ (mL) | % w/w $Et_3N$ (mL) | concentration of N3300A (M) | gelation time |
|---|---|---|---|---|
| 11.0 | 1.5 (0.589) | 0.3 (0.35) | 0.2092 | 4 h |
| 11.0 | 1.5 (0.589) | 0.6 (0.70) | 0.2085 | 3 h 33 min |
| 11.0 | 1.5 (0.589) | 0.9 (1.05) | 0.2078 | ~3 h |
| 11.0 | 3.0 (1.178) | 0.3 (0.35) | 0.2080 | ~3 h |
| 11.0 | 3.0 (1.178) | 0.6 (0.70) | 0.2073 | 1 h 20 min |
| 11.0 | 3.0 (1.178) | 0.9 (1.05) | 0.2066 | 1 h |
| 11.0 | 4.5 (1.767) | 0.3 (0.35) | 0.2068 | 1 h 30 min |
| 11.0 | 4.5 (1.767) | 0.6 (0.70) | 0.2062 | ~45 min |
| 11.0 | 4.5 (1.767) | 0.9 (1.05) | 0.2055 | 30 min |

TABLE 8

Gelation times of Desmodur N3300A sols, at the 16.5 g in 94 mL acetone formulation, as a function of the amount of water and triethylamine ($Et_3N$) Density of Desmodur N3300A: 1.17 g cm$^{-3}$

| amount of N3300A in sol (g) | mol equivalents of $H_2O$ | % w/w $Et_3N$ (mL) | concentration of N3300A (M) | gelation time |
|---|---|---|---|---|
| 16.5 | 1.5 (0.884) | 0.3 (0.375) | 0.2994 | 2 h |
| 16.5 | 1.5 (0.884) | 0.6 (0.75) | 0.2983 | 1 h 20 min |
| 16.5 | 1.5 (0.884) | 0.9 (1.125) | 0.2973 | 1 h 10 min |
| 16.5 | 3.0 (1.767) | 0.3 (0.375) | 0.2970 | 1 h |
| 16.5 | 3.0 (1.767) | 0.6 (0.75) | 0.2960 | 34 min |
| 16.5 | 3.0 (1.767) | 0.9 (1.125) | 0.2950 | 24 min |
| 16.5 | 4.5 (2.650) | 0.3 (0.375) | 0.2946 | 38 min |
| 16.5 | 4.5 (2.650) | 0.6 (0.75) | 0.2936 | 25 min |
| 16.5 | 4.5 (2.650) | 0.9 (1.125) | 0.2926 | 15 min |

TABLE 9

Gelation times of Desmodur N3300A sols, at the 33 g in 94 mL acetone formulation, as a function of the amount of water and triethylamine ($Et_3N$) Density of Desmodur N3300A: 1.17 g cm$^{-3}$

| amount of N3300A in sol (g) | mol equivalents of $H_2O$ (mL) | % w/w $Et_3N$ (mL) | concentration of N3300A (M) | gelation time |
|---|---|---|---|---|
| 33.0 | 1.5 (1.767) | 0.3 (0.439) | 0.5263 | ~1 h |
| 33.0 | 1.5 (1.767) | 0.6 (0.878) | 0.5244 | ~45 min |
| 33.0 | 1.5 (1.767) | 0.9 (1.32) | 0.5226 | ~35 min |

TABLE 9-continued

Gelation times of Desmodur N3300A sols, at the 33 g in 94 mL acetone formulation, as a function of the amount of water and triethylamine (Et$_3$N) Density of Desmodur N3300A: 1.17 g cm$^{-3}$

| amount of N3300A in sol (g) | mol equivalents of H$_2$O (mL) | % w/w Et$_3$N (mL) | concentration of N3300A (M) | gelation time |
|---|---|---|---|---|
| 33.0 | 3.0 (3.53) | 0.3 (0.439) | 0.5189 | ~35 min |
| 33.0 | 3.0 (3.53) | 0.6 (0.878) | 0.5171 | ~20 min |
| 33.0 | 3.0 (3.53) | 0.9 (1.32) | 0.5153 | 10 min |
| 33.0 | 4.5 (5.30 ) | 0.3 (0.439) | 0.5118 | 10 min |
| 33.0 | 4.5 (5.30) | 0.6 (0.878) | 0.5100 | 5 min |
| 33.0 | 4.5 (5.30) | 0.9 (1.32) | 0.5082 | 5 min |

TABLE 10

Gelation times of Desmodur N3200 sols, at the middle water and triethylamine (Et$_3$N) formulations (refer to Desmodur N3300A, Tables 4-9); Solvent: acetone, 94 mL Density of Desmodur N3200: 1.13 g cm$^{-3}$

| amount of N3200 in sol (g) | mol equivalents of H$_2$O (mL) | % w/w Et$_3$N (mL) | concentration of N3200 (M) | gelation time |
|---|---|---|---|---|
| 1.3 | 3.0 (0.147) | 0.6 (0.618) | 0.0283 | no gelation |
| 2.6 | 3.0 (0.294) | 0.6 (0.628) | 0.0560 | no gelation |
| 5.2 | 3.0 (0.588) | 0.6 (0.650) | 0.1091 | no gelation |
| 10.4 | 3.0 (1.177) | 0.6 (0.696) | 0.2066 | 30 min |
| 15.6 | 3.0 (1.765) | 0.6 (0.735) | 0.2955 | 15 min |
| 31.2 | 3.0 (3.53) | 0.6 (0.864) | 0.5166 | 5 min |

TABLE 11

Gelation times of 4,4',4''-triphenylmethane triisocyanate sols (TMT, from Desmodur RE), at the middle water and triethylamine (Et$_3$N) formulations (refer to Desmodur N3300A, Tables 4-9); Solvent: acetone, 94 mL Density of TMT: 1.015 g cm$^{-3}$

| amount of TMT in sol (g) | mol equivalents of H$_2$O | % w/w Et$_3$N (mL) | concentration of TMT (M) | gelation time |
|---|---|---|---|---|
| 1 | 3.0 (0.147) | 0.6 (0.61) | 0.0284 | ~36 h |
| 2 | 3.0 (0.294) | 0.6 (0.62) | 0.0563 | 24 h |
| 4 | 3.0 (0.588) | 0.6 (0.64 ) | 0.1099 | ~9 h |
| 8 | 3.0 (1.177) | 0.6 (0.674) | 0.2101 | 2 h |
| 12 | 3.0 (1.765) | 0.6 (0.706) | 0.3019 | 45 min |
| 24 | 3.0 (3.53) | 0.6 (0.80) | 0.5360 | 10 min |

TABLE 12

Gelation times of Mondur TDS (toluene isocyanate, TDI) sols, at the middle water and triethylamine (Et$_3$N) formulations (refer to Desmodur N3300A, Tables 4-9); Solvent: acetone, 94 mL Density of Mondur TDS: 1.214 g cm$^{-3}$

| amount of Mondur TDS in sol (g) | mol equivalents of H$_2$O | % w/w Et$_3$N (mL) | concentration of TDI (M) | gelation time |
|---|---|---|---|---|
| 0.474 | 3.0 (0.147) | 0.6 (0.61) | 0.0286 | no gelation |
| 0.947 | 3.0 (0.294) | 0.6 (0.614) | 0.0568 | no gelation |
| 1.89 | 3.0 (0.588) | 0.6 (0.622) | 0.1121 | no gelation |
| 3.79 | 3.0 (1.177) | 0.6 (0.64) | 0.2201 | 5 min |
| 5.68 | 3.0 (1.765) | 0.6 (0.67) | 0.3213 | 2 min |
| 11.36 | 3.0 (3.53) | 0.6 (0.72) | 0.5886 | <1 min |

Comparison of PUA xerogel, aerogels and samples dried from pentane

TABLE 13

The effect of the drying conditions on selected properties of polyurea (PUA) aerogels prepared with Desmodur N3300A triisocyanate using the middle water and triethylamine (Et$_3$N) formulations, that is 3.0 mol equivalents of water and 0.6% w/w triethylamine (refer to Tables 4-9)

| concentration of N3300A (M) | diameter (cm) | shrinkage (%)$^e$ | bulk density, $\rho_b$ (g cm$^{-3}$) | skeletal density, $\rho_s$ (g cm$^{-3}$)$^f$ | porosity, Π (% v/v void space) |
|---|---|---|---|---|---|
| 0.0285 | | | | | |
| xerogel $^{a,b}$ | 0.38 | 73.0 | 0.932 | 1.21 ± 0.15 | 22.3 |
| aerogel $^c$ | 1.28 ± 0.01 | 13.3 ± 0.6 | 0.016 ± 0.0004 | 1.24 ± 0.23 | 98.6 |
| pentane-died $^{d,b}$ | 0.42 | 70.0 | 0.734 | 1.23 ± 0.31 | 40.3 |
| 0.0561 | | | | | |
| xerogel $^{a,b}$ | 0.44 | 68.5 | 0.951 | 1.25 ± 0.18 | 23.9 |
| aerogel $^c$ | 1.35 ± 0.01 | 9.1 ± 0.9 | 0.034 ± 0.0004 | 1.31 ± 0.06 | 97.5 |
| pentane-died $^{d,b}$ | 0.48 | 65.7 | 0.667 | 1.27 ± 0.28 | 47.5 |
| 0.1092 | | | | | |
| xerogel $^{a,b}$ | 0.56 | 60.0 | 0.988 | 1.21 ± 0.22 | 18.3 |
| aerogel $^c$ | 1.27 ± 0.01 | 14.8 ± 0.2 | 0.072 ± 0.005 | 1.21 ± 0.03 | 93.9 |
| pentane-died $^{d,b}$ | 0.57 | 59.2 | 0.719 | 1.264 ± 0.24 | 43.0 |
| 0.2073 | | | | | |
| xerogel $^{a,b}$ | 0.66 | 52.8 | 1.01 | 1.22 ± 0.26 | 17.2 |
| aerogel $^c$ | 1.32 ± 0.01 | 10.6 ± 0.2 | 0.126 ± 0.001 | 1.30 ± 0.07 | 90.3 |
| pentane-died $^{d,b}$ | 0.74 | 47.1 | 0.640 | 1.21 ± 0.25 | 47.1 |
| 0.2960 | | | | | |
| xerogel $^{a,b}$ | 0.76 | 45.7 | 1.03 | 1.28 ± 0.14 | 19.5 |
| aerogel $^c$ | 1.27 ± 0.03 | 14.1 ± 1.8 | 0.192 ± 0.012 | 1.21 ± 0.02 | 84.2 |
| pentane-died $^{d,b}$ | 1.20 | 14.2 | 0.243 | 1.23 ± 0.15 | 80.2 |

TABLE 13-continued

The effect of the drying conditions on selected properties of polyurea (PUA) aerogels prepared with Desmodur N3300A triisocyanate using the middle water and triethylamine (Et₃N) formulations, that is 3.0 mol equivalents of water and 0.6% w/w triethylamine (refer to Tables 4-9)

| concentration of N3300A (M) | diameter (cm) | shrinkage (%) [e] | bulk density, $\rho_b$ (g cm⁻³) | skeletal density, $\rho_s$ (g cm⁻³) [f] | porosity, Π (% v/v void space) |
|---|---|---|---|---|---|
| 0.5171 | | | | | |
| xerogel [a,b] | 0.92 | 34.2 | 1.04 | 1.29 ± 0.28 | 19.3 |
| aerogel [c] | 1.11 ± 0.02 | 25 ± 1.4 | 0.55 ± 0.03 | 1.2 ± 0.001 | 54.1 |
| pentane-died [d,b] | 1.14 | 18.5 | 0.490 | 1.19 ± 0.13 | 58.8 |

[a] Acetone-soaked wet-gels dried under ambient temperature and pressure.
[b] Single sample.
[c] Average of 5 samples dried with SCF CO₂.
[d] Pentane-soaked wet-gels dried under ambient pressure at 40° C.
[e] Shrinkage = 100 × (sample diameter − mold diameter)/(mold diameter). Mold diameter: 1.40 cm.
[f] Single sample, average of 50 measurements.

TABLE 14

Selected properties of PUA aerogels prepared using about 0.0285M of Desmodur N3300A triisocyanate (refer to Table 4) and all water and triethylamine (Et₃N) formulations, that is 1.5, 3.0, and 4.5 mol equivalents of water and 0.3, 0.6, and 0.9% w/w triethylamine

| H₂O—Et₃N (×mol-% w/w) | diameter (cm) [a] | shrinkage (%) [a,b] | bulk density, $\rho_b$ (g cm⁻³) [a] | skeletal density, $\rho_s$ (g cm⁻³) [c] | porosity, Π (% void space) | BET surface area, σ (m² g⁻¹) | average pore diameter (nm) [d] | particle radius, r (nm) [e] |
|---|---|---|---|---|---|---|---|---|
| 1.5-0.3 | 1.3 ± 0.016 | 12.5 ± 1.3 | 0.016 ± 0.001 | 1.28 ± 0.12 | 98.7 | 159.8 | 8.5 [1545] | 14.6 |
| 1.5-0.6 | 1.27 ± 0.005 | 14.0 ± 0.3 | 0.015 ± 0.002 | 1.32 ± 0.01 | 98.8 | 230.1 | 13.5 [1145] | 9.9 |
| 1.5-0.9 | 1.27 ± 0.012 | 14.3 ± 0.9 | 0.017 ± 0.001 | 1.29 ± 0.03 | 98.6 | 162.2 | 8.9 [1433] | 14.3 |
| 3.0-0.3 | 1.28 ± 0.008 | 13.3 ± 0.56 | 0.017 ± 0.0006 | 1.25 ± 0.18 | 98.6 | 288.9 | 11.7 [803] | 8.3 |
| 3.0-0.6 | 1.28 ± 0.008 | 13.3 ± 0.56 | 0.016 ± 0.0004 | 1.24 ± 0.23 | 98.6 | 222.4 | 12.0 [1109] | 10.8 |
| 3.0-0.9 | 1.29 ± 0.009 | 13.0 ± 0.61 | 0.017 ± 0.001 | 1.25 ± 0.22 | 98.7 | 131.2 | 10.5 [1769] | 18.2 |
| 4.5-0.3 | 1.29 ± 0.009 | 12.8 ± 0.47 | 0.016 ± 0.0006 | 1.24 ± 0.28 | 98.6 | 157.5 | 11.0 [1566] | 15.3 |
| 4.5-0.6 | 1.30 ± 0.011 | 12.5 ± 0.75 | 0.016 ± 0.0009 | 1.24 ± 0.25 | 98.8 | 150.9 | 11.5 [1635] | 16.0 |
| 4.5-0.9 | 1.29 ± 0.005 | 13.1 ± 0.33 | 0.016 ± 0.001 | 1.28 ± 0.31 | 98.7 | 199.5 | 10.5 [1237] | 11.7 |

[a] Average of 5 samples. (Mold diameter: 1.40 cm.)
[b] Shrinkage = 100 × (sample diameter − mold diameter)/(mold diameter).
[c] Single sample, average of 50 measurements.
[d] By the 4 × $V_{Total}$/σ method. For the first number, $V_{Total}$ was calculated by the single-point adsorption method; for the number in brackets $V_{Total}$ was calculated via $V_{Total} = (1/\rho_b) − (1/1\rho_s)$.
[e] Calculated via r = 3/$\rho_s$σ.

TABLE 15

Selected properties of PUA aerogels prepared using about 0.0561M of Desmodur N3300A triisocyanate (refer to Table 5) and all water and triethylamine (Et₃N) formulations, that is 1.5, 3.0, and 4.5 mol equivalents of water and 0.3, 0.6, and 0.9% w/w triethylamine

| H₂O—Et₃N (×mol-% w/w) | diameter (cm) [a] | shrinkage (%) [a,b] | bulk density, $\rho_b$ (g cm⁻³) [a] | skeletal density, $\rho_s$ (g cm⁻³) [c] | porosity, Π (% void space) | BET surface area, σ (m² g⁻¹) | average pore diameter (nm) [d] | particle radius, r (nm) [e] |
|---|---|---|---|---|---|---|---|---|
| 1.5-0.3 | 1.32 ± 0.008 | 11.1 ± 0.54 | 0.031 ± 0.002 | 1.25 ± 0.04 | 97.5 | 216.2 | 16.8 [581] | 11.1 |
| 1.5-0.6 | 1.31 ± 0.009 | 11.5 ± 0.6 | 0.032 ± 0.003 | 1.25 ± 0.03 | 97.6 | 231.6 | 13.5 [526] | 10.4 |
| 1.5-0.9 | 1.30 ± 0.019 | 12.2 ± 0.74 | 0.033 ± 0.002 | 1.25 ± 0.04 | 97.6 | 271.7 | 18.1 [434] | 8.8 |
| 3.0-0.3 | 1.32 ± 0.007 | 10.7 ± 0.50 | 0.034 ± 0.002 | 1.27 ± 0.04 | 97.6 | 230.3 | 19.1 [497] | 10.3 |
| 3.0-0.6 | 1.35 ± 0.012 | 9.12 ± 0.85 | 0.034 ± 0.0004 | 1.31 ± 0.06 | 97.5 | 243.5 | 20.4 [471] | 9.4 |
| 3.0-0.9 | 1.32 ± 0.008 | 11.1 ± 0.33 | 0.033 ± 0.0008 | 1.27 ± 0.06 | 97.4 | 281.3 | 10.5 [420] | 8.4 |
| 4.5-0.3 | 1.33 ± 0.01 | 10.4 ± 0.69 | 0.032 ± 0.011 | 1.27 ± 0.06 | 97.5 | 304.2 | 11.0 [401] | 7.8 |
| 4.5-0.6 | 1.32 ± 0.01 | 10.7 ± 0.66 | 0.033 ± 0.001 | 1.28 ± 0.06 | 97.3 | 255.5 | 16.3 [462] | 9.2 |
| 4.5-0.9 | 1.32 ± 0.005 | 10.5 ± 0.33 | 0.032 ± 0.001 | 1.28 ± 0.05 | 97.3 | 236.7 | 14.0 [514] | 9.9 |

[a] Average of 5 samples. (Mold diameter: 1.40 cm.)
[b] Shrinkage = 100 × (sample diameter − mold diameter)/(mold diameter).
[c] Single sample, average of 50 measurements.
[d] By the 4 × $V_{Total}$/σ method. For the first number, $V_{Total}$ was calculated by the single-point adsorption method; for the number in brackets $V_{Total}$ was calculated via $V_{Total} = (1/\rho_b) − (1/1\rho_s)$.
[e] Calculated via r = 3/$\rho_s$σ.

TABLE 16

Selected properties of PUA aerogels prepared using about 0.1092M of Desmodur N3300A triisocyanate (refer to Table 6) and all water and triethylamine (Et₃N) formulations, that is 1.5, 3.0, and 4.5 mol equivalents of water and 0.3, 0.6, and 0.9% w/w triethylamine

| $H_2O$—$Et_3N$ (xmol-% w/w) | diameter (cm) [a] | shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, σ (m² g$^{-1}$) | average pore diameter (nm) [d] | particle radius, r (nm) [e] |
|---|---|---|---|---|---|---|---|---|
| 1.5-0.3 | 1.28 ± 0.009 | 13.5 ± 0.41 | 0.072 ± 0.008 | 1.24 ± 0.16 | 94.1 | 177.6 | 23.3 [292.6] | 13.6 |
| 1.5-0.6 | 1.32 ± 0.004 | 10.6 ± 0.32 | 0.069 ± 0.001 | 1.24 ± 0.01 | 94.4 | 198.8 | 27.7 [275.3] | 12.1 |
| 1.5-0.9 | 1.28 ± 0.021 | 13.6 ± 1.42 | 0.077 ± 0.003 | 1.26 ± 0.02 | 93.6 | 200.2 | 25.9 [239.7] | 11.8 |
| 3.0-0.3 | 1.31 ± 0.06 | 11.4 ± 0.32 | 0.070 ± 0.003 | 1.24 ± 0.12 | 94.4 | 182.8 | 25.7 [293] | 13.2 |
| 3.0-0.6 | 1.27 ± 0.01 | 14.8 ± 0.18 | 0.072 ± 0.005 | 1.21 ± 0.03 | 93.9 | 234.7 | 23.6 [222.5] | 10.5 |
| 3.0-0.9 | 1.25 ± 0.03 | 16.6 ± 0.42 | 0.073 ± 0.005 | 1.20 ± 0.01 | 93.8 | 185.0 | 28.8 [276] | 13.5 |
| 4.5-0.3 | 1.3 ± 0.02 | 12.3 ± 0.50 | 0.069 ± 0.001 | 1.22 ± 0.01 | 94.5 | 176.4 | 32.5 [310] | 13.9 |
| 4.5-0.6 | 1.31 ± 0.01 | 11.4 ± 0.78 | 0.064 ± 0.002 | 1.26 ± 0.02 | 95.1 | 174.7 | 32.5 [339] | 13.6 |
| 4.5-0.9 | 1.27 ± 0.02 | 14.1 ± 1.21 | 0.070 ± 0.002 | 1.22 ± 0.03 | 94.1 | 167.9 | 19.7 [318] | 14.6 |

[a] Average of 5 samples. (Mold diameter: 1.40 cm.)
[b] Shrinkage = 100 × (sample diameter − mold diameter)/(mold diameter).
[c] Single sample, average of 50 measurements.
[d] By the 4 × $V_{Total}$/σ method. For the first number, $V_{Total}$ was calculated by the single-point adsorption method; for the number in brackets $V_{Total}$ was calculated via $V_{Total} = (1/\rho_b) - (1/1\rho_s)$.
[e] Calculated via r = 3/$\rho_s$σ.

TABLE 17

Selected properties of PUA aerogels prepared using about 0.2073M of Desmodur N3300A triisocyanate (refer to Table 7) and all water and triethylamine (Et₃N) formulations, that is 1.5, 3.0, and 4.5 mol equivalents of water and 0.3, 0.6, and 0.9% w/w triethylamine

| $H_2O$—$Et_3N$ (xmol-% w/w) | diameter (cm) [a] | shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, σ (m² g$^{-1}$) | average pore diameter (nm) [d] | particle radius, r (nm) [e] |
|---|---|---|---|---|---|---|---|---|
| 1.5-0.3 | 1.30 ± 0.011 | 12.1 ± 0.79 | 0.131 ± 0.005 | 1.26 ± 0.03 | 89.6 | 177.4 | 19.5 [154] | 13.4 |
| 1.5-0.6 | 1.33 ± 0.02 | 10.3 ± 1.4 | 0.128 ± 0.004 | 1.23 ± 0.02 | 89.6 | 171.9 | 34.1 [163] | 14.1 |
| 1.5-0.9 | 1.30 ± 0.007 | 12.1 ± 0.42 | 0.128 ± 0.0007 | 1.24 ± 0.03 | 89.7 | 154.6 | 36.1 [181] | 15.6 |
| 3.0-0.3 | 1.32 ± 0.01 | 10.6 ± 1.01 | 0.126 ± 0.004 | 1.22 ± 0.01 | 89.7 | 200.1 | 32.1 [142.1] | 12.2 |
| 3.0-0.6 | 1.32 ± 0.01 | 10.6 ± 0.18 | 0.126 ± 0.001 | 1.30 ± 0.07 | 90.3 | 169.4 | 33.4 [169.3] | 13.6 |
| 3.0-0.9 | 1.33 ± 0.01 | 10.3 ± 0.55 | 0.127 ± 0.003 | 1.20 ± 0.01 | 89.3 | 153.4 | 26.3 [183.5] | 16.2 |
| 4.5-0.3 | 1.32 ± 0.01 | 10.6 ± 0.67 | 0.125 ± 0.005 | 1.24 ± 0.02 | 89.9 | 123.7 | 20.4 [233] | 19.5 |
| 4.5-0.6 | 1.33 ± 0.01 | 10.4 ± 0.37 | 0.122 ± 0.001 | 1.25 ± 0.02 | 90.2 | 133.6 | 23.5 [241] | 17.9 |
| 4.5-0.9 | 1.32 ± 0.02 | 10.6 ± 0.28 | 0.130 ± 0.006 | 1.25 ± 0.03 | 90.7 | 126.0 | 18.1 [218] | 19.0 |

[a] Average of 5 samples. (Mold diameter: 1.40 cm.)
[b] Shrinkage = 100 × (sample diameter − mold diameter)/(mold diameter).
[c] Single sample, average of 50 measurements.
[d] By the 4 × $V_{Total}$/σ method. For the first number, $V_{Total}$ was calculated by the single-point adsorption method; for the number in brackets $V_{Total}$ was calculated via $V_{Total} = (1/\rho_b) - (1/1\rho_s)$.
[e] Calculated via r = 3/$\rho_s$σ.

TABLE 18

Selected properties of PUA aerogels prepared using about 0.2960M of Desmodur N3300A triisocyanate (refer to Table 8) and all water and triethylamine (Et₃N) formulations, that is 1.5, 3.0, and 4.5 mol equivalents of water and 0.3, 0.6, and 0.9% w/w triethylamine

| $H_2O$—$Et_3N$ (xmol-% w/w) | diameter (cm) [a] | shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, σ (m² g$^{-1}$) | average pore diameter (nm) [d] | particle radius, r (nm) [e] |
|---|---|---|---|---|---|---|---|---|
| 1.5-0.3 | 1.28 ± 0.03 | 13.3 ± 2.09 | 0.194 ± 0.01 | 1.19 ± 0.01 | 83.8 | 51.67 | 21.5 [333] | 48.7 |
| 1.5-0.6 | 1.28 ± 0.01 | 13.4 ± 0.88 | 0.212 ± 0.004 | 1.25 ± 0.01 | 83.1 | 153.5 | 23.6 [102] | 15.6 |
| 1.5-0.9 | 1.29 ± 0.02 | 12.7 ± 1.11 | 0.194 ± 0.0007 | 1.23 ± 0.01 | 84.2 | 153.1 | 29.1 [113] | 15.9 |
| 3.0-0.3 | 1.31 ± 0.01 | 11.1 ± 0.85 | 0.181 ± 0.003 | 1.18 ± 0.01 | 84.7 | 149.1 | 19.7 [125.4] | 17.1 |
| 3.0-0.6 | 1.27 ± 0.03 | 14.1 ± 1.78 | 0.192 ± 0.012 | 1.21 ± 0.02 | 84.2 | 67.5 | 27.8 [259] | 36.7 |
| 3.0-0.9 | 1.27 ± 0.02 | 13.9 ± 1.48 | 0.197 ± 0.009 | 1.22 ± 0.01 | 83.8 | 49.2 | 13.4 [345] | 49.9 |
| 4.5-0.3 | 1.28 ± 0.04 | 13.5 ± 2.4 | 0.189 ± 0.008 | 1.21 ± 0.01 | 84.4 | 68.9 | 23.6 [259] | 35.9 |
| 4.5-0.6 | 1.26 ± 0.01 | 15.1 ± 0.77 | 0.22 ± 0.01 | 1.23 ± 0.01 | 82.2 | 51.0 | 23.3 [292] | 47.8 |
| 4.5-0.9 | 1.27 ± 0.02 | 14.4 ± 1.45 | 0.191 ± 0.01 | 1.23 ± 0.02 | 84.5 | 24.8 | 23.1 [712] | 98.3 |

[a] Average of 5 samples. (Mold diameter: 1.40 cm.)
[b] Shrinkage = 100 × (sample diameter − mold diameter)/(mold diameter).
[c] Single sample, average of 50 measurements.
[d] By the 4 × $V_{Total}$/σ method. For the first number, $V_{Total}$ was calculated by the single-point adsorption method; for the number in brackets $V_{Total}$ was calculated via $V_{Total} = (1/\rho_b) - (1/1\rho_s)$.
[e] Calculated via r = 3/$\rho_s$σ.

TABLE 19

Selected properties of PUA aerogels prepared using about 0.5171M of Desmodur N3300A triisocyanate (refer to Table 9) and all water and triethylamine (Et$_3$N) formulations, that is 1.5, 3.0, and 4.5 mol equivalents of water and 0.3, 0.6, and 0.9% w/w triethylamine

| H$_2$O—Et$_3$N (×mol-% w/w) | diameter (cm) [a] | shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, σ (m$^2$ g$^{-1}$) | average pore diameter (nm) [d] | particle radius, r (nm) [e] |
|---|---|---|---|---|---|---|---|---|
| 1.5-0.3 | 1.13 ± 0.03 | 23.5 ± 1.37 | 0.56 ± 0.02 | 1.19 ± 0.001 | 53.2 | 53.3 | 31.1 [70.5] | 47.2 |
| 1.5-0.6 | 1.12 ± 0.01 | 24.2 ± 0.88 | 0.56 ± 0.02 | 1.19 ± 0.001 | 53.2 | 52.7 | 22.7 [71.3] | 47.8 |
| 1.5-0.9 | 1.12 ± 0.02 | 24.5 ± 1.11 | 0.54 ± 0.04 | 1.20 ± 0.001 | 84.2 | 46.9 | 33.3 [86.7] | 53.3 |
| 3.0-0.3 | 1.12 ± 0.01 | 24.6 ± 0.85 | 0.54 ± 0.02 | 1.19 ± 0.002 | 54.5 | 56.9 | 26.7 [70.9] | 44.3 |
| 3.0-0.6 | 1.11 ± 0.02 | 25 ± 1.35 | 0.55 ± 0.03 | 1.2 ± 0.001 | 54.1 | 53.8 | 31.9 [73.3] | 46.4 |
| 3.0-0.9 | 1.1 ± 0.02 | 25.5 ± 1.3 | 0.55 ± 0.03 | 1.2 ± 0.002 | 54 | 52.7 | 14.8 [74.8[ | 47.4 |
| 4.5-0.3 | 1.1 ± 0.02 | 25.5 ± 1.3 | 0.54 ± 0.04 | 1.2 ± 0.01 | 54.9 | 57 | 26.7 [71.3] | 45.5 |
| 4.5-0.6 | 1.08 ± 0.04 | 26.5 ± 0.3 | 0.56 ± 0.02 | 1.2 ± 0.02 | 52.5 | 71.7 | 25.1 [52.8] | 34.8 |
| 4.5-0.9 | 1.1 ± 0.02 | 25.8 ± 0.7 | 0.54 ± 0.02 | 1.2 ± 0.01 | 55.2 | 56.1 | 29.6 [72.8] | 45.2 |

[a] Average of 5 samples. (Mold diameter: 1.40 cm.)
[b] Shrinkage = 100 × (sample diameter − mold diameter)/(mold diameter).
[c] Single sample, average of 50 measurements.
[d] By the 4 × V$_{Total}$/σ method. For the first number, V$_{Total}$ was calculated by the single-point adsorption method; for the number in brackets V$_{Total}$ was calculated via V$_{Total}$ = (1/$\rho_b$) − (1/1$\rho_s$).
[e] Calculated via r = 3/$\rho_s$σ.

TABLE 20

Selected properties of PUA aerogels prepared with Desmodur N3200 diisocyanate using the middle water and triethylamine (Et$_3$N) formulations, that is 3.0 mol equivalents of water and 0.6% w/w triethylamine (refer to Table 10)

| [N3200] in sol (M) | diameter (cm) [a] | shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, σ (m$^2$ g$^{-1}$) | average pore diameter (nm) [d] | particle radius, r (nm) [e] |
|---|---|---|---|---|---|---|---|---|
| 0.2066 | 1.26 ± 0.01 | 14.6 ± 1.0 | 0.175 ± 0.007 | 1.15 ± 0.01 | 84.6 | 4.3 | 7.4 [8.2] | 606 |
| 0.2955 | 1.13 ± 0.01 | 24.7 ± 0.8 | 0.37 ± 0.01 | 1.15 ± 0.01 | 68.5 | 12.8 | 8.5 [9.1] | 203 |
| 0.5166 | 1.05 ± 0.05 | 14.3 ± 0.9 | 0.54 ± 0.07 | 1.15 ± 0.03 | 52.7 | 23.6 | 12.05 [12.3] | 110 |

[a] Average of 5 samples. (Mold diameter: 1.40 cm.)
[b] Shrinkage = 100 × (sample diameter − mold diameter)/(mold diameter).
[c] Single sample, average of 50 measurements.
[d] By the 4 × V$_{Total}$/σ method. For the first number, V$_{Total}$ was calculated by the single-point adsorption method; for the number in brackets V$_{Total}$ was calculated via V$_{Total}$ = (1/$\rho_b$) − (1/1$\rho_s$).
[e] Calculated via r = 3/$\rho_s$σ.

TABLE 21

Selected Properties of PUA aerogels prepared with Desmodur RE triisocyanate using the middle water and triethylamine (Et$_3$N) formulations, that is 3.0 mol equivalents of water and 0.6% w/w triethylamine (refer to Table 11).

| [RE] in sol [M] | diameter (cm) [a] | shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, σ (m$^2$ g$^{-1}$) | average pore diameter (nm) [d] | particle radius, r (nm) [e] |
|---|---|---|---|---|---|---|---|---|
| 0.0284 | 1.29 ± 0.01 | 13 ± 0.64 | 0.023 ± 0.002 | 1.24 ± 0.14 | 98.1 | 222.4 | 12 [11.8] | 10.8 |
| 0.0563 | 1.21 ± 0.04 | 18.5 ± 2.7 | 0.037 ± 0.003 | 1.30 ± 0.13 | 97.1 | 320.7 | 7.6 [8.4] | 7.2 |
| 0.1099 | 1.29 ± 0.01 | 12.8 ± 0.7 | 0.062 ± 0.005 | 1.23 ± 0.03 | 95 | 6.55 | 7.5 [8.7] | 372 |
| 0.2101 | 1.28 ± 0.03 | 13.3 ± 2.1 | 0.15 ± 0.02 | 1.24 ± 0.23 | 87.8 | 6.49 | 7.75 [7.6] | 373 |
| 0.3019 | 1.3 ± 0.6 | 12.4 ± 0.4 | 0.18 ± 0.01 | 1.24 ± 0.25 | 85.7 | 19.9 | 10.6 [11.2] | 122 |
| 0.5360 | 1.31 ± 0.01 | 12.1 ± 0.2 | 0.25 ± 0.02 | 1.24 ± 0.28 | 79.8 | 3.24 | 6.6 [7.8] | 746 |

[a] Average of 5 samples. (Mold diameter: 1.40 cm.)
[b] Shrinkage = 100 × (sample diameter − mold diameter)/(mold diameter).
[c] Single sample, average of 50 measurements.
[d] By the BJH-desorption method; in brackets: width at half maximum.
[e] Calculated via r = 3/$\rho_s$σ.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention.

Accordingly, the foregoing description and drawings are by way of example only.

What is claimed is:

1. An aerogel, comprising:
polyurea;
wherein the polyurea comprises the following moiety:

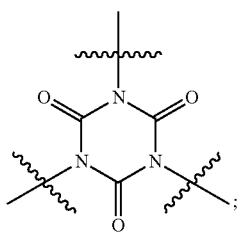 [SMILES: *n1c(=O)n(*)c(=O)n(*)c1=O]

wherein the polyurea further comprises at least one of the following moieties:

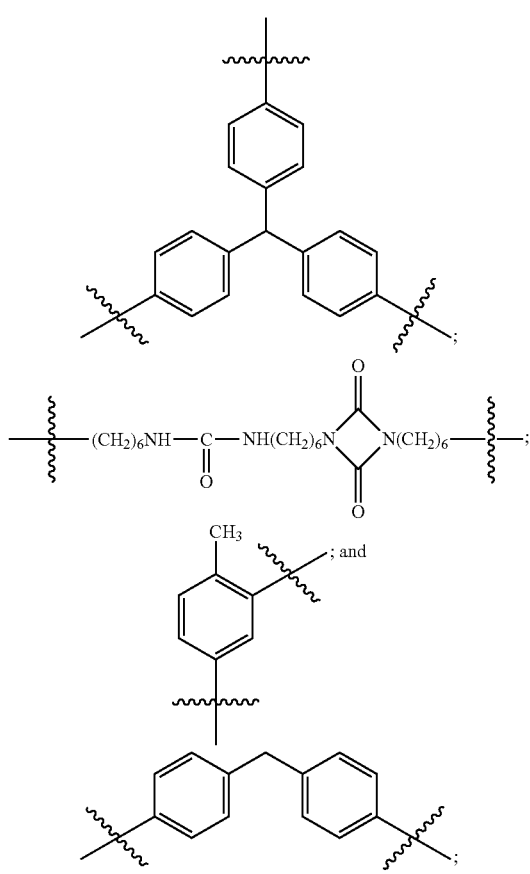

and
wherein the aerogel has a skeletal density of from 1.15 g/cm$^3$ to 1.32 g/cm$^3$.

2. The aerogel of claim 1, wherein the aerogel exhibits a bulk density of from 0.015 g/cm$^3$ to 0.560 g/cm$^3$.

3. The aerogel of claim 1, wherein the aerogel exhibits a BET surface area of from 3.24 m$^2$/g to 320.7 m$^2$/g.

4. The aerogel of claim 1, wherein the aerogel exhibits an average pore diameter of from 8.5 nm to 36.1 nm.

5. The aerogel of claim 1, wherein the aerogel has a fibrous morphology.

6. The aerogel of claim 2, wherein the aerogel exhibits a BET surface area of from 3.24 m$^2$/g to 320.7 m$^2$/g.

7. The aerogel of claim 6, wherein the aerogel exhibits an average pore diameter of from 8.5 nm to 36.1 nm.

8. The aerogel of claim 7, wherein the aerogel has a fibrous morphology.

9. The aerogel of claim 1, wherein the polyurea comprises the following moiety:

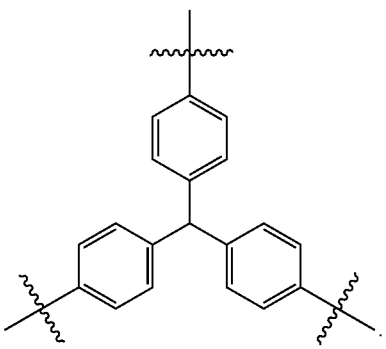 [SMILES: *c1ccc(C(c2ccc(*)cc2)c2ccc(*)cc2)cc1]

10. The aerogel of claim 1, wherein the polyurea comprises the following moiety:

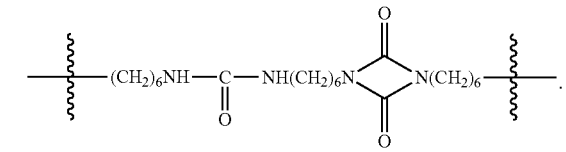

11. The aerogel of claim 9, wherein the polyurea comprises the following moiety:

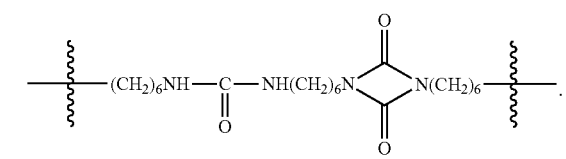

12. The aerogel of claim 1, wherein the polyurea comprises the following moiety:
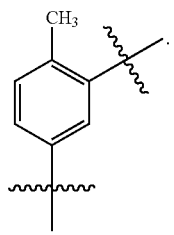 [SMILES: *c1ccc(C)c(*)c1]
13. The aerogel of claim 9, wherein the polyurea comprises the following moiety:
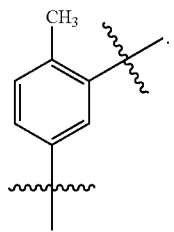 [SMILES: *c1ccc(C)c(*)c1]
14. The aerogel of claim 10, wherein the polyurea comprises the following moiety:
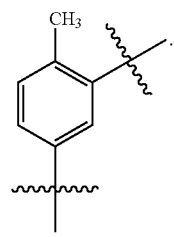 [SMILES: *c1ccc(C)c(*)c1]
15. The aerogel of claim 1, wherein the polyurea comprises the following moiety:
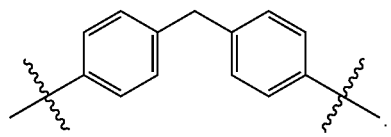 [SMILES: *c1ccc(Cc2ccc(*)cc2)cc1]
* * * * *

UNITED STATES PATENT AND TRADEMARK OFFICE
CERTIFICATE OF CORRECTION

PATENT NO. : 11,192,994 B2
APPLICATION NO. : 16/374958
DATED : December 7, 2021
INVENTOR(S) : Nicholas Leventis et al.

Page 1 of 1

It is certified that error appears in the above-identified patent and that said Letters Patent is hereby corrected as shown below:

On the Title Page

On the 2nd Page
In Item (60), the words "Provisional application No. 61/675,757" should read --Provisional application No. 61/375,757--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*